US012289181B1

(12) United States Patent
Stevenson et al.

(10) Patent No.: US 12,289,181 B1
(45) Date of Patent: *Apr. 29, 2025

(54) VEHICLE GATEWAY DEVICE AND INTERACTIVE GRAPHICAL USER INTERFACES ASSOCIATED THEREWITH

(71) Applicant: Samsara Inc., San Francisco, CA (US)

(72) Inventors: Alexander Stevenson, London (GB); Wendy Greenberg, Atlanta, GA (US); Josephine Nord, Atlanta, GA (US); Matvey Zagaynov, London (GB); Jennifer Leung, Berkeley, CA (US); Andrew Robbins, San Francisco, CA (US); Michael Ross, San Mateo, CA (US); Aaron Szerlip, Atlanta, GA (US); Rushil Goel, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,486

(22) Filed: Nov. 8, 2023

Related U.S. Application Data

(63) Continuation of application No. 17/452,326, filed on Oct. 26, 2021, now Pat. No. 11,855,801, which is a (Continued)

(51) Int. Cl.
*H04L 12/40* (2006.01)
*G07C 5/00* (2006.01)
(Continued)

(52) U.S. Cl.
CPC ........ *H04L 12/40032* (2013.01); *G07C 5/008* (2013.01); *G07C 5/0808* (2013.01); (Continued)

(58) Field of Classification Search
None
See application file for complete search history.

(56) References Cited

U.S. PATENT DOCUMENTS 4,671,111 A 6/1987 Lemelson
5,825,283 A 10/1998 Camhi
(Continued)

FOREIGN PATENT DOCUMENTS

CN 111047179 A 4/2020
DE 10 2004 015 221 A1 10/2005
(Continued)

OTHER PUBLICATIONS

US 11,450,210 B2, 09/2022, Tsai et al. (withdrawn)
(Continued)

*Primary Examiner* — Abdhesh K Jha
(74) *Attorney, Agent, or Firm* — Knobbe, Martens, Olson & Bear, LLP

(57) ABSTRACT

A system receives vehicle metric data from a gateway device connected to a vehicle. The vehicle gateway device gathers data related to operation of the vehicle and/or location data. The system receives data from multiple vehicles in a fleet. The vehicle gateway device gathers vehicle metric data at a high frequency. Instead of transmitting a large amount of vehicle metric data at a fine level of granularity, the vehicle gateway device aggregates and buckets the vehicle metric data over a period of time (such as, every five minutes). The system uses the bucketed data for fleet management analysis.

19 Claims, 19 Drawing Sheets

Related U.S. Application Data continuation of application No. 17/242,919, filed on Apr. 28, 2021, now Pat. No. 11,190,373.

(60) Provisional application No. 63/018,758, filed on May 1, 2020.

(51) Int. Cl.
*G07C 5/08* (2006.01)
*G07C 5/12* (2006.01)
*G08G 1/00* (2006.01)

(52) U.S. Cl.
CPC ................ *G07C 5/12* (2013.01); *G08G 1/22* (2013.01); *H04L 2012/40273* (2013.01)

(56) References Cited

U.S. PATENT DOCUMENTS 5,917,433 A 6/1999 Keillor et al.
6,064,299 A 5/2000 Lesesky et al.
6,098,048 A 8/2000 Dashefsky et al.
6,157,864 A 12/2000 Schwenke et al.
6,253,129 B1 6/2001 Jenkins et al.
6,317,668 B1 11/2001 Thibault et al.
6,411,203 B1 6/2002 Lesesky et al.
6,421,590 B2 7/2002 Thibault
6,452,487 B1 9/2002 Krupinski
6,505,106 B1 1/2003 Lawrence et al.
6,651,063 B1 11/2003 Vorobiev
6,714,894 B1 3/2004 Tobey et al.
6,718,239 B2 4/2004 Rayner
6,718,263 B1 4/2004 Glass et al.
6,741,165 B1 5/2004 Langfahl et al.
6,801,920 B1 10/2004 Wischinski
7,117,075 B1 10/2006 Larschan et al.
7,139,780 B2 11/2006 Lee et al.
7,209,959 B1 4/2007 Campbell et al.
7,233,684 B2 6/2007 Fedorovskaya et al.
7,386,376 B2 6/2008 Basir et al.
7,389,178 B2 6/2008 Raz et al.
7,398,298 B2 7/2008 Koch
7,492,938 B2 2/2009 Brinson, Jr. et al.
7,526,103 B2 4/2009 Schofield et al.
7,555,378 B2 6/2009 Larschan et al.
7,561,054 B2 7/2009 Raz et al.
7,596,417 B2 9/2009 Fister et al.
7,606,779 B2 10/2009 Brinson, Jr. et al.
7,715,961 B1 5/2010 Kargupta
7,769,499 B2 8/2010 McQuade et al.
7,844,088 B2 11/2010 Brinson, Jr. et al.
7,859,392 B2 12/2010 McClellan et al.
7,877,198 B2 1/2011 Tenzer et al.
7,881,838 B2 2/2011 Larschan et al.
7,957,936 B2 6/2011 Eryurek et al.
8,019,581 B2 9/2011 Sheha et al.
8,024,311 B2 9/2011 Wood et al.
8,032,277 B2 10/2011 Larschan et al.
8,140,358 B1 3/2012 Ling et al.
8,156,108 B2 4/2012 Middleton et al.
8,156,499 B2 4/2012 Foulger et al.
8,169,343 B2 5/2012 Sheha et al.
8,175,992 B2 5/2012 Bass, II et al.
8,230,272 B2 7/2012 Middleton et al.
8,260,489 B2 9/2012 Nielsen et al.
8,417,402 B2 4/2013 Basir
8,442,508 B2 5/2013 Harter et al.
8,457,395 B2 6/2013 Boncyk et al.
8,509,412 B2 8/2013 Sheha et al.
8,543,625 B2 9/2013 Middleton et al.
8,560,164 B2 10/2013 Nielsen et al.
8,615,555 B2 12/2013 Koch
8,625,885 B2 1/2014 Brinson, Jr. et al.
8,626,568 B2 1/2014 Warkentin et al.
8,633,672 B2 1/2014 Jung et al.
8,669,857 B2 3/2014 Sun et al.
8,682,572 B2 3/2014 Raz et al.
8,706,409 B2 4/2014 Mason et al.
8,831,825 B2 9/2014 Shah et al.
8,836,784 B2 9/2014 Erhardt et al.
8,918,229 B2 12/2014 Hunt et al.
8,953,228 B1 2/2015 Mehers
8,989,914 B1 3/2015 Nemat-Nasser et al.
8,989,959 B2 3/2015 Plante et al.
8,996,240 B2 3/2015 Plante
9,024,744 B2 5/2015 Klose et al.
9,053,590 B1 6/2015 Kator et al.
9,137,498 B1 9/2015 L'Heureux et al.
9,147,335 B2 9/2015 Raghunathan et al.
9,152,609 B2 10/2015 Schwartz et al.
9,165,196 B2 10/2015 Kesavan et al.
9,170,913 B2 10/2015 Hunt et al.
9,189,895 B2 11/2015 Phelan et al.
9,230,250 B1 1/2016 Parker et al.
9,230,437 B2 1/2016 Brinton et al.
9,280,435 B2 3/2016 Hunt et al.
9,311,271 B2 4/2016 Wright
9,344,683 B1 5/2016 Nemat-Nasser et al.
9,349,228 B2 5/2016 Ochsendorf et al.
9,384,111 B2 7/2016 Hunt et al.
9,389,147 B1 7/2016 Lambert et al.
9,402,060 B2 7/2016 Plante
9,412,282 B2 8/2016 Hunt et al.
9,439,280 B2 9/2016 Chang et al.
9,445,270 B1 9/2016 Bicket et al.
9,477,639 B2 10/2016 Fischer et al.
9,477,989 B2 10/2016 Grimm et al.
9,527,515 B2 12/2016 Hunt et al.
9,594,725 B1 3/2017 Cook et al.
9,672,667 B2 * 6/2017 Mason .................. G07C 5/008
9,688,282 B2 6/2017 Cook et al.
9,728,015 B2 * 8/2017 Kwak .................. G07C 5/008
9,761,063 B2 9/2017 Lambert et al.
9,761,067 B2 9/2017 Plante et al.
9,811,536 B2 11/2017 Morris et al.
9,818,088 B2 11/2017 Penilla et al.
9,846,979 B1 12/2017 Sainaney et al.
9,849,834 B2 12/2017 Reed et al.
9,852,625 B2 12/2017 Victor et al.
9,892,376 B2 2/2018 Pfeiffer et al.
9,922,567 B2 3/2018 Molin et al.
9,934,628 B2 4/2018 Kreiner et al.
9,996,980 B1 6/2018 Gonzalez et al.
10,015,452 B1 7/2018 Schofield et al.
10,033,706 B2 7/2018 Bicket et al.
10,040,459 B1 8/2018 Kukreja
10,065,652 B2 9/2018 Shenoy et al.
10,068,392 B2 9/2018 Cook et al.
10,075,669 B2 9/2018 Vanman et al.
10,083,547 B1 9/2018 Tomatsu
10,085,149 B2 9/2018 Bicket et al.
10,094,308 B2 10/2018 Kolhouse et al.
10,102,495 B1 10/2018 Zhang et al.
10,127,810 B2 11/2018 Durie, Jr. et al.
10,157,321 B2 12/2018 Becker et al.
10,173,486 B1 1/2019 Lee et al.
10,173,544 B2 1/2019 Hendrix et al.
10,196,071 B1 2/2019 Rowson et al.
10,206,107 B2 2/2019 Bicket et al.
10,223,935 B2 3/2019 Sweany et al.
10,275,959 B2 4/2019 Ricci
10,286,875 B2 5/2019 Penilla et al.
10,290,036 B1 5/2019 Gella et al.
10,311,749 B1 6/2019 Kypri et al.
10,336,190 B2 7/2019 Yokochi et al.
10,388,075 B2 8/2019 Schmirler et al.
10,389,739 B2 8/2019 Solotorevsky
10,390,227 B2 8/2019 Bicket et al.
10,444,949 B2 10/2019 Scott et al.
10,445,559 B2 10/2019 Joseph et al.
10,459,444 B1 10/2019 Kentley-Klay
10,460,183 B2 10/2019 Welland et al.
10,460,600 B2 10/2019 Julian et al.
10,471,955 B2 11/2019 Kouri et al.
10,486,709 B1 11/2019 Mezaael

(56) References Cited

U.S. PATENT DOCUMENTS 10,489,222 B2 11/2019 Sathyanarayana et al.
10,523,904 B2 12/2019 Mahmoud et al.
10,573,183 B1 2/2020 Li et al.
10,579,123 B2 3/2020 Tuan et al.
10,609,114 B1 3/2020 Bicket et al.
10,621,873 B1 4/2020 Spiel et al.
10,623,899 B2 4/2020 Watkins et al.
10,632,941 B2 4/2020 Chauncey et al.
10,652,335 B2 5/2020 Botticelli
10,715,976 B2 7/2020 Hoffner et al.
10,762,363 B2 9/2020 Watanabe
10,782,691 B2 9/2020 Suresh et al.
10,788,990 B2 9/2020 Kim et al.
10,789,840 B2 9/2020 Boykin et al.
10,803,496 B1 10/2020 Hopkins
10,818,109 B2 10/2020 Palmer et al.
10,827,324 B1 11/2020 Hajimiri et al.
10,843,659 B1 11/2020 Innocenzi et al.
10,848,670 B2 11/2020 Gatti et al.
10,878,030 B1 12/2020 Lambert et al.
10,969,852 B2 4/2021 Tuan et al.
10,979,871 B2 4/2021 Hajimiri et al.
10,999,269 B2 5/2021 Bicket et al.
10,999,374 B2 5/2021 ElHattab et al.
11,046,205 B1 6/2021 Govan et al.
11,069,257 B2 7/2021 Palmer et al.
11,080,568 B2 8/2021 ElHattab et al.
11,122,488 B1 9/2021 Lloyd et al.
11,126,910 B1 9/2021 Akhtar et al.
11,127,130 B1 9/2021 Jain et al.
11,131,986 B1 9/2021 Gal et al.
11,132,853 B1 9/2021 Akhtar et al.
11,137,744 B1 10/2021 Heddleston et al.
11,142,175 B2 10/2021 Chow et al.
11,158,177 B1 10/2021 ElHattab et al.
11,184,422 B1 11/2021 Bicket et al.
11,188,046 B1 11/2021 ElHattab et al.
11,190,373 B1 11/2021 Stevenson et al.
11,204,637 B2 12/2021 Tuan et al.
11,260,878 B2 3/2022 Palmer et al.
11,341,786 B1 5/2022 Calmer et al.
11,349,901 B1 5/2022 Duffield et al.
11,352,013 B1 6/2022 Srinivasan et al.
11,352,014 B1 6/2022 Srinivasan et al.
11,356,605 B1 6/2022 Shemet et al.
11,356,909 B1 6/2022 Lloyd
11,365,980 B1 6/2022 Akhtar et al.
11,386,325 B1 7/2022 Srinivasan et al.
11,436,844 B2 9/2022 Carruthers et al.
11,451,610 B1 9/2022 Saunders et al.
11,451,611 B1 9/2022 Saunders et al.
11,460,507 B2 10/2022 Lloyd et al.
11,464,079 B1 10/2022 Aschenbener et al.
11,479,142 B1 10/2022 Govan et al.
11,494,921 B2 11/2022 ElHattab et al.
11,522,857 B1 12/2022 Symons et al.
11,527,153 B1 12/2022 Shah et al.
11,532,169 B1 12/2022 Hassan et al.
11,558,449 B1 1/2023 Bicket et al.
11,595,632 B2 2/2023 Tsai et al.
11,599,097 B1 3/2023 Gal et al.
11,606,736 B1 3/2023 Lloyd et al.
11,611,621 B2 3/2023 ElHattab et al.
11,615,141 B1 3/2023 Hoye et al.
11,620,909 B2 4/2023 Tsai et al.
11,627,252 B2 4/2023 Delegard et al.
11,641,388 B1 5/2023 Saunders et al.
11,641,604 B1 5/2023 Lloyd
11,643,102 B1 5/2023 Calmer et al.
11,659,060 B2 5/2023 Davis et al.
11,665,223 B1 5/2023 Duffield et al.
11,669,714 B1 6/2023 Akhtar et al.
11,671,478 B1 6/2023 Saunders et al.
11,674,813 B1 6/2023 Chung et al.
11,675,042 B1 6/2023 Lloyd et al.
11,683,579 B1 6/2023 Symons et al.
11,688,211 B1 6/2023 Calmer et al.
11,694,317 B1 7/2023 Jain et al.
11,704,984 B1 7/2023 ElHattab et al.
11,709,500 B2 7/2023 Lloyd et al.
11,710,409 B2 7/2023 Nanda et al.
11,720,087 B1 8/2023 Heddleston et al.
11,727,054 B2 8/2023 Grandhi et al.
11,731,469 B1 8/2023 McGillan
11,736,312 B1 8/2023 Xiao et al.
11,741,760 B1 8/2023 Dubin et al.
11,748,377 B1 9/2023 Zhang et al.
11,752,895 B1 9/2023 Govan et al.
11,756,346 B1 9/2023 Wu et al.
11,756,351 B1 9/2023 Akhtar et al.
11,758,096 B2 9/2023 Shah et al.
11,776,328 B2 10/2023 Yang et al.
11,780,446 B1 10/2023 Srinivasan et al.
11,782,930 B2 10/2023 McGee et al.
11,787,413 B2 10/2023 Tsai et al.
11,798,187 B2 10/2023 Zaheer et al.
11,798,298 B2 10/2023 Hassan et al.
11,800,317 B1 10/2023 Dugar et al.
11,838,884 B1 12/2023 Dergosits et al.
11,842,577 B1 12/2023 Harrison et al.
11,847,911 B2 12/2023 ElHattab et al.
11,855,801 B1 12/2023 Stevenson et al.
11,861,955 B1 1/2024 Dubin et al.
11,862,011 B2 1/2024 Shah et al.
11,863,712 B1 1/2024 Young et al.
11,866,055 B1 1/2024 Srinivasan et al.
11,868,919 B1 1/2024 Zhang et al.
11,875,580 B2 1/2024 Hassan et al.
11,875,683 B1 1/2024 Tsai et al.
11,890,962 B1 2/2024 Govan et al.
11,937,152 B2 3/2024 Hajimiri et al.
11,938,948 B1 3/2024 Davis et al.
11,959,772 B2 4/2024 Robbins et al.
11,974,410 B1 4/2024 Lin et al.
11,975,685 B1 5/2024 Innocenzi et al.
11,989,001 B1 5/2024 ElHattab et al.
11,995,546 B1 5/2024 Srinivasan et al.
11,997,181 B1 5/2024 Davis et al.
12,000,940 B1 6/2024 Lloyd et al.
12,106,613 B2 10/2024 Calmer et al.
12,117,546 B1 10/2024 Lloyd et al.
12,126,917 B1 10/2024 Shemet et al.
12,128,919 B2 10/2024 Calmer et al.
12,140,445 B1 11/2024 Akhtar et al.
2002/0061758 A1 5/2002 Zarlengo et al.
2002/0128751 A1 9/2002 Engstrom et al.
2002/0169850 A1 11/2002 Batke et al.
2003/0081935 A1 5/2003 Kirmuss
2003/0154009 A1 8/2003 Basir et al.
2004/0093264 A1 5/2004 Shimizu
2004/0236476 A1 11/2004 Chowdhary
2004/0236596 A1 11/2004 Chowdhary et al.
2005/0131585 A1 6/2005 Luskin et al.
2005/0131646 A1 6/2005 Camus
2005/0286774 A1 12/2005 Porikli
2006/0167591 A1 7/2006 McNally
2007/0050108 A1 3/2007 Larschan et al.
2007/0173991 A1 7/2007 Tenzer et al.
2007/0173993 A1 7/2007 Nielsen et al.
2008/0252487 A1 10/2008 McClellan et al.
2008/0319602 A1 12/2008 McClellan et al.
2009/0099724 A1 4/2009 Kranz et al.
2009/0141939 A1 6/2009 Chambers et al.
2009/0240427 A1 9/2009 Siereveld et al.
2010/0030586 A1 2/2010 Taylor et al.
2010/0049639 A1 2/2010 Ferro et al.
2010/0087984 A1 4/2010 Joseph
2010/0281161 A1 11/2010 Cohn et al.
2011/0060496 A1 3/2011 Nielsen et al.
2011/0093306 A1 4/2011 Nielsen et al.
2011/0205048 A1 8/2011 Lentz
2011/0234749 A1 9/2011 Alon
2011/0276265 A1 11/2011 Husain
2012/0066030 A1 3/2012 Limpert

(56) References Cited

U.S. PATENT DOCUMENTS

2012/0109418 A1 5/2012 Lorber
2012/0136743 A1 5/2012 McQuade et al.
2012/0194357 A1 8/2012 Ciolli
2012/0201277 A1 8/2012 Tanner et al.
2012/0218416 A1 8/2012 Leny et al.
2012/0235625 A1 9/2012 Takehara
2012/0256770 A1 10/2012 Mitchell
2012/0262104 A1 10/2012 Kirsch
2012/0303397 A1 11/2012 Prosser
2013/0007626 A1 1/2013 Adams et al.
2013/0073112 A1 3/2013 Phelan et al.
2013/0162421 A1 6/2013 Inaguma et al.
2013/0162425 A1 6/2013 Raghunathan et al.
2013/0164713 A1 6/2013 Hunt et al.
2013/0164714 A1 6/2013 Hunt et al.
2013/0179027 A1 7/2013 Mitchell
2013/0211559 A1 8/2013 Lawson et al.
2013/0211660 A1* 8/2013 Mitchell ............ G06Q 10/0639
701/29.3
2013/0232027 A1 9/2013 Reich et al.
2013/0244210 A1 9/2013 Nath et al.
2013/0250040 A1 9/2013 Vitsnudel et al.
2013/0332004 A1 12/2013 Gompert et al.
2013/0338855 A1 12/2013 Mason et al.
2014/0012492 A1 1/2014 Bowers et al.
2014/0045147 A1 2/2014 Mohn et al.
2014/0095061 A1 4/2014 Hyde
2014/0098060 A1 4/2014 McQuade et al.
2014/0113619 A1 4/2014 Tibbitts et al.
2014/0159660 A1 6/2014 Klose et al.
2014/0195106 A1 7/2014 McQuade et al.
2014/0223090 A1 8/2014 Malone
2014/0278108 A1 9/2014 Kerrigan et al.
2014/0293069 A1 10/2014 Lazar et al.
2014/0303826 A1 10/2014 Kobayashi et al.
2014/0328517 A1 11/2014 Gluncic
2014/0337429 A1 11/2014 Asenjo et al.
2014/0354227 A1 12/2014 Tyagi et al.
2014/0354228 A1 12/2014 Williams et al.
2015/0025734 A1 1/2015 Cook et al.
2015/0044641 A1 2/2015 Chauncey et al.
2015/0074091 A1 3/2015 Walkin et al.
2015/0081162 A1 3/2015 Mitchell et al.
2015/0081399 A1 3/2015 Mitchell et al.
2015/0116114 A1 4/2015 Boyles
2015/0226563 A1 8/2015 Cox et al.
2015/0269790 A1 9/2015 Batchellar et al.
2015/0283912 A1 10/2015 Shimizu et al.
2015/0347121 A1 12/2015 Harumoto
2016/0046298 A1 2/2016 DeRuyck et al.
2016/0086391 A1 3/2016 Ricci
2016/0093216 A1 3/2016 Lee et al.
2016/0110066 A1 4/2016 McCormick et al.
2016/0167643 A1 6/2016 Tabanoglu et al.
2016/0176401 A1 6/2016 Pilkington
2016/0275376 A1 9/2016 Kant
2016/0288744 A1 10/2016 Rutherford et al.
2016/0293049 A1 10/2016 Monahan et al.
2016/0311423 A1 10/2016 Storm
2016/0343091 A1 11/2016 Han et al.
2016/0371553 A1 12/2016 Farnham, IV et al.
2016/0375780 A1 12/2016 Penilla et al.
2017/0039784 A1 2/2017 Gelbart et al.
2017/0060726 A1 3/2017 Glistvain
2017/0102463 A1 4/2017 Hwang
2017/0123397 A1 5/2017 Billi et al.
2017/0124476 A1 5/2017 Levinson et al.
2017/0140603 A1 5/2017 Ricci
2017/0195265 A1 7/2017 Billi et al.
2017/0200061 A1 7/2017 Julian et al.
2017/0255966 A1 9/2017 Khoury
2017/0263049 A1 9/2017 MacDonald et al.
2017/0263120 A1 9/2017 Durie, Jr. et al.
2017/0278004 A1 9/2017 McElhinney et al.
2017/0286838 A1 10/2017 Cipriani et al.
2017/0291611 A1 10/2017 Innes et al.
2017/0291800 A1 10/2017 Scoville et al.
2017/0323641 A1 11/2017 Shimizu et al.
2017/0332199 A1 11/2017 Elliott et al.
2017/0345283 A1 11/2017 Kwon et al.
2017/0361462 A1 12/2017 Chelian et al.
2017/0366935 A1 12/2017 Ahmadzadeh et al.
2018/0001771 A1 1/2018 Park et al.
2018/0001899 A1 1/2018 Shenoy et al.
2018/0012196 A1 1/2018 Ricci et al.
2018/0025636 A1 1/2018 Boykin et al.
2018/0063576 A1 3/2018 Tillman et al.
2018/0068206 A1 3/2018 Pollach et al.
2018/0072313 A1 3/2018 Stenneth
2018/0075309 A1 3/2018 Sathyanarayana et al.
2018/0093672 A1 4/2018 Terwilliger et al.
2018/0174485 A1 6/2018 Stankoulov
2018/0188744 A1 7/2018 Switkes et al.
2018/0234514 A1 8/2018 Rajiv et al.
2018/0247109 A1 8/2018 Joseph et al.
2018/0253109 A1 9/2018 Fontaine et al.
2018/0262724 A1 9/2018 Ross
2018/0268623 A1 9/2018 Ambrose et al.
2018/0295141 A1 10/2018 Solotorevsky
2018/0329381 A1 11/2018 Doh et al.
2018/0356800 A1 12/2018 Chao et al.
2018/0357484 A1 12/2018 Omata
2018/0364686 A1 12/2018 Naidoo et al.
2019/0003848 A1 1/2019 Hoten et al.
2019/0007690 A1 1/2019 Varadarajan et al.
2019/0016341 A1 1/2019 Nelson
2019/0054876 A1 2/2019 Ferguson et al.
2019/0065951 A1 2/2019 Luo et al.
2019/0077308 A1 3/2019 Kashchenko
2019/0118655 A1 4/2019 Grimes et al.
2019/0120947 A1 4/2019 Wheeler et al.
2019/0156680 A1 5/2019 Sarti et al.
2019/0174158 A1 6/2019 Herrick et al.
2019/0188847 A1 6/2019 Gonzalez et al.
2019/0244301 A1 8/2019 Seth et al.
2019/0257661 A1 8/2019 Stentz et al.
2019/0265712 A1 8/2019 Satzoda et al.
2019/0272725 A1 9/2019 Viklund et al.
2019/0286948 A1 9/2019 Sathyanarayana et al.
2019/0303718 A1 10/2019 Tanigawa et al.
2019/0304082 A1 10/2019 Tokashiki et al.
2019/0318419 A1 10/2019 VanderZanden
2019/0318549 A1 10/2019 Zeira et al.
2019/0327590 A1 10/2019 Kubo et al.
2019/0327613 A1 10/2019 Bicket et al.
2019/0370581 A1 12/2019 Cordell et al.
2020/0018612 A1 1/2020 Wolcott
2020/0026282 A1 1/2020 Choe et al.
2020/0050182 A1 2/2020 Cheng et al.
2020/0074326 A1 3/2020 Balakrishnan et al.
2020/0074397 A1 3/2020 Burda et al.
2020/0135033 A1 4/2020 Switkes et al.
2020/0139847 A1 5/2020 Baumer et al.
2020/0150739 A1 5/2020 Tuan et al.
2020/0162489 A1 5/2020 Bar-Nahum et al.
2020/0164509 A1 5/2020 Shults et al.
2020/0168094 A1 5/2020 Shimodaira et al.
2020/0283003 A1 9/2020 Raichelgauz
2020/0311602 A1 10/2020 Hawley et al.
2020/0312155 A1 10/2020 Kelkar et al.
2020/0327009 A1 10/2020 Callison et al.
2020/0327369 A1 10/2020 Cruz et al.
2020/0342230 A1 10/2020 Tsai et al.
2020/0342235 A1 10/2020 Tsai et al.
2020/0342274 A1 10/2020 ElHattab et al.
2020/0342506 A1 10/2020 Levy et al.
2020/0342611 A1 10/2020 ElHattab et al.
2020/0344301 A1 10/2020 ElHattab et al.
2020/0371773 A1 11/2020 Kato et al.
2020/0380806 A1 12/2020 Tabata
2020/0389415 A1 12/2020 Zhao et al.
2021/0006950 A1 1/2021 Hajimiri et al.
2021/0097315 A1 4/2021 Carruthers et al.
2021/0118330 A1* 4/2021 Baer .................... G08G 1/0967

(56) References Cited

U.S. PATENT DOCUMENTS

| | | | |
|---|---|---|---|
| 2021/0397908 | A1 | 12/2021 | ElHattab et al. |
| 2022/0165073 | A1 | 5/2022 | Shikii et al. |
| 2022/0289203 | A1 | 9/2022 | Makilya et al. |
| 2022/0374737 | A1 | 11/2022 | Dhara et al. |
| 2023/0077207 | A1 | 3/2023 | Hassan et al. |
| 2023/0153735 | A1 | 5/2023 | Dhara et al. |
| 2023/0169420 | A1 | 6/2023 | Dhara et al. |
| 2023/0219592 | A1 | 7/2023 | Calmer et al. |
| 2023/0281553 | A1 | 9/2023 | Singh et al. |
| 2023/0298410 | A1 | 9/2023 | Calmer et al. |
| 2024/0003749 | A1 | 1/2024 | Lin et al. |
| 2024/0005678 | A1 | 1/2024 | Hassan et al. |
| 2024/0013423 | A1 | 1/2024 | Zaheer et al. |
| 2024/0063596 | A1 | 2/2024 | Pandian et al. |
| 2024/0146629 | A1 | 5/2024 | Lloyd |

FOREIGN PATENT DOCUMENTS

| | | | |
|---|---|---|---|
| EP | 1615178 | A2 | 1/2006 |
| EP | 2945128 | | 11/2015 |
| GB | 2288892 | A | 11/1995 |
| RU | 2764646 | | 1/2022 |
| WO | WO 2017/123665 | A1 | 7/2017 |
| WO | WO 2018/131322 | A1 | 7/2018 |
| WO | WO 2019/099409 | A1 | 5/2019 |
| WO | WO 2019/125545 | A1 | 6/2019 |
| WO | WO 2019/133533 | A1 | 7/2019 |
| WO | WO 2023/244513 | A1 | 12/2023 |

OTHER PUBLICATIONS

U.S. Pat. No. 11,190,373, Issued Nov. 30, 2021, Vehicle Gateway Device and Interactive Graphical User Interfaces Associated Therwith.

U.S. Appl. No. 17/452,326, filed Oct. 26, 2021, Vehicle Gateway Device and Interactive Graphical User Interfaces Associated Therewith.

Dillon, A., "User Interface Design", *MacMillan Encyclopedia of Cognitive Science,* 2006, vol. 4, London: MacMillan, in 6 pages (pp. 453-458). Downloaded from https://onlinelibrary.wiley.com/doi/10.1002/0470018860.s00054.

Geotab Inc., Fleet Management Software, retrieved from https://www.geotab.com/fleet-management-software/, accessed Feb. 1, 2020, 10 pages.

Geotab Inc., What's new in MyGeotab—Version 1902, Apr. 26, 2019, retrieved from https://www.geotab.com/blog/mygeotab-updates-1902/, accessed Nov. 19, 2019, 16 pages.

U.S. Pat. No. 11,190,373, Issued Nov. 30, 2021, Vehicle Gateway Device and Interactive Graphical User Interfaces Associated Therewith.

U.S. Pat. No. 11,855,801, Issued Dec. 26, 2023, Vehicle Gateway Device and Interactive Graphical User Interfaces Associated Therewith.

U.S. Pat. No. 11,479,142, Issued Oct. 25, 2022, Estimated State of Charge Determination.

U.S. Pat. No. 11,752,895, Issued Sep. 12, 2023, Estimated State of Charge Determination.

U.S. Appl. No. 18/357,875, filed Jul. 24, 2023, Estimated State of Charge Determination.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"The Home of Actionable Transportation Insights—Meet Altitude", Geotab ITS, accessed on Apr. 1, 2024 [publication date unknown], in 5 pages. URL: https://its.geotab.com/altitude/.

Brown, P. et al., "AI Dash Cam Benchmarking" [report], Strategy Analytics, Inc., Apr. 15, 2022, in 27 pages.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Motive Help Center, "*New Fleet Managers Start Here* —Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.

(56) References Cited

OTHER PUBLICATIONS

Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.
Motive Help Center, "How to recall/request video from the Motive Fleet Dashboard?", Motive Technologies, Inc., accessed on Oct. 25, 2023 [publication date unkown], in 7 pages. URL: https://helpcenter.gomotive.com/hc/en-us/articles/6162075219229-How-to-recall-request-video-from-the-Motive-Dashcam.
Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.
Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.
Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.
Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.
Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.
Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.
Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.
Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.
Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.
Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.
Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.
Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.
Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.
Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.
Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.
Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.
Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.
Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.
Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.
Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.
Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.
Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.
Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.

(56) References Cited

OTHER PUBLICATIONS

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.
Motive, "Asset Gateway Installation Guide | Cable/Vehicle Powered" [video], YouTube, Jun. 25, 2020, screenshot in 1 page. URL: https://www.youtube.com/watch?v=pME-VMauQgY.
Motive, "Asset Gateway Installation Guide | Solar Powered" [video], YouTube, Jun. 25, 2020, screenshot in 1 page. URL: https://www.youtube.com/watch?v=jifKM3GT6Bs.
Motive, "Coach your drivers using the Motive Safety Hub." [video], YouTube, Mar. 27, 2023, screenshot in 1 page. URL: https://www.youtube.com/watch?v=VeErPXF30js.
Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.
Motive, "Guide: AI Model Development", Motive Technologies, Inc., accessed on Mar. 29, 2024 [publication date unknown], Document No. 2022Q1_849898994, in 14 pages.
Motive, "Guide: DRIVE risk score", Motive Technologies, Inc., accessed on Apr. 8, 2023 [publication date unknown], Document No. 2022Q2_849898994, in 22 pages.
Motive, "Guide: Smart Event Thresholds", Motive Technologies, Inc., accessed on Apr. 8, 2023 [publication date unknown], Document No. 2022Q1_902914404, in 11 pages.
Motive, "How to install a Motive Vehicle Gateway in light-duty vehicles." [video], YouTube, Aug. 5, 2022, screenshot in 1 page. URL: https://www.youtube.com/watch?v=WnclRs_cFw0.
Motive, "How to install your Motive AI Dashcam." [video], YouTube, Aug. 5, 2022, screenshot in 1 page. URL: https://www.youtube.com/watch?v=3JNG2h3KnU4.
Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.
Motive, "Improve road and fleet safety with driver scores.", Motive Technologies, Inc., Feb. 7, 2019, in 5 pages. URL: https://gomotive.com/blog/improve-fleet-safety-driver-scores/.
Motive, "Industry-leading fleet management solutions", Motive Technologies, Inc., accessed on Feb. 18, 2024 [publication date unknown], in 13 pages. URL: https://gomotive.com/products/.
Motive, "Introducing an easier way to manage unidentified trips.", Motive Technologies, Inc., Apr. 30, 2020, in 5 pages. URL: https://gomotive.com/blog/introducing-easier-ude-management/.
Motive, "Introducing Motive Driver Workflow.", Motive Technologies, Inc., Oct. 16, 2017, in 5 pages. URL: https://gomotive.com/blog/motive-driver-workflow/.
Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.
Motive, "KeepTruckin ELD Training for Drivers" [video], YouTube, Feb. 2, 2018, screenshot in 1 page. URL: https://www.youtube.com/watch?v=LKJLIT2bGS0.
Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.
Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "No time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_ 1202933457877590, in 4 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.

(56) References Cited

OTHER PUBLICATIONS

Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Jan. 24, 2024 Complaint (Exhibits 1-3 comprise copies of publicly available U.S. patents, and are not included herein for ease of transmission) (Exhibits 4-12 are separately provided), *Samsara Inc.* v. *Motive Technologies, Inc.*, Case No. 1:24-cv-00084-UNA, in 94 pages.
Exhibit 4 (Brown, P. et al., "AI Dash Cam Benchmarking" [report], Strategy Analytics, Inc., Apr. 15, 2022.) filed with Jan. 24, 2024 Complaint, Case No. 1:24-cv-00084-UNA, in 28 pages.
Exhibit 5 (Camden, M. et al., "AI Dash Cam Performance Benchmark Testing Final Report", Virginia Tech Transportation Institute, submitted Jun. 30, 2023, pp. 1-109) filed with Jan. 24, 2024 Complaint, Case No. 1:24-cv-00084-UNA, in 110 pages.
Exhibit 6 (Camden, M. et al., "AI Dash Cam Performance Benchmark Testing Final Report", Virginia Tech Transportation Institute, revised Aug. 17, 2023 [submitted Jun. 30, 2023], pp. 1-110) filed with Jan. 24, 2024 Complaint, Case No. 1:24-cv-00084-UNA, in 111 pages.
Exhibit 7 (Letter from Jay P. Lefkowitz, P.C. to Shulamite White, Esq. and Joseph G. Petrosinelli, Esq. regarding Motive Technologies, Inc.'s Unlawful Business Practices, dated Sep. 26, 2023.) filed with Jan. 24, 2024 Complaint, Case No. 1:24-cv-00084-UNA, in 9 pages.
Exhibit 8 (Letter from Jay P. Lefkowitz, P.C. to Joseph G. Petrosinelli, Esq. regarding Motive Technologies, Inc.'s Unlawful Business Practices, dated Jan. 23, 2024.) filed with Jan. 24, 2024 Complaint, Case No. 1:24-cv-00084-UNA, in 38 pages.
Exhibit 9 (Motive, "System Overview", Motive Technologies, Inc., accessed Sep. 21, 2023 [publication date unknown]. URL: https://gomotive.com/content-library/guides/system-overview/) filed with Jan. 24, 2024 Complaint, Case No. 1:24-cv-00084-UNA, in 4 pages.
Exhibit 10 ("Spec Sheet: Vehicle Gateway", Motive Technologies, Inc., [publication date unknown], Document No. 2022Q1_858791278.) filed with Jan. 24, 2024 Complaint, Case No. 1:24-cv-00084-UNA, in 7 pages.
Exhibit 11 ("Spec Sheet: AI Dashcam", Motive Technologies, Inc., [publication date unknown], Document No. 2023Q2_1204527643716537. URL: https://gomotive.com/content-library/spec-sheet/ai-dashcam/) filed with Jan. 24, 2024 Complaint, Case No. 1:24-cv-00084-UNA, in 6 pages.
Exhibit 12 ("Spec Sheet: AI Omnicam", Motive Technologies, Inc., [publication date unknown], Document No. 2023Q2_1204519709838862.) filed with Jan. 24, 2024 Complaint, Case No. 1:24-cv-00084-UNA, in 6 pages.
Feb. 8, 2024 Complaint under Section 337 of the Tariff Act of 1930, as Amended (Exhibits 1-8 comprise copies of publicly available U.S. patents or assignment data, and are not included herein for ease of transmission) (Exhibits 9-77 are separately provided), *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-3722, in 58 pages.
Exhibit 9 (U.S. Pat. No. 11,190,373 Infringement Claim Chart (Claim 15)) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 34 pages.
Exhibit 10 (U.S. Pat. No. 11,127,130 Infringement Claim Chart) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 9 pages.
Exhibit 11 (U.S. Pat. No. 11,611,621 Infringement Claim Chart) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 11 Amended (U.S. Pat. No. 11,611,621 Infringement Claim Chart) filed with Feb. 29, 2024 Letter of First Supplement in ITC Complaint, In the Matter of Certain Vehicle Telematics, Fleet Management, and Video-Based Safety Systems, Devices, and Components thereof, Investigation No. 337-TA-3722, in 29 pages.
Exhibit 12 (U.S. Pat. No. 11,190,373 Domestic Industry Chart) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 15 pages.
Exhibit 13 (U.S. Pat. No. 11,127,130 Domestic Industry Claim Chart) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 16 pages.
Exhibit 14 (U.S. Pat. No. 11,611,621 Domestic Industry Claim Chart) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 11 pages.
Exhibit 15 (Samsara, "AI Dash Cams", Samsara, Inc., [publication date unknown].) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 10 pages.
Exhibit 16 (Samsara, "Vehicle Gateways—VG34, VG54, VG54H Datasheet", [publication date unknown].) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 9 pages.
Exhibit 17 (Samsara, "CM31 Dash Camera Datasheet—Internet-Connected Front-Facing HD Camera Module", [publication date unknown], pp. 1-4.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 5 pages.
Exhibit 18 (Samsara, "CM32 Dash Camera - Internet-Connected Dual-Facing HD Camera Module", [publication date unknown].) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 3 pages.
Exhibit 19 (Glassdoor, "Motive—Leadership wants "yes men" only.—Senior Manager Motive Employee Review", Glassdoor LLC, accessed on Feb. 5, 2024. URL: https://www.glassdoor.com/Reviews/Employee-Review-Motive-TVW33088350.htm) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 5 pages.
Exhibit 20 ("Spec Sheet: Vehicle Gateway", Motive Technologies, Inc., [publication date unknown], Document No. 2022Q1_858791278.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 7 pages.
Exhibit 21 (Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 17 pages.

(56) References Cited

OTHER PUBLICATIONS

Exhibit 22 (Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 10 pages.
Exhibit 23 ("Spec Sheet: AI Dashcam", Motive Technologies, Inc., [publication date unknown], Document No. 2023Q2_1204527643716537.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 24 ("Spec Sheet: AI Omnicam", Motive Technologies, Inc., [publication date unknown], Document No. 2023Q2_1204519709838862.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 25 (Constine, J., "Cisco Acquires Enterprise Wi-Fi Startup Meraki for $1.2 Billion in Cash", TechCrunch, Nov. 18, 2012.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 11 pages.
Exhibit 26 (PRNewsire, "Samsara Reaches 20,000 Customers and 1 Million Connected Devices", Dec. 17, 2020.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 27 (Business Wire, "Samsara Recognized as one of North America's Fastest-Growing Companies on the 2022 Deloitte Technology Fast 500™", Nov. 16, 2022.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 28 (PRNewsire, "Samsara Named #2 on Financial Times' List of Fastest Growing Companies in the Americas", Apr. 13, 2021.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 29 (Business Wire, "Samsara Announces 200th Partner Integration with its Connected Operations Cloud; Becoming System of Record for Physical Operations", Sep. 13, 2022.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 5 pages.
Exhibit 30 (Pickle, S., "Samsara Recognized as a Best Workplace for Innovators", Samsara Inc., Jul. 2023. URL: https://www.samsara.com/blog/samsara-recognized-as-a-best-workplace-for-innovators) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 31 ("Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 32 ("Fast Facts: Electronic Logging Device (ELD) Rule", Federal Motor Carrier Safety Administration, U.S. Department of Transportation, Jun. 2017, Document No. FMCSA-ADO-17-003.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 3 pages.
Exhibit 33 (Kinney, J., "Timeline of the ELD Mandate: History & Important Dates", GPS Trackit, May 3, 2017. URL: https://gpstrackit.com/blog/a-timeline-of-the-eld-mandate-history-and-important-dates/) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 34 (24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 2 pages.
Exhibit 35 ("Apple Podcasts Preview—Grit Podcast—CEO Motive, Shoaib Makani w/ special guest Ilya Fushman: Powering the Physical Economy", Apple, Inc., [publication date unknown].) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 2 pages.
Exhibit 36 (Motive, "KeepTruckin Smart Dashcam" [video], Facebook, Jun. 6, 2018. URL: https://www.facebook.com/keeptrucking/videos/keeptrucking-smart-dashcam/10212841352048331/) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 37 (Motive, "Introducing the Motive Smart Dashcam", Motive Technologies, Inc., Jun. 6, 2018. URL: https://gomotive.com/blog/announcing-smart-dashcam) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 10 pages.
Exhibit 38 ("Spec Sheet: Smart Dashcam", Motive Technologies, Inc., [publication date unknown], Document No. 2022Q2_911703417.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 5 pages.
Exhibit 39 ("KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 5 pages.
Exhibit 40 ("KeepTruckin Rebrands as Motive, Launches Automated Operations Platform", Business Wire, Apr. 12, 2022. URL: https://www.businesswire.com/news/home/20220412005423/en/KeepTruckin-Rebrands-as-Motive-Launches-Automated-Operations-Platform) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 3 pages.
Exhibit 41 ("Product Brief: System Overview", Motive Technologies, Inc., [publication date unknown], Document No. 2022Q4_1203118185166511.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 42 (Photos of Accused Products "Motive: Vehicle Gateway" and "Motive: AI Dashcam".) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 5 pages.
Exhibit 43 (Motive Import Records Jan. 1, 2023-Jan. 19, 2024, Import Genius.) filed with Feb. 8, 2024 ITC Complaint, In the Matter of Certain Vehicle Telematics, Fleet Management, and

(56) References Cited

OTHER PUBLICATIONS

Video-Based Safety Systems, Devices, and Components thereof, Investigation No. 337-TA-3722, in 4 pages.
Exhibit 44 (Motive Import Records Jan. 19, 2018-Jan. 19, 2024, Import Genius.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 7 pages.
Exhibit 45 (Declaration of John McQueen in Support of the Complaint of Samsara Inc. Under Section 337 of the Tariff Act of 1930, filed In the Matter of Certain Vehicle Telematics, Fleet Management, and Video-Based Safety Systems, Devices, and Components thereof, Investigation No. 337-TA-3722, signed Feb. 7, 2024.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 11 pages.
Exhibit 46 (Motive, "Products | Platform—Everything you need to manage your fleet. In one place.", Motive Technologies, Inc., accessed on Feb. 7, 2024 [publication date unknown]. URL: https://gomotive.com/products/platform/) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 13 pages.
Exhibit 47 (Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score-) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 48 ("Guide: DRIVE risk score 101", Motive Technologies, Inc., [publication date unknown], Document No. 2022Q2_849898994.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 23 pages.
Exhibit 49 (Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 3 pages.
Exhibit 50 (Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 3 pages.
Exhibit 51 (Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 3 pages.
Exhibit 52 (Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 53 (Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 54 (Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 10 pages.
Exhibit 55 (Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 3 pages.
Exhibit 56 (Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 57 (Motive, "Products | AI Dashcam—Smart, accurate, and responsive AI dash cams.", Motive Technologies, Inc., [publication date unknown]. URL: https://gomotive.com/products/dashcam/) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 8 pages.
Exhibit 58 (Khan, M., "Why and How We Measure Driver Performance", Medium, Jan. 14, 2020. URL: https://medium.com/motive-eng/why-and-how-we-measure-driver-performance-768d5316fb2c#:~: text=By%20studying%20data%20gathered%20from,the%20driver%20a%20safety%20score) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 9 pages.
Exhibit 59 ("Vehicle Gateway", Samsara Inc., [publication date unknown]. URL: https://www.samsara.com/products/models/vehicle-gateway) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 60 (Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 61 (Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 62 (Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection) filed with Feb. 8, 2024 ITC Complaint, In the Matter of Certain Vehicle Telematics, Fleet Management, and

(56) References Cited

OTHER PUBLICATIONS

Video-Based Safety Systems, Devices, and Components thereof, Investigation No. 337-TA-3722, in 3 pages.
Exhibit 63 ("Front-Facing AI Dash Cam—CM31", Samsara Inc., accessed Feb. 7, 2024 [publication date unknown]. URL: https://www.samsara.com/products/models/cm31/) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 64 ("Dual-Facing AI Dash Cam—CM32", Samsara Inc., accessed Feb. 7, 2024 [publication date unknown]. URL: https://www.samsara.com/ca/products/models/cm32/) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 65 (Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 66 (Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 3 pages.
Exhibit 67 ("Connect your operations on the Samsara Platform.", Samsara Inc., [publication date unknown]. URL: https://www.samsara.com/products/platform/?gad_source=1&gclid=EAIaIQobChMI14DWIofYgwMVaymtBh36cwx9EAAYASAAEgKjUfD_BwE#impact1) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 5 pages.
Exhibit 68 (Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 5 pages.
Exhibit 69 (Samsara Support, "Safety Score Categories and Calculation", Samsara Inc., [publication date unknown]. URL: https://kb.samsara.com/hc/en-us/articles/360045237852-Safety-Score-Categoriesand-Calculation) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 4 pages.
Exhibit 70 (Samsara Safety Weight Recommendation Feature—Template) (Marked as Confidential and redacted in the Feb. 7, 2024 ITC Complaint) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 2 pages.
Exhibit 71 (Samsara Milestone 4: Safety Weight Recommendation) (Marks and Confidential and redacted in the Feb. 8, 2024 ITC Complaint) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 37 pages.
Exhibit 72 (Samsara PROD-Safety Score Onboarding & Configuration-200124-203030) (Marked as Confidential and redacted in the Feb. 8, 2024 ITC Complaint) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 11 pages.
Exhibit 73 (Samsara CV Rolling Stops) (Marked as Confidential and redacted in the Feb. 8, 2024 ITC Complaint) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 2 pages.
Exhibit 74 (Samsara Support, "Alert Triggers", Samsara Inc., accessed Feb. 7, 2024 [publication date unknown]. URL: https://kb.samsara.com/hc/en-us/articles/360043113772-Alert-Triggers) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 7 pages.
Exhibit 75 (Samsara Support, "Alert Configuration", Samsara Inc., accessed Feb. 7, 2024 [publication date unknown]. URL: https://kb.samsara.com/hc/en-us/articles/217296157-Alert-Configuration) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 6 pages.
Exhibit 76 (Jan. 24, 2024 Complaint, *Samsara Inc.* v. *Motive Technologies, Inc.,* Case No. 1:24-cv-00084-UNA.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 95 pages.
Exhibit 77 (Letter from Jay P. Lefkowitz, P.C. to Joseph G. Petrosinelli, Esq. regarding Motive Technologies, Inc.'s Unlawful Business Practices, dated Jan. 23, 2024.) filed with Feb. 8, 2024 ITC Complaint, In the Matter of Certain Vehicle Telematics, Fleet Management, and Video-Based Safety Systems, Devices, and Components thereof, Investigation No. 337-TA-3722, in 38 pages.
Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
"Transform your business with the Connected Operations ™ Cloud", Samsara Inc., accessed Feb. 21, 2024 [publication date unknown], in 8 pages. URL: https://www.samsara.com/products/platform/#impact0.
"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.
"Product Brief: System Overview", Motive Technologies, Inc., [publication date unknown], Document No. 2022Q4_1203118185166511, in 3 pages. URL: https://gomotive.com/content-library/guides/system-overview/.
Motive, "CEO Shoaib Makani's email to Motive employees.", Motive Technologies, Inc., Dec. 7, 2022, in 5 pages. URL: https://gomotive.com/blog/shoaib-makanis-message-to-employees/.

(56) References Cited

OTHER PUBLICATIONS

"EM21—Environmental Monitor", Samsara Inc., accessed Feb. 21, 2024 [publication date unknown], in 5 pages. URL: https://www.samsara.com/uk/products/models/em21/.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
"Cargo Monitor", Samsara Inc., accessed Feb. 21, 2024 [publication date unknown], in 2 pages. URL: https://www.samsara.com/products/models/cargo-monitor.
Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.
Motive, "Benchmarking AI Accuracy for Driver Safety" [video], YouTube, Apr. 21, 2022, screenshot in 1 page. URL: https://www.youtube.com/watch?v=brRt2h0J80E.
Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.
Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.
Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.
Feb. 23, 2024 Public Interest Statement of Proposed Respondent Motive Technologies, Inc., *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-3722, in 9 pages.
Feb. 28, 2024 Complainant's Reply to Public Interest Statement, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-3722, in 6 pages.
Feb. 29, 2024 Letter of First Supplement in ITC Complaint from Ellisen Shelton Turner, P.C. (Counsel for Complainant Samsara Inc.) to The Honorable Lisa R. Barton, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-3722, in 2 pages.
Mar. 12, 2024 Notice of Institution of Investigation, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 13 pages.
Mar. 20, 2024 Amended Complaint, *Samsara Inc.* v. *Motive Technologies, Inc.*, C.A. No. 1:24-cv-00084-MN, in 97 pages.
Driver I, The Power of Vision, Netradyne, [publication date unknown], in 2 pages.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-US/fleet-services/program-enhancements/speed-management-for-fleets.
"eco: Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"Fiat 500—2015 Owner's Manual", FC US Llc, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco: Drive system", Fleet World, 2010, in 3 pages. URL: https://fleetworld.co.uk/fiat-launches-fleet-specific-ecodrive-system/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Introduction Pack", Drivecam, Inc., 2012, in 32 pages. URL: https://www.iae- services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-US.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their Al Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.
"NetraDyne, an Artificial Intelligence Leader, Launches Driver-i™, a Vision-Based Platform, Focusing on Commercial Vehicle Driver Safety", Netradyne, [publication date unknown], in 2 pages.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pd f.
"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"The 2012 Fiat 500: eco: Drive", Fiat500USA.com, Feb. 14, 2011, in 24 pages. URL: http://www.fiat500usa.com/2011/02/2012-fiat-500-ecodrive.html.
"The World's Smartest 360° Dashcam: Vezo 360 - Fast Facts", Arvizon, [publication date unknown], in 7 pages. URL: https://cdn.newswire.com/files/x/5e/13/b92cd7c6259a708e1dfdaa0123c4.pdf.
"What is a ter-a-flop?", netradyne.com, [publication date unknown], in 2 pages.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.

(56) References Cited

OTHER PUBLICATIONS

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.
Armstrong, C. et al. "Transport Canada Commercial Bus HVEDR Feasibility Study (File No. T8080- 160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL- 20180804_English.pdf.
AutomotoTV, "Fiat ecoDrive System" [video], YouTube, Oct. 6, 2008,https://www.youtube.com/watch?v=AUSb2dBBI8E.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.
Bendix, "Bendix® Wingman ® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf (uploaded in 2 parts).
Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54. pdf.
Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam. pdf.
Dunn, B., "What is the Lytx DriveCam?", Autobytel, Jul. 12, 2014, in 1 page. URL: https://www.autobytel.com/what-is-lytx-drivecam.
Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
Fiatfranco, ""Ciao!" —Fiat ecoDrive" [video], YouTube, Sep. 10, 2007, screenshot in 1 page URL: https://www.youtube.com/watch?v=SluE9Zco55c.
Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.
Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Ginevra2008, "Fiat EcoDrive" [video], YouTube, Mar. 7, 2008, screenshot in 1 page. URL: https://www.youtube.com/watch?v=D95p9Bljr90.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Horsey, J., "Vezo 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial- intelligence-in-new-driver-safety-platform.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lytx, "TeenSafe Driver Program", American Family Insurance®, 2014, in 10 pages. URL: https://online-sd02.drivecam.com/Downloads/TSD_WebsiteGuide.pdf.
Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety - Event Keynote" [video], YouTube, Jul. 9, 2020, screenshot in 1 page. URL: https://www.youtube.com/watch?v=iMOab90w_CY.
Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver.i™ Catches No. Stop ad Stop Sign | Fleet Management Technology" [video], YouTube, Oct. 3, 2017, screenshot in 1 page. URL: https://www.youtube.com/watch?v=18sX3X02aJo.
Netradyne, "Driver.i™ Flags Commercial Driver Running Red Light—360-degree vi" [video], YouTube, Oct. 3, 2017, screenshot in 1 page. URL: https://www.youtube.com/watch?v=au9_ZNGYCmY.
Netradyne, Driver Card 1, 2018, in 2 pages.
Netradyne, Driver Card 2, 2018, in 2 pages.
Ohidan, A., "Fiat And AKQA Launch Eco: Drive ™", Science 2.0, Oct. 7, 2008, in 4 pages. URL: https://www.science20.com/newswire/fiat_and_akqa_launch_eco_drive_tm.
Puckett, T. et al. "Safety Track 4B- Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.
Soumik Ukil, " LightMetrics ADAS demo" [video], YouTube, Jul. 20, 2017, screenshot in 1 page. URL: https://www.youtube.com/watch?app=desktop&v=9LGz1007dTw.
Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Suppose U Drive, "New Trucking Tech: Forward Facing Cameras" supposeudrive.com, Mar. 15, 2019, in p. 7. URL: https://supposeudrive.com/new-trucking-tech-forward-facing-cameras/.

(56) References Cited

OTHER PUBLICATIONS

The Wayback Machine, "AT&T Fleet Complete—Give your Business a competitive advantage ", AT&T, 2019, in 12 pages. URL: https://web.archive.org/web/20190406125249/http:/att.fleetcomplete.com/.
The Wayback Machine, "Introducing Driver-| ™", NetraDyne, Sep. 22, 2016, in 4 pages URL: https://web.archive.org/web/20160922034006/http://www.netradyne.com/solutions.html.
The Wayback Machine, "NetraDyne's Driver-| ™ platform delivers results beyond legacy safety video systems Counting safe driving as safe driving -- taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 BIGGEST Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozSOE.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Jul. 22, 2024 Respondent Motive Technologies, Inc.'s Disclosure of Final Invalidity Contentions for U.S. Pat. Nos. 11,127,130, 11,190,373, and 11,611,621, *Samsara Inc.* v. *Motive Technologies, Inc.*, and including Exhibits A01 to A09, A12 to A15, and AAA, Exhibits B01 to B07, B09, B10, B12, B13, B15 to B17, Exhibits C01 to C10, C12 to C13, and C15 to C21, Ccc (exhibits cited separately herein), United States International Trade Commission, In the Matter of Certain Vehicle Telematics, Fleet Management, and Video-Based Safety Systems, Devices, and Components thereof, Investigation No. 337-TA-1393, in 351 pages.
Jul. 22, 2024 Respondent Motive Technologies, Inc.'s Disclosure of Final Invalidity Contentions for U.S. Pat. Nos. 11,127, 130, 11,190,373, and 11,611,621, Exhibit B01, *Samsara Inc.* v. Motive Technologies, Inc., United States International Trade Commission, In the Matter of Certain Vehicle Telematics, Fleet Management, and Video-Based Safety Systems, Devices, and Components thereof, Investigation No. 337-TA-1393, in 49 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit B02, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 35 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit B03, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 47 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit B04, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 45 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit B05, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 86 pages.
Jul. 22, 2024 Respondent Motive Technologies, Inc.'s Disclosure of Final Invalidity Contentions for U.S. Patent Nos. 11,127,130, 11,190,373, and 11,611,621, Exhibit B06, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 123 pages. [uploaded in 2 parts].
Jul. 22, 2024 Respondent Motive Technologies, Inc.'s Disclosure of Final Invalidity Contentions for U.S. Patent Nos. 11,127,130, 11,190,373, and 11,611,621, Exhibit B07, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 116 pages. [uploaded in 2 parts].
Jul. 22, 2024 Respondent Motive Technologies, Inc.'s Disclosure of Final Invalidity Contentions for U.S. Patent Nos. 11,127,130, 11,190,373, and 11,611,621, Exhibit B09, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 52 pages.
Jul. 22, 2024 Respondent Motive Technologies, Inc.'s Disclosure of Final Invalidity Contentions for U.S. Patent Nos. 11,127,130, 11,190,373, and 11,611,621, Exhibit B10, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 93 pages.
Jul. 22, 2024 Respondent Motive Technologies, Inc.'s Disclosure of Final Invalidity Contentions for U.S. Patent Nos. 11,127,130, 11,190,373, and 11,611,621, Exhibit B12, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 78 pages.
Jul. 22, 2024 Respondent Motive Technologies, Inc.'s Disclosure of Final Invalidity Contentions for U.S. Patent Nos. 11,127,130, 11,190,373, and 11,611,621, Exhibit B13, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 62 pages.
Jul. 22, 2024 Respondent Motive Technologies, Inc.'s Disclosure of Final Invalidity Contentions for U.S. Patent Nos. 11,127,130, 11,190,373, and 11,611,621, Exhibit B15, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 71 pages.
Jul. 22, 2024 Respondent Motive Technologies, Inc.'s Disclosure of Final Invalidity Contentions for U.S. Patent Nos. 11,127,130, 11,190,373, and 11,611,621, Exhibit B16, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 85 pages.
Jul. 22, 2024 Respondent Motive Technologies, Inc.'s Disclosure of Final Invalidity Contentions for U.S. Patent Nos. 11,127,130, 11, 190,373, and 11,611,621, Exhibit B17, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 36 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C01, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 164 pages. [uploaded in 2 parts].

(56) References Cited

OTHER PUBLICATIONS

Jul. 22, 2024 Respondent Motive Technologies, Inc.'s Disclosure of Final Invalidity Contentions for U.S. Pat. Nos. 11,127,130, 11,190,373, and 11,611,621, Exhibit C02, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 76 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit C03, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 45 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit C04, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 45 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C05, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 52 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C06, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 105 pages. [uploaded in 2 parts].
Jul. 22, 2024 Respondent Motive Technologies, Inc.'s Disclosure of Final Invalidity Contentions for U.S. Pat. Nos. 11,127,130, 11,190,373, and 11,611,621, Exhibit C07, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 56 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C08, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 67 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit C09, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 49 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C10, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 98 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C12, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 27 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C13, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 42 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C15, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 55 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C16, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 52 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C17, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 43 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit C18, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 23 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit C19, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 26 pages.
Jul. 22, 2024 Respondent Motive Technologies, Inc.'s Disclosure of Final Invalidity Contentions for U.S. Pat. Nos. 11,127, 130, 11, 190,373, and 11,611,621, Exhibit C20, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 70 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C21, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 57 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit CCC, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 123 pages. [uploaded in 2 parts].
Jul. 22, 2024 Respondent Motive Technologies, Inc.'s Disclosure of Final Invalidity Contentions for U.S. Pat. Nos. 11,127,130, 11, 190,373, and 11,611,621, Exhibit A01, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 66 pages.

(56) References Cited

OTHER PUBLICATIONS

Jul. 22, 2024 Respondent Motive Technologies, Inc.'s Disclosure of Final Invalidity Contentions for U.S. Pat. Nos. 11,127,130, 11, 190,373, and 11,611,621, Exhibit A02, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 95 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit A03, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 44 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit A04, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 80 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit A05, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 86 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit A06, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 41 pages.
Jul. 22, 2024 Respondent Motive Technologies, Inc.'s Disclosure of Final Invalidity Contentions for U.S. Pat. Nos. 11,127,130, 11, 190,373, and 11,611,621, Exhibit A07, *Samsara Inc.* v. *Motive Technologies, Inc*, United States International Trade Commission, In the Matter of Certain Vehicle Telematics, Fleet Management, and Video-Based Safety Systems, Devices, and Components thereof, Investigation No. 337-TA-1393, in 45 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit A08, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 14 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit A09, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 10 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit A12, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 63 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit A13, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 44 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit A14, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 19 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit A15, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 68 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit AAA, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 85 pages.
Jul. 12, 2024 Commission Investigative Staff's Responsive Claim Construction Brief, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 23 pages.
Jul. 12, 2024 Complainant Samsara Inc.'s Responsive Claim Construction Brief, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 36 pages.
Jul. 12, 2024 Respondent Motive Technologies, Inc.'s Responsive Claim Construction Brief, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 36 pages.
Batchelor, B. et al., "Vision Systems on the Internet", Proc. SPIE 6000, Two- and Three- Dimensional Methods for Inspection and Metrology III, Nov. 2005, vol. 600003, in 15 pages.
Bergasa, L. M. et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Camillo, J., "Machine Vision for Medical Device Assembly", Assembly, Mar. 3, 2015, in 5 pages. URL: https://www.assemblymag.com/articles/92730- machine-vision-for-medical-device-assembly.
Camillo, J., "Machine Vision for Medical Device Assembly", Assembly, Mar. 3, 2015, in 5 pages.
Chauhan, V. et al., "A Comparative Study of Machine Vision Based Methods for Fault Detection in an Automated Assembly Machine", Procedia Manufacturing, 2015, vol. 1, pp. 416-428.
Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.
Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.

(56) References Cited

OTHER PUBLICATIONS

D'Agostino, C et al., "Learning-Based Driving Events Recognition and Its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 17 pages (pp. 453-458). Downloaded from http://hdl.handle.net/10150/105299.

Ekström, L., "Estimating fuel consumption using regression and machine learning", KTH Royal Institute of Technology, Degree Project in Mathematics, 2018, in 126 pages.

Engelbrecht, J. et al., "A Survey of Smartphone-based Sensing in Vehicles for ITS Applications", IET Intelligent Transport Systems, Jul. 2015, vol. 9(10), in 23 pages.

Gilman, E. et al., "Personalised assistance for fuel-efficient driving", Transportation Research Part C, Mar. 2015, pp. 681-705.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Groover, M. P., "Chapter 22 Inspection Technologies", in Automation, Production Systems, and Computer-Integrated Manufacturing, 2015, 4th Edition, Pearson, pp. 647-684.

Groover, M. P., *Automation, Production Systems, and Computer-Integrated Manufacturing*, 2016, 4th Edition (Indian Subcontinent Adaptation), Pearson, in 11 pages.

Han, Z. et al., "Design of Intelligent Road Recognition and Warning System for Vehicles Based on Binocular Vision", IEEE Access, Oct. 2018, vol. 6, pp. 62880-62889.

Haworth, N. et al., "The Relationship between Fuel Economy and Safety Outcomes", Monash University, Accident Research Centre, Dec. 2001, Report No. 188, in 67 pages.

Huang, K.-Y. et al., "A Novel Machine Vision System for the Inspection of Micro-Spray Nozzle", Sensors, Jun. 2015, vol. 15(7), pp. 15326-15338.

Junior, J. F. et al., "Driver behavior profiling: An investigation with different smartphone sensors and machine learning", PloS One, Apr. 2017, vol. 12(4): e0174959, in 16 pages.

Kwon, Y. J. et al., "Automated Vision Inspection in Network-Based Production Environment", International Journal of Advanced Manufacturing Technology, Feb. 2009, vol. 45, pp. 81-90.

Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.

Lotan, T. et al., "In-Vehicle Data Recorder for Evaluation of Driving Behavior and Safety", Transportation Research Record Journal of the Transportation Research Board, Jan. 2006, in 15 pages.

MaLamas, Elias N. et al. "A survey on industrial vision systems, applications and tools", Image and Vision Computing, Dec. 28, 2002, vol. 21, pp. 171-188.

Meiring, G. et al., "A Review of Intelligent Driving Style Analysis Systems and Related Artificial Intelligence Algorithms", Sensors, Dec. 2015, vol. 15, pp. 30653-30682.

Mitrovic, D. et al., "Reliable Method for Driving Events Recognition", IEEE Transactions on Intelligent Transportation Systems, Jun. 2005, vol. 6(2), pp. 198-205.

Perez, L. et al., "Robot Guidance Using Machine Vision Techniques in Industrial Environments: A Comparative Review", Sensors, Mar. 2016, vol. 16(3), in 27 pages.

Ramkumar, S. M. et al., "Chapter 14 Web Based Automated Inspection and Quality Management", in Web-Based Control and Robotics Education, 2009, ed., Spyros G. Tzafestas, Springer, in 42 pages.

Tzafestas, S. G. (ed.), *Web-Based Control and Robotics Education*, 2009, Springer, ISBN 978-90-481-2504-3, in 362 pages. [uploaded in 3 parts].

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.

Steger, C et al., "Chapter 2 Image Acquisition" and "Chapter 3 Machine Vision Algorithms", in Machine Vision Algorithms and Applications, 2018, 2nd ed., Wiley, in 604 pages.

Steger, C. et al., *Machine Vision Algorithms and Applications*, 2018, 2nd ed., Wiley, in 60 pages.

Su, C.-C. et al., "Bayesian depth estimation from monocular natural images", Journal of Vision, 2017, vol. 17(5):22, pp. 1-29.

Sung, T.-W. et al., "A Speed Control Scheme of Eco-Driving at Road Intersections", 2015 Third International Conference on Robot, Vision and Signal Processing, 2015, pp. 51-54.

Vlahogianni, E. et al., "Driving analytics using smartphones: Algorithms, comparisons and challenges", Transportation Research Part C, Jun. 2017, vol. 79, pp. 196-206.

Wahlstrom, J. et al., "Smartphone-based Vehicle Telematics - A Ten-Year Anniversary", IEEE Transactions on Intelligent Transportation Systems, Nov. 2016, vol. 18(10), in 23 pages.

Yufeng, Z. et al., "3G-Based Specialty Vehicles Real-Time Monitoring System", Applied Mechanics and Materials, Feb. 2014, vols. 513-517, pp. 871-875.

Yufeng, Z. et al., "3G-Based Specialty Vehicles Real-Time Monitoring System", Applied Mechanics and Materials, Feb. 2014, vols. 513-517, pp. 871-875, in 7 pages.

Zanini, M. et al., "Mobile Assets Monitoring for Fleet Maintenance", SAE International, Apr. 11-14, 2005, in 9 pages.

Zanini, M. et al., "Mobile Assets Monitoring for Fleet Maintenance", SAE International, 2005, pp. 369-375, in 8 pages.

Zhong, R. Y. et al., "Intelligent Manufacturing in the Context of Industry 4.0: A Review", Engineering, Oct. 2017, vol. 3, Issue 5, pp. 616-630.

Apr. 22, 2024 Respondent Motive's Response to Samsara's Complaint and to the Notice of Investigation, *Samsara Inc*. v. *Motive Technologies, Inc*., United States International Trade Commission, In the Matter of Certain Vehicle Telematics, Fleet Management, and Video-Based Safety Systems, Devices, and Components thereof, Investigation No. 337-TA-1393, in 34 pages.

May 2, 2024 Exhibit A to Motive's Response to Complaint, *Samsara Inc*. v. *Motive Technologies, Inc*., United States International Trade Commission, In the Matter of Certain Vehicle Telematics, Fleet Management, and Video-Based Safety Systems, Devices, and Components thereof, Investigation No. 337-TA-1393, in 6 pages.

Apr. 22, 2024 Exhibit B to Motive's Response to Complaint, *Samsara Inc*. v. *Motive Technologies, Inc*., United States International Trade Commission, In the Matter of Certain Vehicle Telematics, Fleet Management, and Video-Based Safety Systems, Devices, and Components thereof, Investigation No. 337-TA-1393, in 14 pages.

May 30, 2024 Motive Technologies, Inc.'s Notice of Prior Art, *Samsara Inc*. v. *Motive Technologies, Inc*., United States International Trade Commission, In the Matter of Certain Vehicle Telematics, Fleet Management, and Video-Based Safety Systems, Devices, and Components thereof, Investigation No. 337-TA-1393, in 78 pages.

May 30, 2024 Respondent Motive Technologies, Inc.'s Disclosure of Initial Invalidity Contentions for U.S. Patent Nos. 11, 127, 130, 11,190,373, and 11,611,621, and including Exhibits A1-A15, Aaa, B1-B17, C1-C20, and CCC (exhibits cited separately herein), *Samsara Inc*. v. *Motive Technologies, Inc*., United States International Trade Commission, In the Matter of Certain Vehicle Telematics, Fleet Management, and Video-Based Safety Systems, Devices, and Components thereof, Investigation No. 337-TA-1393, in 154 pages.

May 30, 2024 Respondent Motive Technologies, Inc.'s Disclosure of Initial Invalidity Contentions for U.S. Patent Nos. 11, 127,130, 11,190,373, and 11,611,621, Exhibit B01, *Samsara Inc*. v. *Motive*

(56) References Cited

OTHER PUBLICATIONS

*Technologies, Inc.*, United States International Trade Commission, In the Matter of Certain Vehicle Telematics, Fleet Management, and Video-Based Safety Systems, Devices, and Components thereof, Investigation No. 337-TA-1393, in 49 pages.

May 30, 2024 Respondent Motive Technologies, Inc.'s Disclosure of Initial Invalidity Contentions for U.S. Patent Nos. 11,127,130, 11,190,373, and 11,611,621, Exhibit B02, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 35 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B03, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 43 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B04, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 45 pages.

May 30, 2024 Respondent Motive Technologies, Inc.'s Disclosure of Initial Invalidity Contentions for U.S. Pat. Nos. 11, 127,130, 11,190,373, and 11,611,621, Exhibit B05, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 76 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B06, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 108 pages. [uploaded in 2 parts].

May 30, 2024 Respondent Motive Technologies, Inc.'s Disclosure of Initial Invalidity Contentions for U.S. Pat. Nos. 11,127,130, 11,190,373, and 11,611,621, Exhibit B07, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 92 pages. [uploaded in 2 parts].

May 30, 2024 Respondent Motive Technologies, Inc.'s Disclosure of Initial Invalidity Contentions for U.S. Pat. Nos. 11,127,130, 11,190,373, and 11,611,621, Exhibit B09, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 52 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B10, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 75 pages.

May 30, 2024 Respondent Motive Technologies, Inc.'s Disclosure of Initial Invalidity Contentions for U.S. Pat. Nos. 11,127, 130, 11,190,373, and 11,611,621, Exhibit B12, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 62 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B13, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 39 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B14, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 21 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B15, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 71 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B16, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 79 pages.

May 30, 2024 Respondent Motive Technologies, Inc.'s Disclosure of Initial Invalidity Contentions for U.S. Pat. Nos. 11,127,130, 11,190,373, and 11,611,621, Exhibit B17, *Samsara Inc*. v. *Motive Technologies*, United States International Trade Commission, In the Matter of Certain Vehicle Telematics, Fleet Management, and Video-Based Safety Systems, Devices, and Components thereof, Investigation No. 337-TA-1393, in 36 pages.

May 30, 2024 Respondent Motive Technologies, Inc.'s Disclosure of Initial Invalidity Contentions for U.S. Pat. Nos. 11,127,130, 11,190,373, and 11,611,621, Exhibit C01, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 160 pages. [uploaded in 2 parts].

May 30, 2024 Respondent Motive Technologies, Inc.'s Disclosure of Initial Invalidity Contentions for U.S. Pat. Nos. 11,127, 130, 11,190,373, and 11,611,621, Exhibit C02, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 76 pages.

May 30, 2024 Respondent Motive Technologies, Inc.'s Disclosure of Initial Invalidity Contentions for U.S. Pat. Nos. 11,127,130, 11,190,373, and 11,611,621, Exhibit C03, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 45 pages.

May 30, 2024 Respondent Motive Technologies, Inc.'s Disclosure of Initial Invalidity Contentions for U.S. Pat. Nos. 11,127,130, 11,190,373, and 11,611,621, Exhibit C04, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 45 pages.

May 30, 2024 Respondent Motive Technologies, Inc.'s Disclosure of Initial Invalidity Contentions for U.S. Pat. Nos. 11,127,130, 11,190,373, and 11,611,621, Exhibit C05, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 52 pages.

May 30, 2024 Respondent Motive Technologies, Inc.'s Disclosure of Initial Invalidity Contentions for U.S. Pat. Nos. 11,127,130, 11,190,373, and 11,611,621, Exhibit C06, *Samsara Inc*. v. *Motive Technologies, Inc.*, United States International Trade Commission, In the Matter of Certain Vehicle Telematics, Fleet Management, and

(56) References Cited

OTHER PUBLICATIONS

Video-Based Safety Systems, Devices, and Components thereof, Investigation No. 337-TA-1393, in 98 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C07, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 52 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C08, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 67 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C09, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 46 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C10, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 98 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C12, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 27 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C13, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 42 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C15, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 55 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C16, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 52 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C17, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 43 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C18, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 23 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C19, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 26 pages.
May 30, 2024 Respondent Motive Technologies, Inc.'s Disclosure of Initial Invalidity Contentions for U.S. Pat. Nos. 11,127,130, 11,190,373, and 11,611,621, Exhibit C20, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 67 pages.
May 30, 2024 Respondent Motive Technologies, Inc.'s Disclosure of Initial Invalidity Contentions for U.S. Pat. Nos. 11,127,130, 11,190,373, and 11,611,621, Exhibit CCC, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 122 pages. [uploaded in 2 parts].
May 30, 2024 Respondent Motive Technologies, Inc.'s Disclosure of Initial Invalidity Contentions for U.S. Pat. Nos. 11,127,130, 11,190,373, and 11,611,621, Exhibit A01, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 62 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A02, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 93 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A03, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 43 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A04, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 76 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A05, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 40 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A06, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 40 pages.
May 30, 2024 Respondent Motive Technologies, Inc.'s Disclosure of Initial Invalidity Contentions for U.S. Pat. Nos. 11, 127,130, 11,190,373, and 11,611,621, Exhibit A07, *Samsara Inc*. v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 45 pages.

(56) References Cited

OTHER PUBLICATIONS

May 30, 2024 Respondent Motive Technologies, Inc.'s Disclosure of Initial Invalidity Contentions for U.S. Pat. Nos. 11,127,130, 11,190,373, and 11,611,621, Exhibit A08, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 14 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A09, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 10 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A12, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 63 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A13, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 44 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A14, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 19 pages.
May 30, 2024 Respondent Motive Technologies, Inc.'s Disclosure of Initial Invalidity Contentions for U.S. Pat. Nos. 11,127,130, 11,190,373, and 11,611,621, Exhibit A15, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 68 pages.
May 30, 2024 Respondent Motive Technologies, Inc.'s Disclosure of Initial Invalidity Contentions for U.S. Pat. Nos. 11,127,130, 11,190,373, and 11,611,621, Exhibit AAA, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 85 pages.
Jun. 21, 2024 Joint Claim Construction Chart, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 7 pages.
Jun. 28, 2024 Commission Investigative Staff's Opening Claim Construction Brief, *Samsara Inc.* v. *Motive Technologies, Inc.*, and including Exhibits SMX-1 to SMX-5 (exhibits cited separately herein), United States International Trade Commission, In the Matter of Certain Vehicle Telematics, Fleet Management, and Video-Based Safety Systems, Devices, and Components thereof, Investigation No. 337-TA-1393, in 45 pages.
Jun. 28, 2024 Commission Investigative Staff's Opening Claim Construction Brief, Exhibits SMX-1 to SMX-5, *Samsara Inc.* v. *Motive Technologies, Inc*, United States International Trade Commission, In the Matter of Certain Vehicle Telematics, Fleet Management, and Video-Based Safety Systems, Devices, and Components thereof, Investigation No. 337-TA-1393, in 82 pages.
Jun. 28, 2024 Complainant Samsara Inc.'s Opening Claim Construction Brief, *Samsara Inc.* v. *Motive Technologies, Inc.*, and including Exhibits JMX-1 to JMX-3 and Exhibits CMX-1 to CMX-5 (exhibits cited separately herein), United States International Trade Commission, In the Matter of Certain Vehicle Telematics, Fleet Management, and Video-Based Safety Systems, Devices, and Components thereof, Investigation No. 337-TA-1393, in 40 pages.
Jun. 28, 2024 Complainant Samsara Inc.'s Opening Claim Construction Brief, Exhibits JMX-1 to JMX-3 and Exhibits CMX-1 to CMX-5, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 249 pages. [uploaded in 2 parts].
Jul. 1, 2024 Respondent Motive Technologies, Inc.'s Claim Construction Brief, *Samsara Inc.* v. *Motive Technologies, Inc.*, and including Exhibits RMX-0001 to RMX-0013 (exhibits cited separately herein), United States International Trade Commission, In the Matter of Certain Vehicle Telematics, Fleet Management, and Video-Based Safety Systems, Devices, and Components thereof, Investigation No. 337-TA-1393, in 41 pages.
Jul. 1, 2024 Respondent Motive Technologies, Inc.'s Claim Construction Brief, Exhibits RMX-0001 to RMX-0013, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 119 pages.
Nov. 6, 2024 Complainant's Pre-Hearing Brief, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 783 pages.
Nov. 6, 2024 Order No. 43: Denying Samsara's Motion to Strike (Motion No. 1393-034) and Denying Motive's Motion In Limine No. 2 (Motion No. 1393-032), *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 8 pages.
Nov. 7, 2024 Respondent Motive's Opposition to Complainant Samsara Inc.'s Motion In Limine No. 4: Motion to Exclude Improper Evidence and Argument regarding Drive Score V1 [Dkt. No. 1393-029], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 15 pages.
Nov. 7, 2024 Respondent's Opposition to Complainant's Motion In Limine No. 2: Motion to Exclude Improper Anticipation and Obviousness Opinions of Dr. Robert Stevenson [Dkt. No. 1393-033], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 19 pages.
Nov. 7, 2024 Respondent's Pre-Hearing Brief, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 855 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit B08 [redacted], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 55 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit C11 [redacted], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 100 pages.

(56) References Cited

OTHER PUBLICATIONS

Jul. 22, 2024 Respondent Motive Technologies, Inc.'s Disclosure of Final Invalidity Contentions for U.S. Pat. Nos. 11,127,130, 11,190,373, and 11,611,621, Exhibit C14 [redacted], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 42 pages.
Jul. 22, 2024 Respondent Motive Technologies, Inc.'s Disclosure of Final Invalidity Contentions for U.S. Pat. Nos. 11,127,130, 11,190,373, and 11,611,621, Exhibit B11 [redacted], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 37 pages.
Aug. 22, 2024 Complainant Samsara Inc.'s Motion to Strike Respondent's Untimely Contentions regarding: (1) Alleged Redesigns; (2) "Drive Score" Invalidity Theory; (3) Certain Obviousness Combinations; and (4) Unpursued Indefiniteness Theories, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 41 pages.
Sep. 3, 2024 Motive Technologies, Inc.'s Response to Samsara Inc.'s Motion to Strike Respondent's Untimely Contentions regarding: (1) Alleged Redesigns; (2) "Drive Score" Invalidity Theory; (3) Certain Obviousness Combinations; and (4) Unpursued Indefiniteness Theories, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 35 pages.
Sep. 6, 2024 Commission Investigative Staff's Response to Complainant Samsara Inc.'s Motion to Strike Certain of Respondent's Contentions, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 23 pages.
Sep. 6, 2024 Samsara Inc.'s Reply Brief In Support of Its Motion to Strike Respondent's Untimely Contentions, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 16 pages.
Sep. 17, 2024 Construing Claim Terms, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 40 pages.
Sep. 23, 2024 Memorandum of Points and Authorities in Support of Respondent's Motion for Summary Determination of Subject Matter Ineligibility, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 39 pages.
Oct. 8, 2024 Respondent's Response to Complainant's Motion for Summary Determination [Dkt. No. 1393-016], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 29 pages.
Oct. 9, 2024 Commission Investigative Staff's Response to Complainant's Motion for Summary Determination [Mot. Dkt. No. 1393-016], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 24 pages.
Oct. 9, 2024 Commission Investigative Staff's Response to Respondent's Motion for Summary Determination of Subject Matter Ineligibility and Respondent's Request for Oral Argument [Mot. Dkt. No. 1393-015], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 31 pages.
Oct. 10, 2024 Complainant's Opposition to Respondent's Motion for Summary Determination of Subject Matter Ineligibility (Mot. 1393-015), *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 39 pages.
Oct. 10, 2024 Complainant's Reply In Support of its Motion for Summary Determination that Samsara Satisfies the Economic Prong of the Domestic Industry Requirement, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 15 pages.
Oct. 11, 2024 Respondent's Motion to Strike Portions of the Expert Reports of Steven Goldberg, Ph.D. and Christopher Bakewell, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 40 pages.
Oct. 14, 2024 Complainant Samsara Inc.'s Unopposed Motion to Terminate Investigation as to some Claims of the Asserted Patents, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 4 pages.
Oct. 15, 2024 Commission Investigative Staff's Response to Complainant's Motion to Terminate Investigation as to some Claims of the Asserted Patents (Mot. Dkt. No. 1393-026), *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 7 pages.
Oct. 15, 2024 Respondent's Reply in Support of its Motion for Summary Determination of Subject Matter Ineligibility [Dkt. No. 1393-015], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 48 pages.
Oct. 17, 2024 Order No. 29: Initial Determination Granting Samsara's Motion for Partial Termination of this Investigation as to Certain Claims, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 3 pages.
Oct. 25, 2024 Order No. 35: Denying Motive's Motion for Summary Determination, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 5 pages.
Oct. 30, 2024 Complainant's Motion In Limine No. 2: Motion to Exclude Improper Anticipation and Obviousness Opinions of Dr. Robert Stevenson, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 16 pages.
Oct. 30, 2024 Complainant's Opposition to Respondent's Motion to Strike Portions of the Expert Reports of Steven Goldberg, Ph.D. and Christopher Bakewell, *Samsara Inc.* v. *Motive Technologies, Inc.*,

(56) References Cited

OTHER PUBLICATIONS

United States International Trade Commission, In the Matter of Certain Vehicle Telematics, Fleet Management, and Video-Based Safety Systems, Devices, and Components thereof, Investigation No. 337-TA-1393, in 42 pages.

Oct. 30, 2024 Complainant's Motion to Strike, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 26 pages.

Oct. 31, 2024 Motive's Motion In Limine No. 4 to preclude Samsara from presenting Untimely Expert Opinion, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 16 pages.

Oct. 31, 2024 Respondent's Motion In Limine No. 1 to Exclude Alleged Secondary Considerations of Non- Obviousness, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 31 pages.

Nov. 5, 2024 Notice of a Commission Determination not to Review Initial Determination granting Complainant's Unopposed Motion for Partial Termination by Withdrawal of Certain Patent Claims, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 2 pages.

Nov. 5, 2024 Complainant's Corrected Opposition to Respondent's Motion to Strike Portions of the Expert Reports of Steven Goldberg, Ph.D. and Christopher Bakewell, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 42 pages.

Nov. 5, 2024 Motive's Motion In Limine No. 2 to Preclude Samsara's Improper Claim Construction, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 21 pages.

Nov. 5, 2024 Motive's Motion In Limine No. 3 to Preclude Samsara from Presenting Untimely Contentions, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 12 pages.

Nov. 5, 2024 Order No. 42: Regarding Certain Motions In Limine, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 8 pages.

Nov. 9, 2024 Complainant's Opposition to Motion In Limine No. 2 (Mtn. Dkt. 1393-032), *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 26 pages.

Nov. 12, 2024 Commission Investigative Staff's Pre-Hearing Brief, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 212 pages.

Nov. 12, 2024 Commission Investigative Staff's Response to Complainant's Motion to Strike [Mot. Dkt. No. 1393-034], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 19 pages.

Nov. 13, 2024 Commission Investigative Staff's Omnibus Response to Respondent's Motions In Limine [Mot. Dkt. Nos. 1393-028; 1393-032; 1393-035; 1393-030], *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 18 pages.

Nov. 13, 2024 Complainant Samsara Inc.'s Unopposed Motion to Terminate Investigation as to Some Claims of the Asserted Patents, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 4 pages.

Nov. 14, 2024 Complainant Samsara Inc.'s Unopposed Motion to Terminate Investigation as to Some Claims of the Asserted Patents, *Samsara Inc.* v. *Motive Technologies, Inc.*, United States International Trade Commission, In the Matter of Certain Vehicle Telematics, Fleet Management, and Video-Based Safety Systems, Devices, and Components thereof, Investigation No. 337-TA-1393, in 5 pages.

"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).

"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.

"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.

"Fuelopps" [archived webpage], Propel It, archived on Nov. 14, 2017, in 3 pages. URL: https://web.archive.org/web/20171114184116/http://www.propelit.net:80/fuelopps2.

"Fuelopps", Propel It, [publication date unknown], in 1 page. (PROPEL-IT-1393_00001).

"FuelOpps™ Delivers for Covenant Transportation Group—Improved driver behavior contributes to a 3+% MPG improvement in less than 12 months", FuelOpps by Propel IT, [publication date unknown], in 2 pages.

"FuelOpps™ Version 2.0" [presentation], Propel IT, Inc., [publication date unknown], in 17 pages.

"Our Products" [archived webpage], Propel It, archived on Aug. 3, 2018, in 2 pages. URL: https://web.archive.org/web/20180803052120/http://www.propelit.net:80/our-products-1.

"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).

"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).

"Safetyopps" [archived webpage], Propel It, archived on Nov. 14, 2017, in 3 pages. URL: https://web.archive.org/web/20171114183538/http://www.propelit.net:80/safetyopps2.

"Safetyopps", Propel It, [publication date unknown], in 1 page. (PROPEL-IT-1393_00019).

Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.

Netradyne, Warnings, [publication date unknown], (filed in: In the Matter of Certain Vehicle Telematics, Fleet Management, and Video-Based Safety Systems, Devices, and Components thereof,

(56) References Cited

OTHER PUBLICATIONS

Investigation No. 337-TA-1393, complaint filed Feb. 8, 2024), in 2 pages (ND_ITC_0005 - ND_ITC_0006).

* cited by examiner

VEHICLE GATEWAY DEVICE AND INTERACTIVE GRAPHICAL USER INTERFACES ASSOCIATED THEREWITH

INCORPORATION BY REFERENCE TO ANY PRIORITY APPLICATIONS

This application is a continuation of U.S. patent application Ser. No. 17/452,326, filed Oct. 26, 2021, and titled "VEHICLE GATEWAY DEVICE AND INTERACTIVE GRAPHICAL USER INTERFACES ASSOCIATED THEREWITH," which application is a continuation of U.S. patent application Ser. No. 17/242,919, filed Apr. 28, 2021, and titled "VEHICLE GATEWAY DEVICE AND INTERACTIVE GRAPHICAL USER INTERFACES ASSOCIATED THEREWITH," which application claims benefit of U.S. Provisional Patent Application No. 63/018,758, filed May 1, 2020, and titled "VEHICLE GATEWAY DEVICE AND INTERACTIVE GRAPHICAL USER INTERFACES ASSOCIATED THEREWITH." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

Embodiments of the present disclosure relate to vehicle gateway devices, sensors, systems, and methods that allow for efficient monitoring, management, data acquisition, and data processing for vehicles and/or fleets. Embodiments of the present disclosure further relate to devices, systems, and methods that provide interactive graphical user interfaces for vehicle and/or fleet monitoring and management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Most modern vehicles have a vehicle bus. A vehicle bus is an internal communications network that connects components, such as a car's electronic controllers, within a vehicle. Example protocols that a vehicle bus can use include, but are not limited to, Controller Area Network (CAN), Local Interconnect Network (LIN), OBD-II or OBD2, and/or J1939. The vehicle bus can have an interface that enables an external device to access the vehicle's electronic controllers. In particular, the external device can access vehicle diagnostics, such as fuel level, engine revolutions per minute (RPM), speed, engine torque, engine load, brake use, etc. The vehicle diagnostic data can be voluminous. Moreover, the vehicle diagnostic data can be retrieved substantially in real-time and at a high frequency, such as every millisecond. Additional devices that can collect data from a vehicle include cameras and sensors, such as dashboard cameras and temperature monitors.

SUMMARY

The systems, methods, and devices described herein each have several aspects, no single one of which is solely responsible for its desirable attributes. Without limiting the scope of this disclosure, several non-limiting features will now be described briefly.

Commercial vehicle fleets use large amounts of fuel and energy. Due to the complexity and diversity of the activities of vehicles in a commercial fleet, it can be very difficult to determine why and how the fuel and energy are used, let alone how to increase the efficiency with which the fuel and energy are used. Additionally, the data related to the activities of vehicles in a commercial fleet can be voluminous. Therefore, just collecting the data related to those activities can be very technically difficult.

Advantageously, various embodiments of the present disclosure may overcome various disadvantages of prior systems and methods. A vehicle gateway device can be attached to each vehicle in the fleet. The vehicle gateway gathers data related to operation of the vehicle, in addition to location data and other data related to the vehicle. The vehicle gateway device gathers vehicle metric data from the vehicle (e.g., every millisecond). The gathered metric data can be bucketed and aggregated over time, and periodically (e.g., every 5 minutes) the bucketed data, along with location data and other data related to the vehicle, can be transmitted to a management server.

The management server can receive the data from the vehicle gateway devices for many vehicles and over extended periods of time. The management server can aggregate and analyze the received data in various ways. For example, data may be analyzed per vehicle, per vehicle characteristic, per driver, per driver characteristic, per fleet, per cohort, or the like. The data may be used to determine vehicle fuel/energy efficiencies, correlations among vehicle metrics and fuel/energy efficiencies, a fuel/energy efficiency score, safety measurements, correlations among vehicle metrics and safety measurements, a safety score, among others. Additionally, comparisons, trends, correlations, recommendations, route optimizations, and the like may be determined. Further, reports, alerts, and various interactive graphical user interfaces may be generated.

According to various embodiments of the present disclosure, a vehicle gateway device can receive, over a period of time, raw vehicle data via a vehicle interface with a vehicle. An example period of time could be one, two, or five minutes. Example vehicle interfaces can include, but are not limited to, J1939 or OBD2. The vehicle gateway device can determine vehicle metrics from the raw vehicle data. Example vehicle metrics can include or be related to fuel level, engine RPM, traveling speed, traveling distance, traveling time, accelerator use/position, brake use, cruise control use, coasting, idling, etc. The vehicle gateway device can determine corresponding vehicle metric buckets for each of the vehicle metrics. In the case of an engine RPM metric, example buckets can include a 0-800 RPM bucket, an 800-1700 RPM bucket, and a greater than 1700 RPM bucket. In the case of a cruise control metric, example buckets can include a cruise-control "on" bucket and a cruise-control "off" bucket. In various implementations, other buckets/ranges maybe used for engine RPM, cruise control, and/or any other metrics. Further, in various implementations the buckets/ranges for any of the metrics may be configurable or customizable by a user, and/or the buckets/ranges for any of the metrics may be determined or customized by the system based on a characteristic of the vehicle (e.g., a type of the vehicle, a make of the vehicle, a model of the vehicle, and/or the like). Additional example vehicle metric buckets are described in further detail below. The vehicle gateway device can aggregate, over the period of time, the vehicle metrics into the corresponding vehicle metric buckets to generate aggregated bucketed vehicle metric data. In the engine RPM metric example with a time period of five minutes, the vehicle gateway device can aggregate one minute and thirty seconds in the 0-800 RPM bucket and the remaining time in the 800-1700 RPM bucket. In response to determining that an aggregation time threshold is met, the vehicle gateway device can transmit, to a receiving server system, the aggregated bucketed vehicle metric data.

According to various embodiments of the present disclosure, a system can include a vehicle gateway device and a computing device. The vehicle gateway device can be configured to gather and transmit vehicle metric data associated with a first vehicle. The computing device can be configured to receive vehicle metric data from vehicle gateway devices associated with respective vehicles. The computing device can determine, from the vehicle metric data, fuel/energy usage of the plurality of vehicles over various periods of time. The computing device can determine correlations among one or more other vehicle metrics and the fuel/energy usage of the plurality of vehicles over the various periods of time. The computing device can determine weightings of the one or more other vehicle metrics based at least in part on the determined correlations. The computing device can receive, from the vehicle gateway device, the vehicle metric data associated with the first vehicle. The computing device can determine, based on the determined weightings and the vehicle metric data, a fuel/energy efficiency score associated with the first vehicle. The computing device can cause the fuel/energy efficiency score to be provided in an alert, report, or interactive graphical user interface.

According to various embodiments of the present disclosure, a system can include a vehicle gateway device and a computing device. The vehicle gateway device can be configured to gather and transmit vehicle metric data associated with a first vehicle. The computing device can be configured to receive vehicle metric data from vehicle gateway devices associated with respective vehicles. The computing device can determine, from driver history data, safety of the vehicles over various periods of time. The computing device can determine correlations among one or more vehicle metrics from the vehicle metric data and the safety of the plurality of vehicles over the various periods of time. The computing device can determine weightings of the one or more other vehicle metrics based at least in part on the determined correlations. The computing device can receive, from the vehicle gateway device, the vehicle metric data associated with the first vehicle. The computing device can determine, based on the determined weightings and the vehicle metric data, a safety score associated with the first vehicle. The computing device can cause the safety score to be provided in an alert, report, or interactive graphical user interface.

According to various embodiments of the present disclosure, a system can include a vehicle gateway device and a computing device. The vehicle gateway device can be configured to gather and transmit vehicle metric data associated with a vehicle. The computing device can be configured to receive the vehicle metric data from the vehicle gateway device. The computing device can receive, from the vehicle gateway device, first vehicle metric data associated with the vehicle. The computing device can receive, such as by accessing, a plurality of vehicle metric data for the vehicle. The plurality of vehicle metric data can be for one or more periods of time that are different than the period of time for the first vehicle metric data. The computing device can generate aggregated vehicle metric data from the plurality of vehicle metric data and the first vehicle metric data based on some filtering criteria. Example filtering criteria can include one or more specific period of times and/or one or more specific vehicle metrics. The computing device can determine, from the aggregated vehicle metric data, a plurality of fuel/energy efficiency indicators. Example fuel/energy efficiency indicators can indicate, but are not limited to indicating, cruise control use, use of coasting, a particular type of use of the accelerator pedal, idling, braking anticipation (which may be referred to herein generally as "anticipation"), and/or particular RPM range(s), which can be represented as a percentage or some other indicator. The computing device can determine, based on weightings and the plurality of fuel/energy efficiency indicators, a fuel/energy efficiency score associated with the vehicle. The computing device can cause the fuel/energy efficiency score to be provided in an alert, report, or interactive graphical user interface.

According to various embodiments of the present disclosure, a system can include a vehicle gateway device and a computing device. The vehicle gateway device can be configured to gather and transmit vehicle metric data associated with a vehicle. The computing device can be configured to receive the vehicle metric data from the vehicle gateway device. The computing device can receive, from the vehicle gateway device, first vehicle metric data associated with the vehicle. The computing device can receive, such as by accessing, a plurality of vehicle metric data for the vehicle. The plurality of vehicle metric data can be for one or more periods of time that are different than the period of time for the first vehicle metric data. The computing device can generate aggregated vehicle metric data from the plurality of vehicle metric data and the first vehicle metric data based on some filtering criteria. Example filtering criteria can include one or more specific period of times and/or one or more specific vehicle metrics. The computing device can determine, from the aggregated vehicle metric data, a plurality of safety indicators. Example safety indicators can indicate, but are not limited to indicating, cruise control use, a particular type of use of the accelerator pedal, vehicle speed, and/or anticipation, which can be represented as a percentage or some other indicator. The computing device can determine, based on weightings and the plurality of fuel/energy efficiency indicators, a fuel/energy efficiency score associated with the vehicle. The computing device can cause the fuel/energy efficiency score to be provided in an alert, report, or interactive graphical user interface.

In various embodiments, the vehicle gateway device can decode or translate the raw vehicle data based at least in part on rules specifically related to the vehicle. The vehicle gateway device can store the vehicle metrics.

In various embodiments, the vehicle gateway device can determine, over the period of time, location data. Further in response to determining that the aggregation time threshold is met, the vehicle gateway device can transmit, to the receiving server system, the location data.

In various embodiments, the vehicle gateway device can receive, over the period of time, additional data from one or more sensor devices. Further in response to determining that the aggregation time threshold is met, the vehicle gateway device can transmit, to the receiving server system, the additional data.

In various embodiments, the vehicle metrics can be associated with at least one of: cruise control, coasting, accelerator pedal, idling, battery state, anticipation, engine rotations per minute, motor rotations per minute, or motor power. The vehicle metric buckets associated with cruise control can include at least: cruise control on, and cruise control off. The vehicle metric buckets associated with coasting can include at least: coasting true, and coasting false. The vehicle metric bucket of coasting true can be determined when each of the following is true: engine torque is zero, vehicle speed is greater than zero, brake pedal is not engaged, and accelerator pedal is not engaged. The vehicle metric buckets associated with the accelerator pedal can include at least: accelerator pedal engagement over 95 percent, and accelerator pedal engagement less than or equal to 95 percent. The vehicle metric bucket of accelerator pedal engagement over 95 percent can be determined based on at least one of: engine torque, or engine load. The vehicle metric buckets associated with idling can include at least: idle true, and idle false. The vehicle metric buckets associated with anticipation can include at least: any brake event, and quick brake event. The vehicle metric bucket of quick brake event can be determined when the accelerator pedal is disengaged and the brake pedal is subsequently engaged in approximately less than one second. The vehicle metric buckets associated with engine rotations per minute (RPM) can include at least one of: an RPM band of approximately 800-1700 RPM, or an RPM band starting from a low of approximately 700-900 RPM to a high of approximately 1600-1800 RPM. The vehicle metrics can include at least accelerator pedal engagements over 95 percent and quick brake events. Quick brake events can be determined when the accelerator pedal is disengaged and the brake pedal is subsequently engaged in approximately less than one second.

In various embodiments, the determined weightings are further customizable by a user. The vehicles can be related to the first vehicle by at least one of: a vehicle characteristic, a driver, a driver characteristic, a fleet, or a cohort.

According to various embodiments of the present disclosure, a system can include a computing device. The system can further include a vehicle gateway device. The computing device and/or the vehicle gateway device can include a computer readable storage medium having program instructions embodied therewith; and one or more processors configured to execute the program instructions to cause the computing device to perform any of the aspects described above and/or below.

The vehicle gateway device can be configured to transmit charge records associated with a battery from a vehicle. The computing device can be configured to receive charge records for the battery, where each record from the plurality of charge records can include: (i) a start state of charge, (ii) an end state of charge, and (iii) an amount of energy charged. The computing device can determine a customized charge estimate function for the battery based at least in part on the start state of charge, the end state of charge, and the amount of energy charged for the plurality of charge records for the battery. The computing device can receive an approximate start time for a current charge of the battery, a last state of charge for the battery, and a current time. While the vehicle gateway device is unable to transmit vehicle battery data associated with the current charge of the battery, computing device can calculate an estimated charge time from at least the approximate start time and the current time; estimate a current state of charge based at least in part on: the last state of charge, the estimated charge time, and the customized charge estimate function for the battery; and cause presentation of the current state of charge in a graphical user interface.

The vehicle gateway device can be configured to transmit historical vehicle battery data associated with a battery from a vehicle. The computing device can be configured to receive the historical vehicle battery data. The computing device can determine, from the historical vehicle battery data, (i) data indicative of an amount of energy charged relative to a capacity of the battery and (ii) an amount of energy charged relative to a period of time. The computing device can determine a customized charge estimate function for the battery based at least in part on (i) the data indicative of the amount of energy charged relative to the capacity of the battery and (ii) the amount of energy charged relative to the period of time. The computing device can receive an approximate start time for a current charge of the battery, a last state of charge for the battery, and a current time. While the vehicle gateway device is unable to transmit vehicle battery data associated with the current charge of the battery, computing device can calculate an estimated charge time from at least the approximate start time and the current time; estimate a current state of charge based at least in part on: the last state of charge, the estimated charge time, and the customized charge estimate function for the battery; and cause presentation of the current state of charge in a graphical user interface.

According to various embodiments of the present disclosure, a method can include receiving, from a vehicle gateway device, historical vehicle battery data associated with a battery from a vehicle. The method can further include determining, from the historical vehicle battery data, (i) data indicative of an amount of energy charged relative to a capacity of the battery and (ii) an amount of energy charged relative to a period of time. The method can further include determining a customized charge estimate function for the battery based at least in part on (i) the data indicative of the amount of energy charged relative to the capacity of the battery and (ii) the amount of energy charged relative to the period of time. The method can further include receiving an approximate start time for a current charge of the battery; receiving a last state of charge for the battery; and receiving a current time. While the vehicle gateway device is unable to transmit vehicle battery data associated with the current charge of the battery, the method can further include: calculating an estimated charge time from at least the approximate start time and the current time; estimating a current state of charge based at least in part on: the last state of charge, the estimated charge time, and the customized charge estimate function for the battery; and causing presentation of the current state of charge in a graphical user interface.

In various embodiments, the vehicle gateway device can be further configured to receive, via a vehicle interface, historical vehicle battery data from a battery management system of the vehicle. The vehicle gateway device can be further configured to determine, from the historical vehicle battery data, at least some of the charge records.

In various embodiments, the computing device can be further configured to determine a graph from the last state of charge, the approximate start time, the current time, and the customized charge estimate function for the battery. The computing device can be further configured to cause presentation of a visualization of the graph in the graphical user interface.

In various embodiments, the computing device can be further configured to apply a charge alert condition to the current state of charge. In response to determining that the charge alert condition is satisfied, the computing device can be further configured to transmit a charge alert indicating that the charge alert condition is satisfied.

In various embodiments, determining that the charge alert condition is satisfied can further include: identifying that the current state of charge is above a predefined charge level threshold.

In various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, etc.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays. A management server can provide an analysis graphical user interface that allows a user to review the vehicle metrics, vehicle and/or driver scores (such as fuel/energy efficiency scores and/or safety scores), and/or summary data in substantially real-time. As new vehicle metrics are received, the graphical user interface can dynamically update, such as by recalculating vehicle scores and/or driver scores.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, vehicle gateway devices, and may enable a user to more quickly and accurately access, navigate, assess, and digest analyses, vehicle metric data, and/or the like, than previous systems.

Further, the interactive and dynamic graphical user interfaces described herein are enabled by innovations in efficient interactions between the user interfaces and underlying systems and components. For example, disclosed herein are improved methods of receiving user inputs (including methods of interacting with, and selecting, received data), translation and delivery of those inputs to various system components (e.g., vehicle gateway devices or management server(s)), automatic and dynamic execution of complex processes in response to the input delivery (e.g., execution of processes to calculate vehicle and/or driver scores), automatic interaction among various components and processes of the system, and automatic and dynamic updating of the user interfaces (to, for example, display the vehicle metrics, vehicle scores, and/or driver scores). The interactions and presentation of data via the interactive graphical user interfaces described herein may accordingly provide cognitive and ergonomic efficiencies and advantages over previous systems.

Various embodiments of the present disclosure provide improvements to various technologies and technological fields, and practical applications of various technological features and advancements. Some existing systems are limited in various ways, and various embodiments of the present disclosure provide significant improvements over such systems, and practical applications of such improvements. For example, existing diagnostic systems can generate voluminous amounts of data. Transmitting the generated data over a network in substantially real-time can be impractical. Rather, as described herein, the techniques and solutions of the present disclosure can overcome the issue(s) by aggregating data at the vehicle level and transmitting the aggregated data substantially in real-time. Transmitting aggregated data from the vehicle gateway device to the management server can improve computer and/or network performance. As another example, some existing systems are unable to report a state of charge of a vehicle's battery while the battery is charging because some vehicle's electronic controller(s) and/or computer may be in an off state while charging. Thus, in some existing systems, a user of a fleet management system may view the state of a battery charge and see that state jump from an initial charge level to a final charge level as the vehicle's electronic controller(s) and/or computer changes to an on state. An improved system can address this technical limitation by determining an estimated charge level of a battery based on historical battery data for the particular battery/vehicle. Thus, the system can present an estimated charge level of a vehicle to an administrator even while a vehicle's battery is charging and the vehicle's electronic controller(s) and/or computer is in an off state.

Additionally, various embodiments of the present disclosure are inextricably tied to, and provide practical applications of, computer technology. In particular, various embodiments rely on detection of user inputs via graphical user interfaces, calculation of updates to displayed electronic data based on user inputs, automatic processing of received data, and presentation of updates to displayed data and analyses via interactive graphical user interfaces. Such features and others are intimately tied to, and enabled by, computer, vehicle diagnostic, and vehicle gateway technology, and would not exist except for computer, vehicle diagnostic, and vehicle gateway technology. For example, the vehicle reporting and management functionality and interactions with displayed data described below in reference to various embodiments cannot reasonably be performed by humans alone, without the computer and vehicle gateway technology upon which they are implemented. Further, the implementation of the various embodiments of the present disclosure via computer technology enables many of the advantages described herein, including more efficient interaction with, and presentation and analysis of, various types of electronic data, including fleet management data, and the like.

Further, by virtue of electronic communication with vehicle diagnostic systems and devices, various embodiments of the present disclosure are inextricably tied to, and provide practical applications of, computer vehicle technology. For example, the vehicle gateway devices described herein connect to vehicles via protocol(s), such as Controller Area Network (CAN), Local Interconnect Network (LIN), OBD-II or OBD2, and/or J1939. Moreover, the data collected is inherently tied to vehicles, such as, as fuel level, engine revolutions per minute (RPM), speed, engine torque, engine load, brake use, etc. Various embodiments rely on interpreting and processing the raw vehicle data. Accordingly, some of the solutions and techniques described herein are intimately tied to, and enabled by, computer, vehicle diagnostic, and vehicle gateway technology, and would not exist except for computer, vehicle diagnostic, and vehicle gateway technology.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
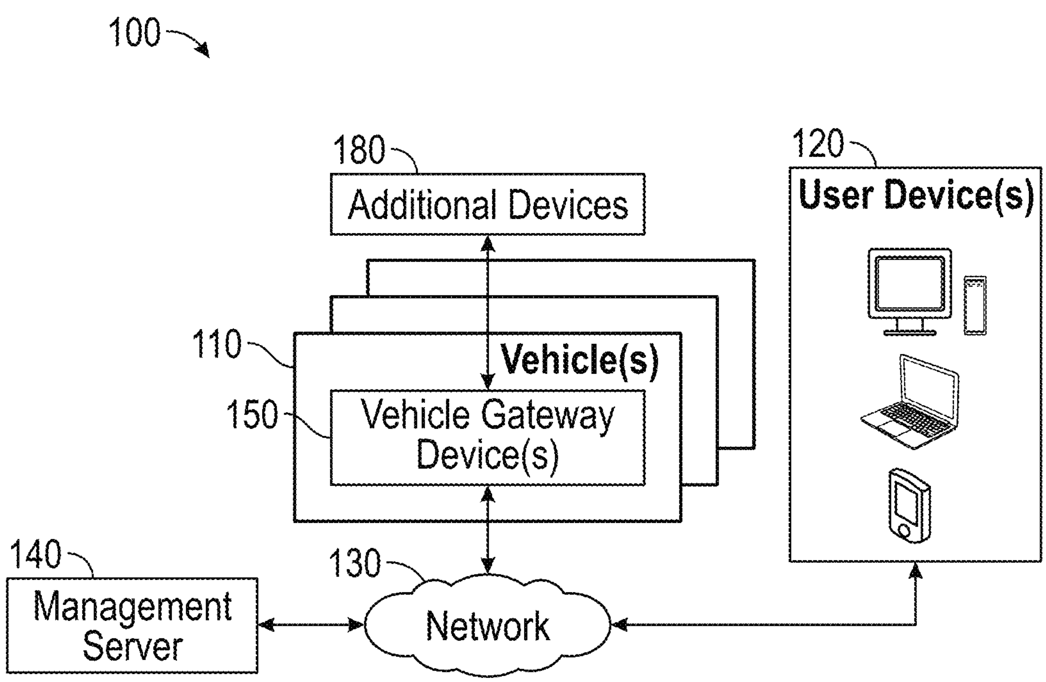
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments of the present disclosure, an improved system can efficiently receive vehicle metric data and analysis of the vehicle metric data can be used for fleet management. A vehicle gateway device that is connected to a vehicle can receive metric data for the vehicle. Generally, the vehicle gateway device can gather data related to operation of the vehicle, location data, and/or other data related to the vehicle. The system can receive data from multiple vehicles in a fleet via respective gateway devices. The vehicle gateway device can gather vehicle metric data at a high frequency, such as every millisecond. Accordingly, the vehicle gateway device can gather a relatively large amount of data. In some embodiments, instead of transmitting a relatively large amount of vehicle metric data at a relatively fine-level of granularity, the vehicle gateway device can aggregate and bucket the vehicle metric data over a period of time (such as, every five minutes). The vehicle gateway device can transmit the aggregated and/or bucketed data to a management server, which can be faster and/or can use less network bandwidth than transmitting vehicle metric data at the relatively fine-level of granularity.

The data received from the vehicle can be used for fleet management purposes. In particular, the management server can receive data from respective vehicle gateway devices for many vehicles and over extended periods of time. As described herein, the management server can aggregate and process the received data in various ways. For example, the management server can process the data per vehicle, per vehicle characteristic, per driver, per driver characteristic, per fleet, per cohort, and/or based on some other common characteristic. The management server can use the data to determine vehicle fuel/energy efficiencies, correlations among vehicle metrics and fuel/energy efficiency, a fuel/energy efficiency score, safety measurements, correlations among vehicle metrics and safety measurements, and/or a safety score. Additionally or alternatively, the management server can determine comparisons, trends, correlations, recommendations, route optimizations, and/or otherwise use the data for fleet management purposes. Further, the management server can generate reports, alerts, and various interactive graphical user interfaces from the data.

In some electric and plug-in hybrid electric vehicles, it may be common, recommended, and/or required to charge the vehicle's battery while the vehicle is off. A vehicle may not transmit and/or broadcast battery and/or charge information while the vehicle's battery is charging. Thus, some management systems may be unable to report or display the current charge status of a vehicle while the vehicle's battery is charging.

As mentioned above, according to various embodiments of the present disclosure, an improved system can determine an estimated charge level of a battery based on historical battery data. In some embodiments, the charge level of a vehicle's battery can be estimated based on historical battery data for that particular vehicle. A vehicle gateway device and/or a server can determine charge record(s) for a vehicle. The improved system can estimate a current charge level based on the historical charge record(s), which can include information regarding past start and end charge levels and a respective amount of energy charged per unit of time for particular past charges. In particular, the improved system can estimate a current charge level based on the previous charge level of the battery and start time for a current charge. Thus, a user of a fleet management system can view an estimated current charge status of a vehicle battery even while the vehicle and/or the vehicle gateway device is unable to transmit current battery and/or charge status information.

In various embodiments, the vehicle gateway devices may be configured to automatically connect to a remote management server (e.g., a "cloud"-based management server), and may offload received, aggregated, and/or analysis data to the remote management server via wired or wireless communications. A remote management server can also be referred to herein as a "management server." A remote management server can also be referred to as a "remote server." The vehicle gateway devices may further communicate with the management server to provide substantially real-time information from the vehicle gateway device. In various embodiments, the management server may aggregate received data and/or analysis data from one or more vehicle gateway devices, and provide statuses, alerts, analyses, etc., including via interactive graphical user interfaces that may be accessed via user computing devices.

Various aspects of the present disclosure may individually and/or collectively provide various technical advantages as described herein, and may overcome various disadvantages of prior systems and methods. As described herein, embodiments of the present disclosure may include vehicle gateway devices. The vehicle gateway devices may automatically establish communication with a remote management server and may transmit vehicle data to the remote management server. Such received data may be useable by the management server for providing further analyses, insights, alerts, etc. to users via interactive graphical user interfaces. However, some existing systems that locally connect to and monitor a vehicle can generate voluminous amounts of data (such as generating data every millisecond), which can be impractical to transmit over a network to the management server in substantially real-time. Instead, in some embodiments, the vehicle gateway device can aggregate data at the vehicle level and transmit the aggregated data substantially in real-time. The aggregated data can be smaller in size that the raw vehicle data. Accordingly, the aggregated data can be transmitted to the management server faster than the raw vehicle data and by using less bandwidth.

Unlike some existing systems, the management server can use historical vehicle data from the vehicle gateway device to determine an expected vehicle state when an actual vehicle state may be technically impossible to determine for the vehicle. For example, some existing vehicle systems are unable to report a state of charge of a vehicle's battery while the battery is charging because some vehicle's electronic controller(s) and/or computer may be in an off state while charging. The management server can receive historical vehicle data for one or more vehicle batteries, such as the data from the vehicle where the battery is currently being charged. The management server can overcome the technical limitation(s) of some existing vehicle systems by determining an estimated charge level of a battery based on the historical battery data for one or more batteries and/or vehicles.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, extendible markup language (XML) files, TEXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Vehicle Metric Data: Any data that can describe an aspect of a vehicle or something related to a vehicle. Example vehicle metric data can be related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle. Vehicle metric data does not necessarily have to be represented as a numerical value. For example, example vehicle metric data related to cruise control can indicate whether cruise control is either in an on or off state. Individual vehicle metrics can be associated with respective timestamps. As another example, a vehicle metric can be for coasting. The determination of whether the vehicle metric for coasting is either true or false can be based on a combination of vehicle parameters, such as engine torque, vehicle speed, brake pedal engagement, and/or accelerator pedal engagement. In some embodiments, some categories of vehicle metric data can come from diagnostic data that directly comes from the vehicle bus. Additional or alternatively, some vehicle metric data can be a composite of multiple vehicle parameters and/or be derived from another vehicle metric, such as, for example, coasting that can be derived from multiple parameters or accelerator pedal engagement that can be derived from engine torque and/or load, as described herein.

III. Example Operating Environment

FIG. 1 illustrates a block diagram of an example operating environment 100 in which one or more aspects of the present disclosure may operate, according to various embodiments of the present disclosure. The operating environment 100 may include one or more user devices 120, a management server 140, one or more vehicles 110, one or more vehicle gateway devices 150, and one or more additional devices 180. The various devices may communicate with one another via a communications network 130, as illustrated.

In general, the vehicle gateway device 150 comprises a housing including processor(s), memory, input/output ports, etc. that may be connected to components of a vehicle. For example, the vehicle gateway device 150 can interface with a vehicle bus of the vehicle 110. In particular, the vehicle gateway device 150 can connect to the vehicle bus of the vehicle 110 over an interface, such as, but not limited to, OBD-II or J1939. The vehicle gateway device 150 can receive and/or process data received via the interfaces of the vehicle gateway device 150. The vehicle gateway device 150 can include or be configured to be an electronic logging device (ELD). Accordingly, the vehicle gateway device 150 can record data regarding the operation of the vehicle 110, as well as driver activity including driver hours of service and record of duty status. Configurations of the vehicle gateway device 150 may include various analysis algorithms, program instructions, scripts, etc., as described herein. Additional details regarding the vehicle gateway device 150 are described in further detail herein, such as with respect to FIG. 3.

The vehicle gateway device 150 can store the received and/or processed data in a memory of the vehicle gateway device 150 (e.g., a computer readable storage medium). The vehicle gateway device 150 can communicate with the management server 140 over the network 130. In particular, the vehicle gateway device 150 can transmit the received and/or processed data to the management server 140. As another example, the vehicle gateway device 150 can transmit an alert to the management server 140. The management server 140 may thereby receive data from multiple vehicle gateway devices 150, and may aggregate and perform further analyses on the received data from vehicle gateway devices 150. In some embodiments, the vehicle gateway device 150 can receive updates from the management server 140.

In some embodiments, the features and services provided by the management server 140 may be implemented as web services consumable via the network 130. The management server 140 can be provided by one or more virtual machines implemented in a hosted computing environment. The hosted computing environment can include one or more rapidly provisioned and released computing resources. The computing resources can include computing, networking and/or storage devices.

The additional device(s) 180 may include various devices for monitoring a vehicle and/or vehicle-related activity. The additional device(s) 180 can be optional and some configurations of the environment 100 do not include any additional device(s) 180. Example additional device(s) 180 can include, but are not limited to, cameras (such as network-connected dash cams) and/or sensors. Example sensors can include, but are not limited to, wireless sensors to monitor reefers and cargo and wireless temperature sensors. Another additional device 180 can include a device that identifies a particular driver. For example, a driver can wear a keychain that automatically is wirelessly communicates with the vehicle gateway device 150 such that the driver can be automatically identified and the driver does not need to sign in to an application.

Various example user devices 120 are shown in FIG. 1, including a desktop computer, laptop, and a smartphone, each provided by way of illustration. In general, the user devices 120 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 120 may execute an application (e.g., a browser, a stand-alone application, etc.) that allows a user to access interactive user interfaces, view analyses or aggregated data, and/or the like as described herein. In various embodiments, users may interact with various components of the example operating environment 100 (e.g., the management server 140) via the user device(s) 120. Such interactions may typically be accomplished via interactive graphical user interfaces; however, alternatively such interactions may be accomplished via command line and/or other means.

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In various embodiments, communications among the various components of the example operating environment 100 may be accomplished via any suitable means. For example, the vehicle gateway devices 150 may communicate the additional device(s) 180, the management server 140, and/or the user device(s) 120 via any combination of the network 130 or any other wired or wireless communications means or method (e.g., Bluetooth, WiFi, infrared, cellular, etc.).

Further details and examples regarding the implementations, operation, and functionality, including various interactive graphical user interfaces, of the various components of the example operating environment 100 are described herein in reference to various figures.

IV. Example Management Device/Server

Figure 2:
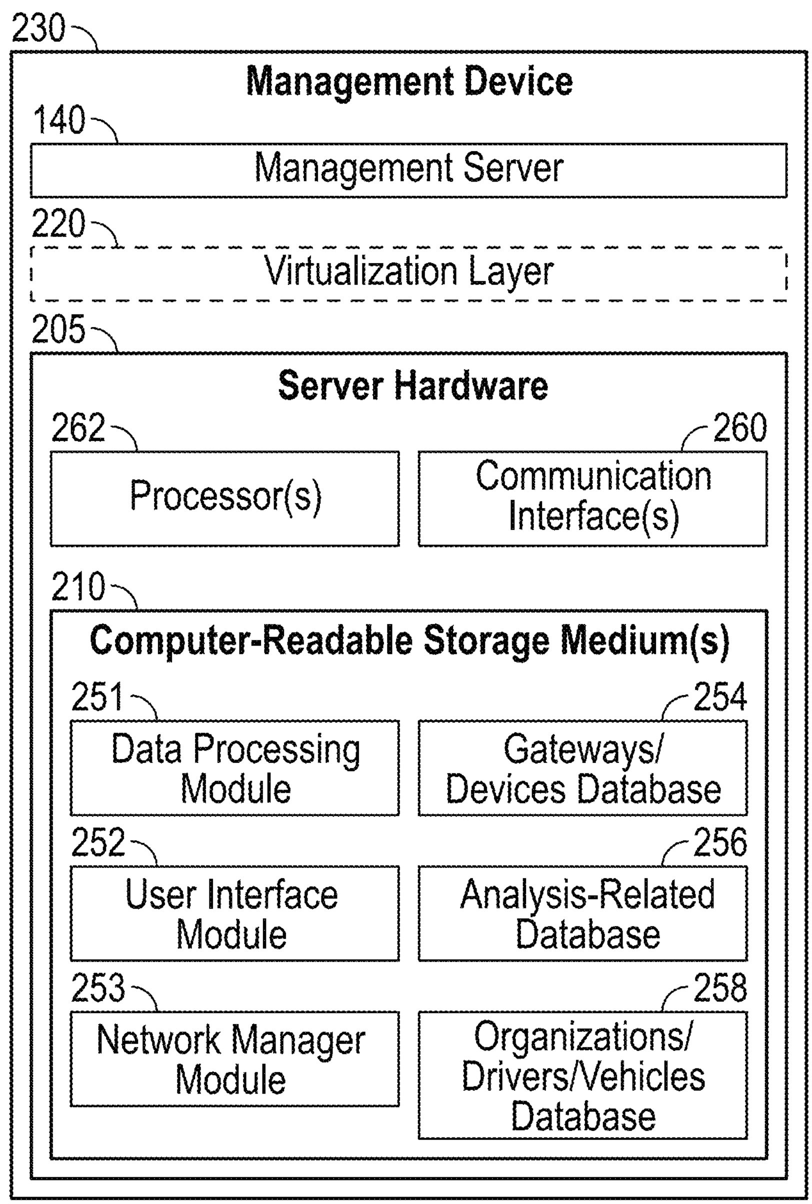
FIG. 2 illustrates a block diagram including an example implementation of a management device, according to various embodiments of the present disclosure.

FIG. 2 illustrates a block diagram including an example implementation of a management device 230, according to various embodiments of the present disclosure. In the example implementation, the management device 230 includes the management server 140. The management server 140 can be a Web or cloud server and/or a cluster of servers, running on one or more sets of server hardware. In some embodiments, the management server 140 works for both single and multi-tenant installations, meaning that multiple organizations with different administrators may have, e.g., multiple gateway devices and additional devices managed by the same management server.

According to various embodiments, the management server 140 may be implemented on the management device 230 (or multiple devices similar to the management device 230), which includes server hardware 205. The server hardware 205 can include one or more communication interfaces 260, one or more processors 262, and one or more computer readable storage mediums 210, each of which may be in communication with one another. The computer readable storage medium 210 can includes a data processing module 251, user interface module 252, network manager module 253, gateways/devices database 254, vehicle-related database 255, analysis-related database 256, and organizations/drivers/vehicles database 258. In various implementations, the various databases of the management device 230 may be combined or separated/partitioned as appropriate to implement the functionality described herein, and to maintain security and separation of data, e.g., for different organizations. In various implementations, the various databases may or may not be stored separately from the management device 230.

In various implementations one or more buses, interconnects, wires/cables, etc. may be used to interconnect the various components of the server hardware 205. In various implementations one or more interfaces, APIs, communication layers, buses, interconnects, wires/cables, etc. may be used to interconnect the various components of the management device 230.

In operation, the one or more communication interfaces 260, one or more processors 262, and one or more computer readable storage mediums 210 communicate with one another to, e.g., execute by the processor(s) 262 computer program instructions (e.g., as provided by the user interface module 252); receive, access, and transmit data (e.g., to/from the databases and via the communication interface(s) 260); and/or the like. In general, the server hardware 205 enables the functionality of the management server 140 as described herein. Further implementation details are described below.

In operation, the communication interface(s) 260 may provide wired and/or wireless communications with other devices and networks, as described herein. In various embodiments, communications among the various components of the example operating environment 100 may be accomplished via any suitable means. For example, the management server 140 and/or management device 230 may communicate with the vehicle gateway device 150, the additional device(s) 180, and/or the user device(s) 120 via any combination of the network 130 or any other communications means or method (e.g., Bluetooth, WiFi, infrared, cellular, etc.). Accordingly, the communications interface(s) 260 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like.

In operation, the data processing module 251 can process and analyze data (e.g., data received from the various devices, including the gateway devices and/or additional devices) as described herein. The data processing/analysis may usefully provide insights and information that may be provided via various interactive graphical user interfaces, as described herein.

In operation, the user interface module 252 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). For example, the user interface module 252 may provide various network accessible interactive graphical user interfaces, e.g., to allow the administrators of the various organizations and devices to create and log into an account associated with an organization to which a set of devices belong (e.g., gateway devices and additional devices), and manage, and access data associated with, those devices as described herein. As another example, the user interface module 252 may provide various network accessible interactive graphical user interfaces, e.g., to allow the analysts of the various organizations and devices to conduct operations analysis and/or operations configurations, as described herein.

In operation, the network manager module 253 may provide communication with and configuration and management of the various devices associated with each organization. This may include, for example, receiving and managing information related to the various devices (e.g., gateway devices and additional devices) at the time of manufacture, associating devices with particular organizations when they are purchased/claimed and implemented by the organizations (e.g., the claiming may be performed at least in part by populating the gateways/devices database 254 and the organizations/drivers/vehicles database 258 with appropriate information when the devices are associated with an organization), receiving data from the various devices (e.g., and storing the data in the gateways/devices database 254 or other appropriate database), sending data to various devices, and/or the like.

In operation, the gateways/devices database 254 can store information regarding the vehicle gateway devices 150 and/or the additional devices 180, and various relationships and associations among these devices. For example, the gateways/devices database 254 can store identifiers associated with these devices.

In operation, the analysis-related database 256 can store data (such as raw data, aggregated data, and/or analysis data) received from the vehicle gateway devices 150 and/or the additional devices 180. The analysis-related database 256 can further store processed data that is generated by the management server 140 for analysis purposes. The analysis data can include vehicle fuel/energy efficiencies, correlations among vehicle metrics and fuel/energy efficiencies, fuel/energy efficiency scores, safety measurements, correlations among vehicle metrics and safety measurements, safety scores, comparisons, trends, correlations, recommendations, and/or route optimizations.

In operation, the organizations/drivers/vehicles database 258 can store information regarding the organizations to which the vehicle gateway devices 150 and/additional devices 180 belong. The organizations/drivers/vehicles database 258 can store data regarding the drivers and/or vehicles associated with the organization.

In various embodiments, the management server 140, as implemented by the management device 230, may include various other modules, components, engines, etc. to provide the functionality as described herein. It will be appreciated that additional components, not shown, may also be part of the management server 140 and/or the management device 230, and, in certain embodiments, fewer components than that shown in FIG. 2 may also be used in the management server 140 and/or the management device 230. For example, the management server 140 may include a security module used to manage cryptographic keys, certificates, and/or other data associated with establishing secure communication with various other devices. For example, the devices database 254 may include an identifier of each device (e.g., a serial number), a secret to be used to establish a secure communication with the devices of the same organization, and/or a mechanism to authenticate the devices' identity (e.g., the public key of a private public key pair, the private key of which was embedded or stored in the device during the manufacturing, etc.).

While various embodiments do not implement virtualization, alternative embodiments may use different forms of virtualization-represented by a virtualization layer 220 in the management device 230. In these embodiments, the management server 140 and the hardware that executes it form a virtual management server, which is a software instance of the modules and/or databases stored on the computer readable storage medium 210.

For example, in an implementation the management device 230 (or one or more aspects of the management device 230, e.g., the management server 140) may comprise, or be implemented in, a "virtual computing environment." As used herein, the terms "virtual computing environment", "virtualization", "virtual machine", and/or the like should be construed broadly to include, for example, computer readable program instructions executed by one or more processors (e.g., as described below) to implement one or more aspects of the modules and/or functionality described herein. In some implementations the virtual computing environment may comprise one or more virtual machines, virtualization layers, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the management device 230 as a virtual computing environment may advantageously enable executing different aspects or modules of the system on different computing devices or processors, which may increase the scalability of the system. Implementing one or more aspects of the management device 230 as a virtual computing environment may further advantageously enable sandboxing various aspects, data, or modules of the system from one another, which may increase security of the system by preventing, e.g., malicious intrusion into the system from spreading. Implementing one or more aspects of the management device 230 as a virtual computing environment may further advantageously enable parallel execution of various aspects or modules of the system, which may increase the scalability of the system. Implementing one or more aspects of the management device 230 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Vehicle Gateway Device

Figure 3:
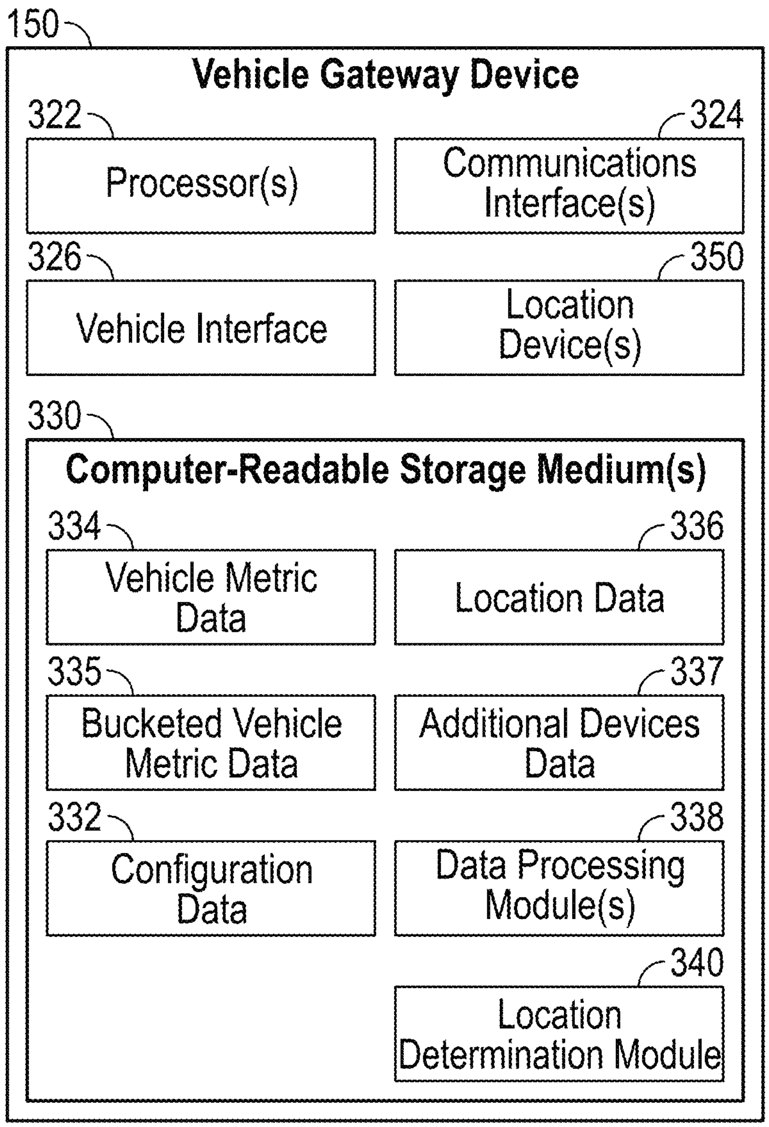
FIG. 3 illustrates a block diagram of an example vehicle gateway device, according to various embodiments of the present disclosure.

FIG. 3 illustrates a block diagram of an example vehicle gateway device 150, according to various embodiments of the present disclosure. The vehicle gateway device 150 can include one or more processors 322, one or more communication interfaces 324, one or more vehicle interfaces 326, location device(s) 350, and one or more computer readable storage mediums 330, each of which may be in communication with one another. The computer readable storage medium(s) 330 can include configuration data 332, vehicle metric data 334, bucketed vehicle metric data 335, location data 336, additional devices data 337, data processing module(s) 338, and location determination module 340. The configuration data 332, vehicle metric data 334, bucketed vehicle metric data 335, location data 336, additional devices data 337 can be stored in one or more databases of the vehicle gateway device 150. In various implementations one or more buses, interconnects, wires/cables, etc. may be used to interconnect the various components of the vehicle gateway device 150, and of the vehicle gateway device 150 more generally.

In operation, the one or more communication interfaces 324, one or more processors 322, and one or more computer readable storage mediums 330 communicate with one another to, e.g., execute by the processor(s) 322 computer program instructions (e.g., as provided by the data processing module(s) 338); receive, access, and transmit data (e.g., via the communication interface(s) 324); and/or the like. Example processor(s) 322 can include various types of processors, such as, but not limited to, general purposes processors, e.g., a microprocessor, and/or special purposes processors, e.g., Graphics Processing Units ("GPUs"), Application Specific Integrated Circuits ("ASICs"), Field-Programmable Gate Arrays ("FPGAs"). Further implementation details are described below.

The communication interface(s) 324 can enable wired and/or wireless communications with other devices and networks, as described herein. For example, the vehicle gateway device 150 can communicate with the additional device(s) 180, the management server 140, and/or the user device(s) 120 via any combination of the network 130 or any other communications means or method (e.g., Bluetooth, WiFi, infrared, cellular, etc.). Accordingly, the communications interface(s) 324 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. The communications interface(s) 324 may further include, for example, serial inputs/outputs, digital inputs/output, analog inputs/outputs, and the like. As noted herein, the communications interface(s) 324 may further include one or more application programming interfaces (APIs).

The vehicle interface 326 can communicate with a vehicle bus. As described herein, the vehicle bus is an internal communications network that connects components, such as a car's electronic controllers, within a vehicle. Example protocols that the vehicle interface 326 can communicate with can include, but are not limited to, Controller Area Network (CAN), Local Interconnect Network (LIN), OBD-II or OBD2, and/or J1939. Accordingly, the vehicle interface 326 can allow access to the vehicle's electronic controllers. The vehicle gateway device 150, via the vehicle interface 326, can access vehicle diagnostics, such as fuel level, engine revolutions per minute (RPM), speed, engine torque, engine load, brake use, etc. In some embodiments, the vehicle gateway device 150, via the vehicle interface 326, can receive messages from the vehicle bus from the car's electronic controllers related to vehicle data, such as fuel level, engine revolutions per minute (RPM), speed, engine torque, engine load, brake use, etc. Additionally or alternatively, the vehicle gateway device 150, via the vehicle interface 326, can query the car's electronic controllers to receive vehicle data, such as fuel level, engine revolutions per minute (RPM), speed, engine torque, engine load, brake use, etc.

The location determination module 340 can use the location device(s) 350. Example location device(s) 350 can include a global positioning system (GPS) device or a global navigation satellite system (GLONASS) device. Data received from the location device(s) 350 can be stored as location data 336 in the computer readable storage medium(s) 330. In some embodiments, the location determination module 340 can determine the location of the vehicle gateway device 150 using various geolocation methods that use, but are not limited to, Wi-Fi, Bluetooth, Internet Protocol (IP), and/or proximity to beacons. The location determination module 340 may determine location of the gateway device 110 and generate location data 336 associated with the location of the gateway device 110. The location data 336 may include geographical positioning information (e.g., GPS coordinates or latitudinal and longitudinal coordinates) that may represent the location of the vehicle gateway device 150. Additionally or alternatively, the location information may identify an area within a grid (such as a map tile) that identifies and/or estimates the location of the vehicle gateway device 150.

In operation, the vehicle metric data 334 can include raw vehicle data received from the vehicle bus and/or the various additional devices 180 via the vehicle interface 326, communications interface(s) 324, and/or input ports of the vehicle gateway device 150. In operation, the bucketed vehicle metric data 334 can include aggregated metric data. In some embodiments, the data processing module 338 can bucket the raw vehicle data as aggregated data and can store the aggregated results as the bucketed vehicle metric data 334.

In operation, the additional devices data 337 can include data received from the various additional devices 180 via the vehicle interface 326, communications interface(s) 324, and/or input ports of the vehicle gateway device 150. Example additional devices data 337 can include, but is not limited to, camera data, video data, and/or temperature sensor data.

In operation, the configuration data 332 can include one or more configurations that configure operation of the vehicle gateway device 150. For example, such configurations may be received from a user and/or the management device 230 (and/or other devices in communication with the vehicle gateway device 150), and may include various communications specifications (e.g., that indicate functionality of the input and output ports), executable program instructions/code, algorithms or processes for processing the received data, and/or the like. The vehicle gateway device 150 may store multiple configurations in the configuration data 332, which may be selectively run or implemented, e.g., via user selection via the management server 140 and/or the user device(s) 120.

In operation, the data processing module(s) 338 can process and analyze received data. The processing and analysis by the data processing module(s) 338 may result in one or more outputs from the vehicle gateway device 150 that may be provided via the communications interface(s) 324, as further described herein. In various implementations, the data processing module(s) 338 may be executed by the processor(s) 322.

In various embodiments, firmware of the vehicle gateway device 150 may be updated such that the vehicle gateway device 150 may provide additional functionality. Such firmware updating may be accomplished, e.g., via communications with the management server 140, thereby enabling updating of multiple vehicle gateway devices 150 remotely and centrally. Additional functionality may include, for example, additional communications specifications, additional ways of communicating with additional devices 180 (e.g., additional control languages, etc.), additional configurations or options for configurations, and/or the like.

VI. Example Methods and Functionality for Efficient Data Aggregation

Figure 4A:
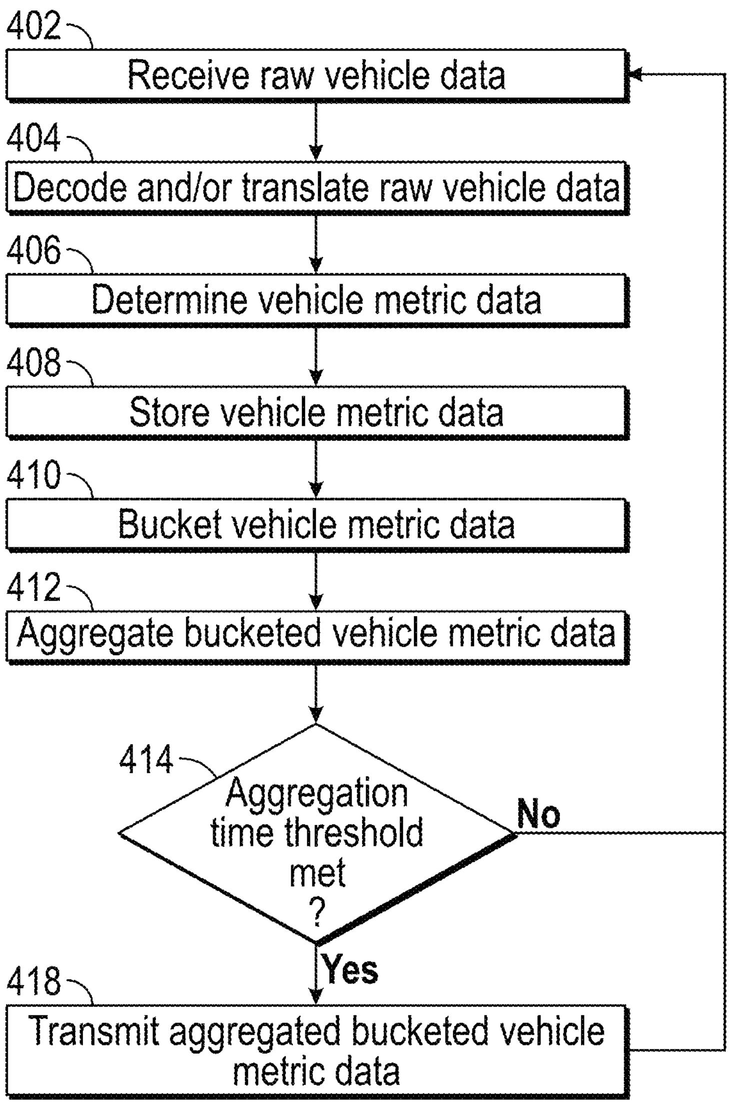
FIGS. 4A-4B are flowcharts illustrating example methods and functionality related to efficient data aggregation on a vehicle gateway device, according to various embodiments of the present disclosure.
Figure 4B:
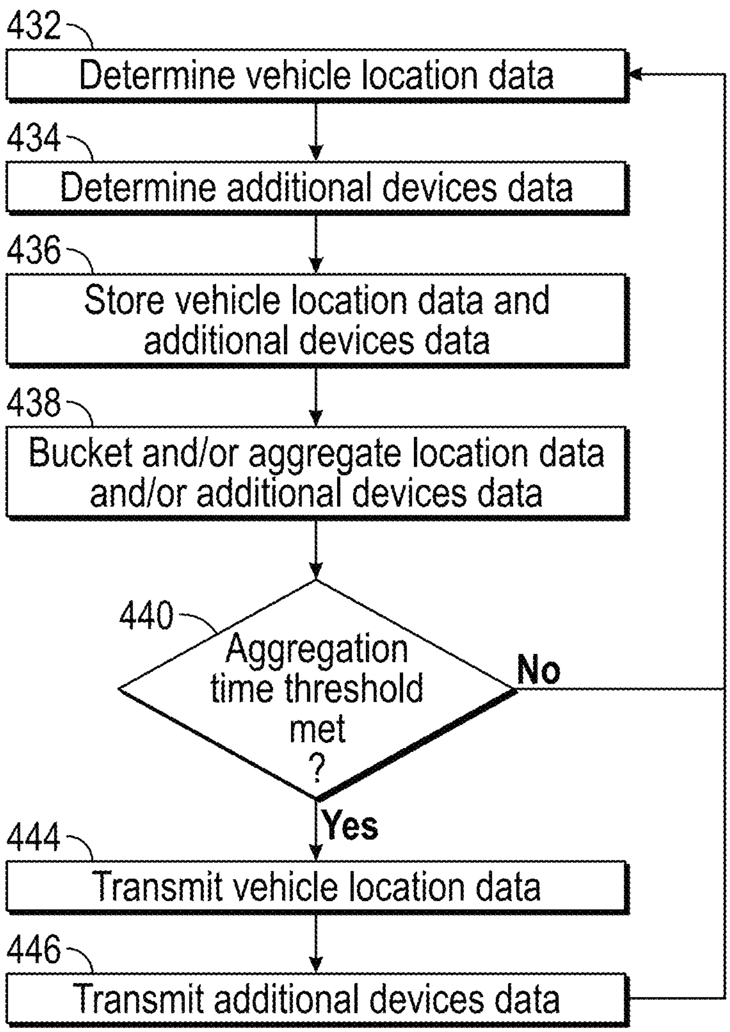

FIGS. 4A-4B are flowcharts illustrating example methods and functionality related to efficient data aggregation on a vehicle gateway device 150, according to various embodiments of the present disclosure. Turning to FIG. 4A, beginning at block 402, raw vehicle data can be received. In particular, the vehicle gateway device 150 can receive the raw vehicle data. The vehicle gateway device 150 can receive the raw vehicle data via the vehicle interface 326 with a vehicle 110. The vehicle gateway device 150 can communicate with electronic controllers of the vehicle 110 and/or the vehicle's computer over the vehicle interface 326 and the vehicle bus. The communication between the vehicle gateway device 150 and the vehicle 110 can use a particular communication protocol, such as OBD-II or J1939. In some embodiments, the vehicle gateway device 150 can record broadcasted data over the vehicle bus, thereby receiving the raw vehicle data. Additionally or alternatively, the vehicle gateway device 150 can request raw vehicle data over the vehicle bus. The raw vehicle data can be received over a period of time. As described herein, example raw vehicle data can include any vehicle diagnostic data, such as, but not limited to, data related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle 110.

In some embodiments, the vehicle gateway device 150 can receive vehicle battery data associated with a battery from the vehicle 110. The vehicle battery data can represent a state of the vehicle battery. The vehicle battery data can be for an electric vehicle, a hybrid vehicle (such as a plug-in hybrid electric vehicle), or internal combustion engine (ICE) vehicles. The vehicle gateway device 150 can listen for battery-related messages from a battery management system (BMS) of the vehicle 110. Additionally or alternatively, the vehicle gateway device 150 can request vehicle battery data from the battery management system.

At block 404, the raw vehicle data can be decoded and/or translated. In particular, the vehicle gateway device 150 can decode and/or translate the raw vehicle data. The raw vehicle data can be in a particular data format, such as an OBD-II or J1939 data format. Accordingly, the vehicle gateway device 150 can decode and/or translate the raw vehicle data in the particular data format. The vehicle gateway device 150 can decode and/or translate the raw vehicle data based at least in part on rules specifically related to the vehicle. For example, the vehicle gateway device 150 can include rules for decoding particular data formats, such as OBD-II or J1939. The vehicle gateway device 150 can use different sets of rules for decoding and/or translating data from a particular vehicle depending on the communication protocol that the particular vehicle uses. In some embodiments, the vehicle gateway device 150 can decode and/or translate vehicle battery data from messages from the battery management system (BMS). Additionally or alternatively, the vehicle gateway device 150 can store the raw vehicle data in its original data format.

At block 406, vehicle metric data can be determined. In particular, the vehicle gateway device 150 can determine vehicle metric data from the raw vehicle data. For example, the raw vehicle data regarding cruise control use, coasting, accelerator pedal use, idling, battery state, anticipation, motor rotations per minute, motor power, fuel level, engine revolutions per minute (RPM), speed, engine torque, engine load, brake use, etc. can be voluminous. The vehicle gateway device 150 can parse and organize the raw vehicle data into individual vehicle metrics. For example, a value and/or on/off state can be determined for each of cruise control use, coasting, accelerator pedal use, idling, battery state, anticipation, motor rotations per minute, motor power, fuel level, engine revolutions per minute (RPM), speed, engine torque, engine load, brake use, etc. over the period of time. Moreover, some example vehicle metrics can be based on a combination of vehicle parameters. For example, a vehicle metric can be for coasting. The vehicle gateway device 150 can determine the vehicle metric for coasting to be either true or false based on a combination of vehicle parameters, such as engine torque, vehicle speed, brake pedal engagement, and/or accelerator pedal engagement. In particular, the vehicle gateway device 150 can determine the vehicle metric for coasting to be true when each of the following are determined to be true: engine torque is zero, vehicle speed is greater than zero, brake pedal is not engaged, and accelerator pedal is not engaged.

Another example of determined vehicle metric can be for accelerator pedal engagement. In some embodiments, accelerator pedal data from the vehicle bus may be unreliable. Accordingly, the vehicle gateway device 150 can determine the vehicle metric for accelerator pedal engagement based on at least one of engine torque or engine load. For example, the vehicle gateway device 150 can determine the vehicle metric for accelerator pedal engagement as a percentage based value ranges for engine torque and/or engine load.

Yet another example of determined vehicle metric can be for anticipation. Anticipation can generally refer to driver behavior with respect to anticipating having to brake, which can be indicative of fuel/energy efficient driving. For example, those drivers that anticipate traffic in their driving will typically not have to brake as hard. The vehicle metric for anticipation can be a categorizations of brake events, such as, any brake event and/or a quick brake event. The vehicle gateway device 150 can determine the brake event category based on a combination of vehicle parameters, such as brake pedal engagement, accelerator pedal engagement, engine torque, and/or engine load. In particular, the vehicle gateway device 150 can determine the vehicle metric for a quick brake event when each of the following are determined: the accelerator pedal is disengaged and the brake pedal is subsequently engaged in approximately less than one second. Any brake event can include any time the driver presses the brake pedal.

At block 408, the vehicle metric data can be stored. In particular, the vehicle gateway device 150 can store the vehicle metric data in the computer-readable storage medium(s) 330. For example, the vehicle gateway device 150 can store the vehicle metric data in a database on the computer-readable storage medium(s) 330. As described herein, aggregated bucketed vehicle metric data may be generated by the vehicle gateway device 150 and transmitted to the management server 140. However, in some environments, the management server 140 may query the vehicle gateway device 150 for particular vehicle metric data, which can be retrieved from the computer-readable storage medium(s) 330.

At block 410, the vehicle metric data can be bucketed. In particular, the vehicle gateway device 150 can determine corresponding vehicle metric buckets for each of the vehicle metrics. In some embodiments, there can be a single bucket for a particular metric. As noted above, in various implementations, various buckets/ranges maybe used for the various metrics. Further, in various implementations the buckets/ranges for any of the metrics may be configurable or customizable by a user, and/or the buckets/ranges for any of the metrics may be determined or customized by the system based on an identify and/or characteristic of the vehicle (e.g., a type of the vehicle, a make of the vehicle, a model of the vehicle, and/or the like). One example category of buckets is an engine revolutions per minute (RPM) category. Example buckets for RPM can include RPM bands with RPM ranges for each band. Example RPM band buckets that may be applicable to a particular vehicle or a vehicle with a particular characteristic include a first bucket for an RPM band of approximately 800-1700 RPM and a second bucket for an RPM band starting from a low of approximately 700-900 RPM to a high of approximately 1600-1800 RPM. In some embodiments and vehicles, the RPM band of approximately 800-1700 RPM can be an efficient range for operating a vehicle with respect to fuel/energy use and the RPM bands starting from a low of approximately 700-900 RPM to a high of approximately 1600-1800 RPM can be inefficient ranges for operation of the vehicle with respect to fuel/energy use. The bucket of 800-1700 RPM can be considered a "green" RPM range for certain vehicles, meaning it is a generally efficient portion of the RPM band. Conversely, the other bucket(s) can be considered a "red" RPM range(s), for certain vehicles, meaning it is a generally less efficient portion of the RPM band. If the vehicle metric data includes RPM values of 798, 799, and 800 for each millisecond, respectively, then the 800 RPM value can be placed in the efficient RPM bucket and the 798 and 799 RPM values can be placed in the inefficient bucket. In some embodiments, the particular buckets can be customized for types of vehicles. For example, different types of vehicles can have different recommended RPM ranges for fuel/energy efficiency. The "green band" RPM range for different vehicle may vary by plus or minus 50 to 100 RPM, 100 to 150 RPM, or any other amount, depending on the particular vehicle or type of vehicle. Many of the vehicle metrics described herein can be useful indicators for fuel/energy efficient driving or the lack thereof.

Another example category of buckets is a cruise control category. Example buckets for cruise control can include a cruise control on bucket and a cruise control off bucket. For example, if the vehicle metric data includes instances of cruise control being on for timestamps 1 and 2 and cruise control being off for timestamp 3, then the first two instances can be placed in the cruise control on bucket and the remaining instance can be placed in the cruise control off bucket. Use of cruise control can increase or be indicative of fuel/energy efficient driving.

Yet another example category of buckets is a coasting category. Example buckets for coasting can include a coasting true bucket and a coasting false bucket. For example, if the vehicle metric data includes instances of coasting being true for timestamps 1 and 2 and coasting being false for timestamp 3, then the first two instances can be placed in the coasting true bucket and the remaining instance can be placed in the coasting false bucket. As described herein, the determination of whether coasting is true or false at a particular timestamp can be based on a number of vehicle parameters, such as engine torque, vehicle speed, brake pedal engagement, and/or accelerator pedal engagement. Similar to previous metrics, use of coasting can increase or be indicative of fuel/energy efficient driving.

Similar to the previous bucket examples, the following bucket examples can characterize the state of a vehicle over a period of time at respective timestamps of the vehicle. Yet another example category of buckets is an accelerator pedal engagement category. Example buckets for accelerator pedal engagement can include a first bucket for accelerator pedal engagement over approximately 95 percent, and a second bucket for accelerator pedal engagement less than or equal to approximately 95 percent. Yet another example category of buckets is for idling. Example buckets for idling can include a first bucket for idling true, and a second bucket for idling false. Yet another example category of buckets is for anticipation. Example buckets for idling can include a first bucket for any brake event, and a second bucket for a quick brake event. Similar to previous metrics, reduced use of accelerator pedal engagement above 95% and/or reduced idling can increase or be indicative of fuel/energy efficient driving.

Another example bucket is a bucket for a particular vehicle battery charge. For example, in the context of an electric vehicle or a plug-in hybrid electric vehicle, the vehicle gateway device 150 can determine that vehicle battery data is associated with a particular instance of a vehicle battery charge.

At block 412, the vehicle metric data can be aggregated. In particular, the vehicle gateway device 150 can aggregate, over the period of time, the vehicle metrics into the corresponding vehicle metric buckets to generate aggregated bucketed vehicle metric data. In various implementations, the period of time of aggregation can be a fixed period (e.g., 5 minutes) or it may be variable or vary based on various factors. Such factor may include, for example, network availability, amount of data received, time since last update, and/or the like. In various implementations, the period of time may vary based on the metric and/or other factors, and/or may be user configurable. The vehicle gateway device 150 can represent the aggregations differently based on the embodiment or in multiple ways. For example, the vehicle gateway device 150 can aggregate a cumulative time spent in each bucket. In the case of RPM buckets, the vehicle gateway device 150 can aggregate a cumulative time spent in each bucket (e.g., 1 minute and 10 seconds in the “green” bucket and 2 minutes and 15 seconds in the “red” bucket). Additional example aggregations can include: time spent with cruise control on and time spent with cruise control off; time spent coasting as true and time spent coasting as false; time spent with the accelerator pedal engagement over approximately 95 percent and time spent with the accelerator pedal engagement less than or equal to approximately 95 percent; and/or time spent idling as true and time spent idling as false. Additionally or alternatively, the vehicle gateway device 150 can represent the time spent in each bucket as a percentage. In some embodiments, the vehicle gateway device 150 can store the bucketed vehicle metric data and/or the aggregated bucketed vehicle metric data in the computer-readable stored medium(s) 330 of the vehicle gateway device 150.

In some embodiments, the vehicle gateway device 150 can aggregate, over the period of time, quantities. For example, if each bucket has discrete items (such as events), the vehicle gateway device 150 can aggregate the discrete items in each bucket. In the case of anticipation buckets, the vehicle gateway device 150 can aggregate the total number of any type of brake event in a first bucket and the total number of quick brake events in the second bucket. For example, the vehicle gateway device 150 can aggregate the first bucket to have a total of 15 of any type of brake events and the second bucket to have a total of 5 of quick brake events. Additionally or alternatively, the vehicle gateway device 150 can represent each aggregated bucket total as a percentage.

In some embodiments, the vehicle gateway device 150 can aggregate bucket(s) for a vehicle battery charge by determining charge record(s) from the vehicle battery data. An example charge record can include (i) data indicative of an amount of energy charged relative to a capacity of the battery (such as a percentage of the battery charged for a particular charge instance) and (ii) an amount of energy charged relative to a period of time (such as a charge amount in a unit of energy like kilowatt-hour (kWh)). Another example charge record can include (i) a start state of charge, (ii) an end state of charge, and (iii) an amount of energy charged. As described herein, the vehicle gateway device 150 can transmit historical vehicle battery data to the management server 140 and the management server 140 can determine charge record(s) from the historical vehicle battery data. Depending on the embodiment, the historical vehicle battery data can include charge record(s) or the historical vehicle battery data can include the underlying data with which the management server 140 can calculate the charge record(s).

At block 414, it can be determined whether the aggregation time threshold has been met. In particular, the vehicle gateway device 150 can determine whether the aggregation time threshold has been met. Example aggregation time thresholds can include 1 minute, 2 minutes, 5 minutes, etc. The vehicle gateway device 150 can maintain a running timer to determine whether the aggregation time threshold has been met. Additionally or alternatively, the vehicle gateway device 150 can maintain a last expiration time variable and can determine a difference between the last expiration time with a current time. When the difference between the last expiration time and the current time is greater than or equal to the aggregation time threshold, the vehicle gateway device 150 can determine that the aggregation time threshold has been met. If it has been determined that the aggregation time threshold has been met, the method can proceed to block 418 for transmitting the aggregated data. Otherwise, the method can return to block 402 to receive more vehicle data and operate in a loop until the aggregation time threshold has been met.

In some embodiments, there can be different time thresholds for different vehicle metrics. For example, metrics regarding RPM and fuel level can be provided to the management server 140 more regularly, such as every five minutes. As another example, the vehicle battery data and/or the battery charge record(s) can be provided once or twice a day from the vehicle gateway device 150 to the management server 140.

In some embodiments (while not illustrated), while the block 412 for aggregating bucketed vehicle metric data appears before the block 414 for determining whether the aggregation time threshold has been met, the reverse can occur. Specifically, the block 412 for aggregating bucketed vehicle metric data can occur after the block 414 that determines whether the aggregation time threshold has been met. For example, if the aggregation time threshold has been met (such as five minutes), the vehicle gateway device 150 can then aggregate the bucketed data and then proceed to block 418 for transmitting the aggregated data.

At block 418, the aggregated bucketed vehicle metric data can be transmitted. In particular, in response to determining that an aggregation time threshold is met, the vehicle gateway device 150 can transmit, to a receiving server system (such as the management server 140), the aggregated bucketed vehicle metric data. For example, the vehicle gateway device 150 can transmit any of the aggregated bucketed data relating to cruise control use, coasting, accelerator pedal use, idling, battery state, anticipation, motor rotations per minute, motor power, fuel level, engine revolutions per minute (RPM), speed, engine torque, engine load, brake use, etc. In particular, the vehicle gateway device 150 can transmit charge records to a computing device such as the management server 140. In some embodiments, if the vehicle gateway device 150 loses network connection, the vehicle gateway device 150 can queue aggregated vehicle data until it obtains the network connection again. As shown, after the data has been transmitted, the method can return to block 402 to receive more data and perform in a loop until the aggregation time threshold is met again.

Accordingly, the vehicle gateway device 150 can advantageously transmit vehicle data in an efficient manner. Example advantages (not all of which may be applicable in every embodiment) can include the following. For example, instead of the vehicle gateway device 150 transmitting vehicle data with a higher frequency (such as every millisecond), the vehicle gateway device 150 can transmit the vehicle data with a lower frequency. This can result in lower bandwidth usage. As another example, instead of transmitting vehicle individual data items (such as cruise control use, RPM, speed, engine torque, engine load, brake use, etc. for every millisecond), the vehicle gateway device 150 transmits aggregated vehicle data. Accordingly, the aggregated vehicle data can have a smaller data size than the total data size of the individual data items. In other words, the aggregated vehicle data can be a compressed, summary data representation of the raw vehicle data. This can be advantageous because the compressed vehicle data can use less network bandwidth and/or can be transmitted to the destination server faster in contrast to the individual data items that would use more network bandwidth and/or would be transmitted slower.

Turning to FIG. 4B, beginning at block 432, vehicle location data can be determined. In particular, the vehicle gateway device 150 can determine the vehicle location data. For example, the vehicle gateway device 150 can receive location data from the location device(s), such as GPS or GLONASS receivers. The location data can be associated with timestamps. Accordingly, the vehicle gateway device 150 can determine geolocation data associated with the vehicle 110, which can include time data.

At block 434, data from the additional device(s) can be determined. In particular, the vehicle gateway device 150 can receive data from the additional device(s). For example, the vehicle gateway device 150 can receive camera data and/or sensors data. Similar to the vehicle location data that can be associated with timestamps, the additional devices data can be associated with timestamps. At block 436, the vehicle location data and/or the additional devices data can be stored. In particular, the vehicle gateway device 150 can store the vehicle location data and/or the additional devices data in the computer-readable stored medium(s) 330 of the vehicle gateway device 150.

At block 438, data can be aggregated and/or bucketed. In particular, the vehicle gateway device 150 can aggregate the vehicle location data and/or the additional devices data. For example, as opposed to a time series that includes pairs of time values and data values for relatively small units of time, the vehicle gateway device 150 can aggregate at least one of the vehicle location data or the additional devices data to represent that a respective data value is associated with a period time. Additionally or alternatively, the vehicle location data and/or the additional devices data can be bucketed. Block 438 for aggregating/bucketing data can be similar to blocks 410, 412 of FIG. 4A for aggregating/bucketing data. For example, similar to the bucketed vehicle metric data that was aggregated by the vehicle gateway device 150 described above with respect to FIG. 4A, the vehicle location data and/or the additional devices data can be bucketed/aggregated by the vehicle gateway device 150. For example, in the case of vehicle location data, particular locations or location areas can each have respective buckets and the vehicle gateway device 150 can determine how much time the vehicle 110 spent at each location or location area over a period of time, i.e., a cumulative time for each location bucket. For example, in the case of additional sensor data, ranges of the sensor data can each have respective buckets and the vehicle gateway device 150 can determine how much time the sensor spent within the respective sensor ranges over a period of time, i.e., a cumulative time for each sensor range bucket.

At block 440, it can be determined whether the aggregation time threshold has been met. In particular, the vehicle gateway device 150 can determine whether the aggregation time threshold has been met. Block 440 for determining whether the aggregation time threshold has been met can be similar to block 414 of FIG. 4A for determining whether the aggregation time threshold has been met. For example, the aggregation time threshold can be the same for the aggregated vehicle data, the vehicle location data, and/or the additional devices data. Also, in some embodiments, while not illustrated, the block 438 for aggregating/bucketing data can be performed after it has been determined that the aggregation time threshold has been met. If the aggregation time threshold has been met, the method can proceed to block 444. Otherwise, the method can return to block 432 to receive more vehicle location data and/or additional devices data and perform in a loop until the aggregation time threshold has been met. At blocks 444, 446, the vehicle location data and/or the additional devices data can be transmitted to a receiving server system. In particular, the vehicle gateway device 150 can transmit the vehicle location data and/or the additional devices data (which can be aggregated/bucketed) to the management server 140. As shown, after the data has been transmitted, the method can return to block 432 to receive more data and perform in a loop until the aggregation time threshold is met again.

Figure 5A:
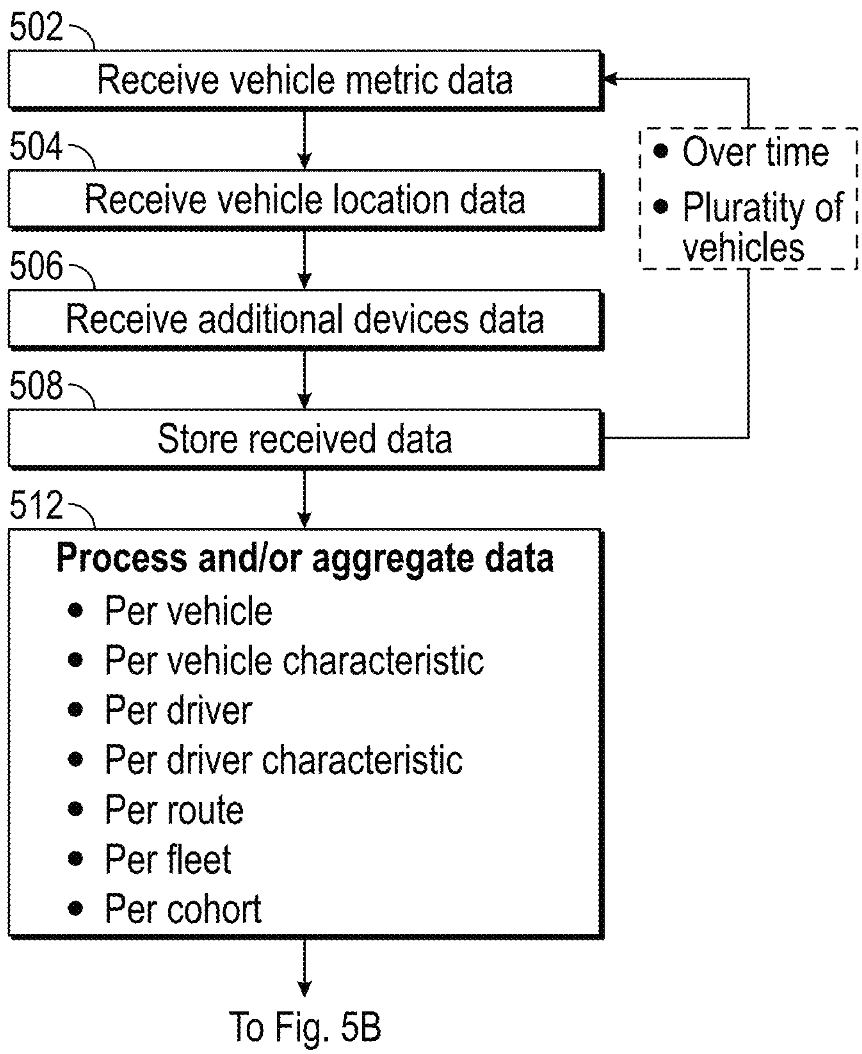
FIGS. 5A-5B are flowcharts illustrating example methods and functionality related to processing vehicle-related data and using the processed data, according to various embodiments of the present disclosure.
Figure 5B:
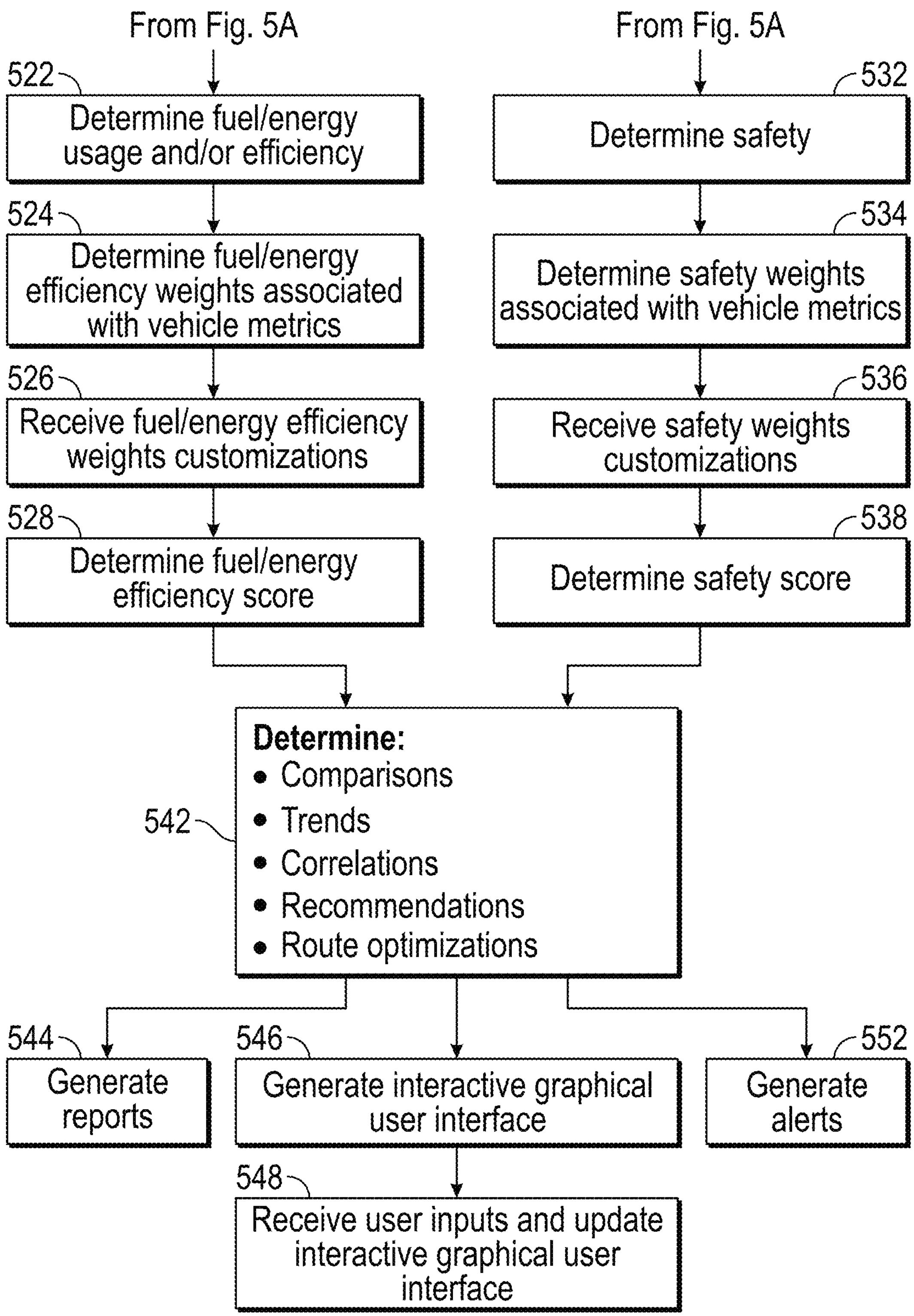

VII. Example Methods and Functionality for Processing Received and/or Aggregated Data FIGS. 5A-5B are flowcharts illustrating example methods and functionality related to processing vehicle-related data and using the processed data. Turning to FIG. 5A, beginning at blocks 502, 504, 506, data can be received. In particular, at block 502, a computing device (such as the management server 140) can receive vehicle metric data (such as the aggregated bucketed vehicle metric data) from the vehicle gateway device 150. At block 504, the computing device can receive vehicle location data from the vehicle gateway device 150. At block 506, the computing device can receive additional devices data from the vehicle gateway device 150. Other data can be received, such as data from third parties and/or data regarding fuel/energy purchasing. As described herein, the computing device (such as the management server 140) can receive the data in batches or intervals. At block 508, the received data can be stored. In particular, the management server 140 can store the received data in the computer-readable stored medium(s) 210, such as by storing the received data in the analysis-related database 256.

As depicted, the blocks 502, 504, 506, 508 for receiving and storing data can operate in a loop by returning to the first block 502. Thus, the management server 104 can receive and/or store data for multiple vehicle gateway devices and/or vehicles over time.

At block 512, the data can be processed and/or aggregated. In particular, the management server 140 can process and/or aggregate the data. As described herein, the management server 140 can receive bucketed data for a particular time window. Accordingly, the management server 140 can combine and/or take a portion of the bucketed data. For example, the management server 140 can determine a vehicle metric for a certain time period (such as one or several days) by at least combining bucketed data within the time period, where each bucket of data can correspond to a subset of the time period (such as bucketed data for every five minutes).

Figure 7A:
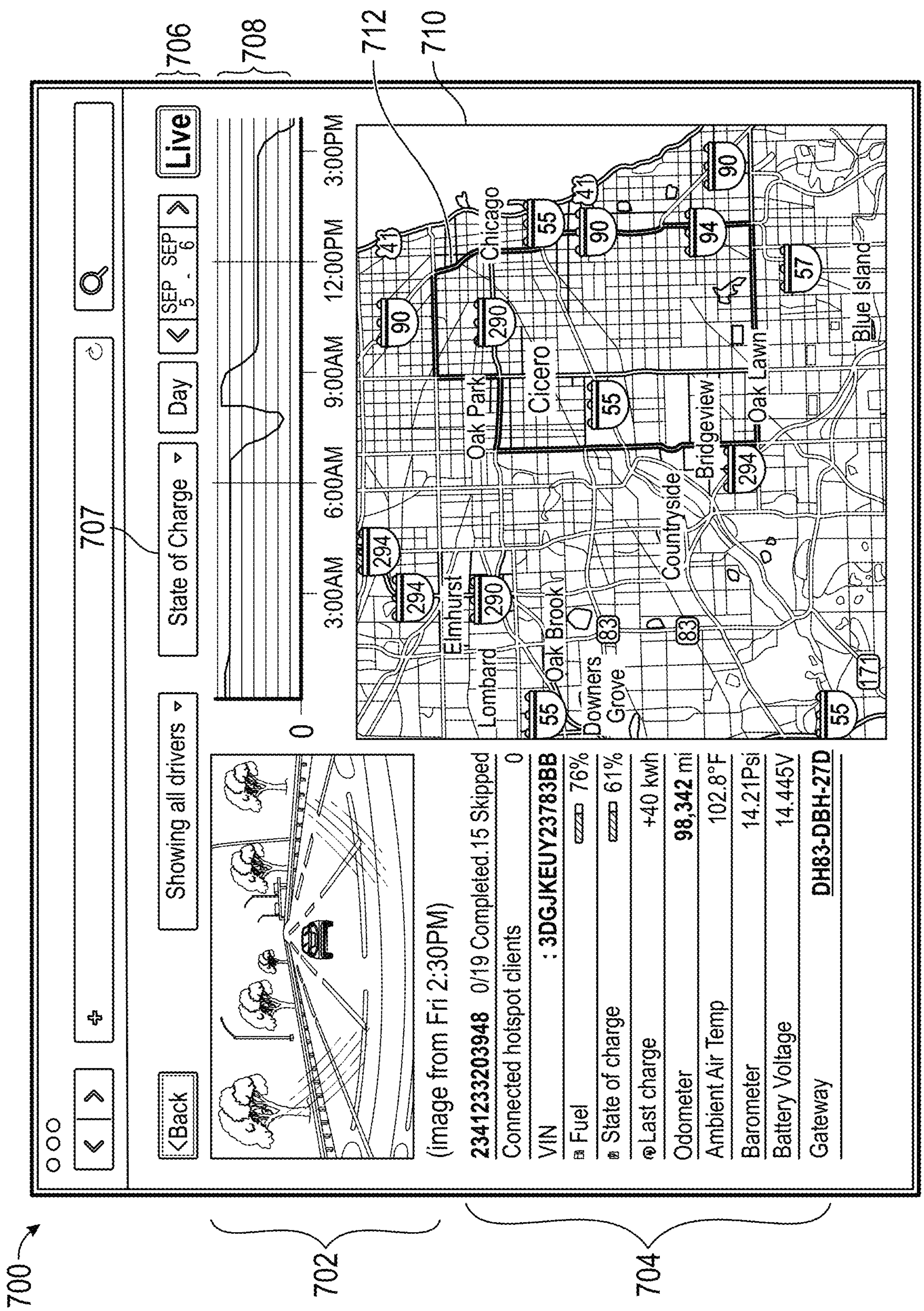
FIG. 7A illustrates an example interactive graphical user interface for presenting vehicle metadata, according to various embodiments of the present disclosure.
Figure 8A:
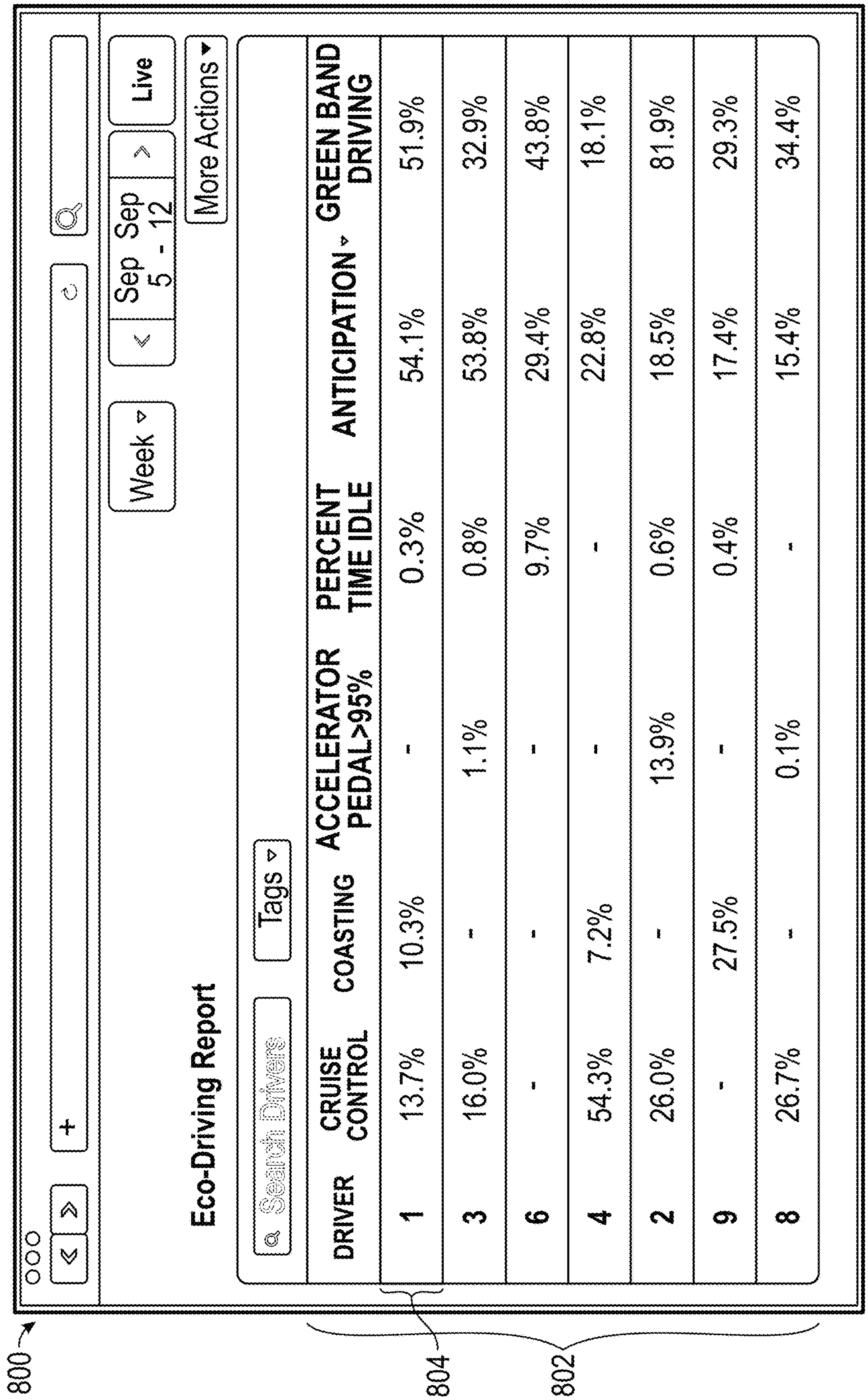
FIGS. 8A-8B illustrate example interactive graphical user interfaces for analyzing driver efficiency, according to various embodiments of the present disclosure.
Figure 9:
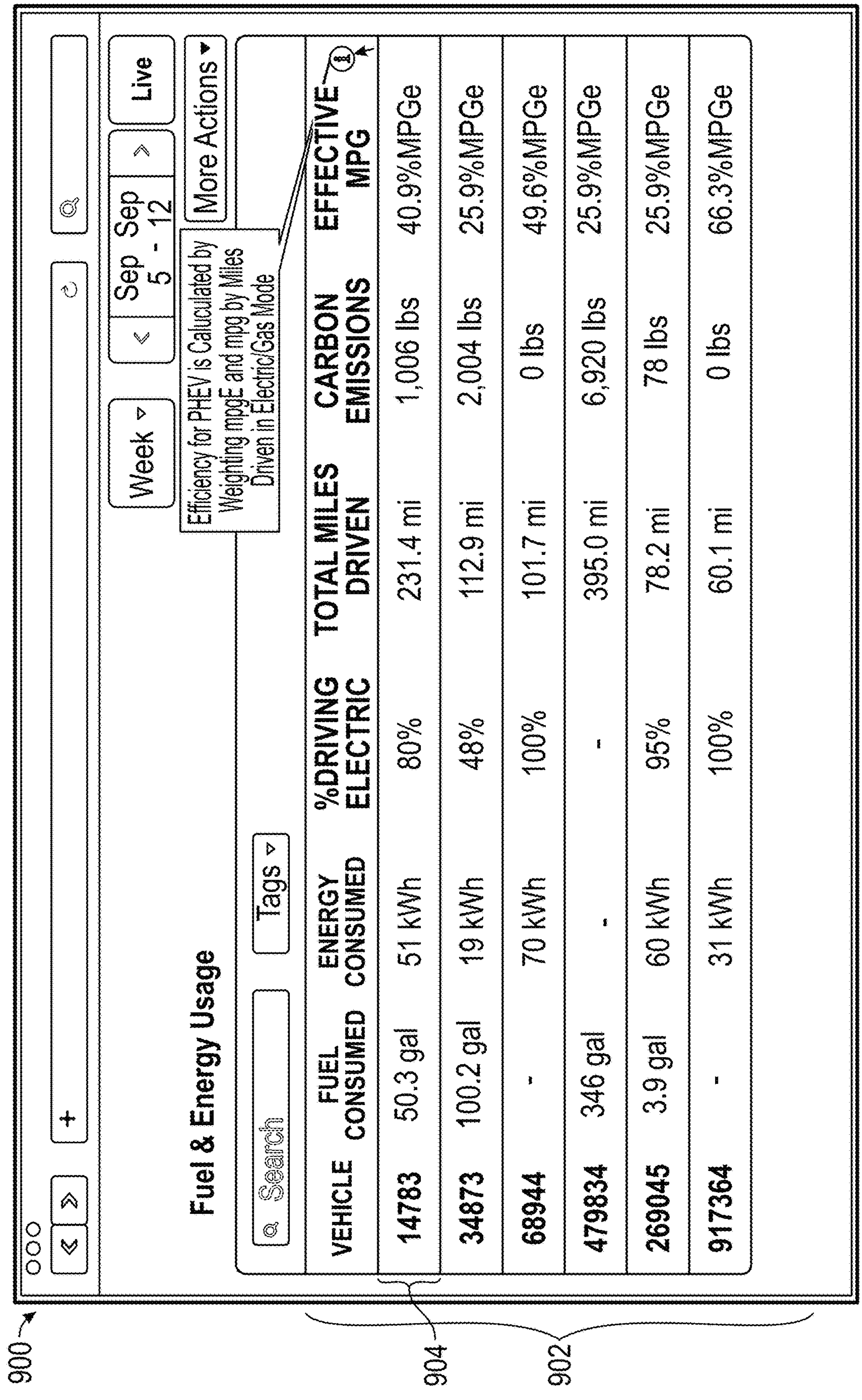
FIG. 9 illustrates an example interactive graphical user interface for analyzing vehicle fuel/energy usage, according to various embodiments of the present disclosure.

The management server 140 can aggregate/filter data based on a property in common. Example common properties can include a common vehicle, vehicle characteristic, driver, driver characteristic, route, fleet, cohort, and/or time period. The graphical user interfaces 700, 900, described in further detail below with respect to FIGS. 7A and 9, respectively, can depict aggregated data by vehicle. For example, as shown in FIG. 7A, the management server 104 can aggregate the state of charge (or other vehicle metric) of a particular vehicle. As shown in FIG. 9, the management server 104 can aggregate various metrics by vehicle to determine, for example, fuel/energy consumed or total miles driven. The graphical user interface 800, described in further detail below with respect to FIG. 8A, can depict aggregated data by driver. For example, as shown in FIG. 8A, the management server 104 can aggregate various vehicle metrics (such as cruise control, coasting, accelerator pedal, idling, anticipation, and/or RPM) by driver. The management server 104 can aggregate vehicle metrics from multiple vehicle gateway devices that are each associated with the same driver.

The management server 140 can combine different types of data. For example, the summary user interface 600, described in further detail below with respect to FIG. 6, can depict a combination of different types of data. To present the data in the summary user interface 600 of FIG. 6, the management server 140 can combine vehicle location data, vehicle metrics related to fuel/energy, speed data, and/or other vehicle metadata to display vehicle results, metadata, and the map 605. The management server 140 can aggregate the data based on a common characteristic, such as by a vehicle identifier.

The management server 104 can calculate some metrics. The summary user interface 900, described in further detail below with respect to FIG. 9, can depict some metrics that are calculated from other metrics. For example, as depicted in the user interface 900 of FIG. 9, the management server 104 can calculate estimated carbon emissions and/or effective mpg based on miles driven and/or other metrics.

In some embodiments, the management server 104 can pre-compute some metrics. For example, as the management server 104 receives data, the management server 104 can continuously process and/or aggregate the data on a running basis. Additionally or alternatively, the management server 104 can process and/or aggregate data in response to user requests. For example, the management server 104 can process and/or aggregate metrics in response to user selections to generate any of the user interfaces described herein.

From the block 512, the method can process data to determine different scores along different paths. For example, at block 522, fuel/energy usage and/or efficiency can be determined. In particular, the management server 104 can identify metrics associated with fuel/energy usage and/or efficiency. Example fuel/energy usage metrics can include, but are not limited to, fuel consumed, energy consumed, percent electric driving, total miles driven, carbon emissions, total emissions saved, energy recovered, and/or effective mpg. Example fuel/energy efficiency metrics can include, but are not limited to, cruise control use, coasting, accelerator pedal, time idling, anticipation, and/or RPM.

At block 524, fuel/energy efficiency weights associated with vehicle metrics can be determined. In particular, the management server 104 can determine fuel/energy efficiency weights using correlations. For example, the management server 104 can determine correlations among the vehicle metrics and the fuel/energy usage over various periods of time. Example correlations can indicate improved fuel/energy efficiency associated with one or more vehicle metrics, such as, but not limited to, cruise control use, coasting, accelerator pedal, time idling, anticipation, and/or RPM, and, in particular, a relative importance of particular vehicle metrics to efficient fuel/energy usage. The management server 104 can determine weightings of the one or more metrics based at least in part on the correlations. For example, it may turn out that RPM should have a higher weighting than coasting based on the impact on fuel/energy usage.

At block 526, fuel/energy efficiency weights customizations can be received. In particular, in some embodiments, the management server 104 can receive user-specified fuel/energy efficiency weights customizations. For example, an administrator can specify the relative importance of particular vehicle metrics for the purpose of determining fuel/energy efficiency.

At block 528, a fuel/energy efficiency score can be determined. In particular, the management server 104 can determine a fuel/energy efficiency score based on weights and the vehicle metric data. For example, the management server 104 can determine a fuel/energy efficiency score for a driver, route, vehicle, fleet, and/or cohort by combining multiple vehicle metrics according to the weightings. In some embodiments, a fuel/energy efficiency score can be calculated based on predefined weightings, which may not be based on system-determined correlations. The vehicle metrics can be weighted equally and/or differently. Example fuel/energy efficiency scores can be represented as a percentage, a letter, or some other indicator. The summary user interface 850, described in further detail below with respect to FIG. 8B, can depict some fuel/energy efficiency scores. As depicted in the user interface 850 of FIG. 8B, a letter score can be assigned to a vehicle, such as the first score 836, and/or to a group of vehicles, such as the second score 838. The management server 104 can assign a score to individual vehicle metrics. In some embodiments, predefined and/or user-defined percentages or value ranges can be assigned score indicators, such as an "A," "B," etc. efficiency grade.

From the block 512, the method can process data to determine a safety score along the paths including block 532. At block 532, safety can be determined. In some embodiments, the management server 104 can determine safety from driver history data. Example driver history data can indicate incidents associated with safety, such as incidents that involve an insurance provide like a car accident. Additionally or alternatively, safety can be determined without driver history data. For example, in some embodiments, the management server 104 can estimate safety based on known predictor metrics, such as coasting, anticipation, brake events, accelerator pedal use, cruise control use, etc.

At block 534, safety weights associated with vehicle metrics can be determined. In particular, the management server 104 can determine safety weights using correlations. For example, the management server 104 can determine correlations among the vehicle metrics and the driver history data over various periods of time. Example correlations can indicate improved safety associated with one or more vehicle metrics, such as, but not limited to, reduced hard accelerator pedal use, anticipation, cruise control use, coasting, etc., and, in particular, a relative importance of particular vehicle metrics to safety. The management server 104 can determine weightings of the one or more metrics based at least in part on the correlations. For example, it may turn out that reduced hard accelerator pedal use and/or anticipation should have a higher weighting than cruise control use based on the impact to vehicle safety.

At block 536, safety weights customizations can be received. In particular, in some embodiments, the management server 104 can receive user-specified safety weights customizations. For example, an administrator can specify the relative importance of particular vehicle metrics for the purpose of determining safety.

At block 538, a fuel/energy efficiency score can be determined. In particular, the management server 104 can determine a fuel/energy efficiency score based on weights and the vehicle metric data. For example, the management server 104 can determine a fuel/energy efficiency score for a driver, route, vehicle, fleet, and/or cohort by combining multiple vehicle metrics according to the weightings. In some embodiments, a fuel/energy efficiency score can be calculated based on predefined weightings, which may not be based on system-determined correlations. The vehicle metrics can be weighted equally and/or differently. Example fuel/energy efficiency scores can be represented as a percentage, a letter, or some other indicator. The summary user interface 850, described in further detail below with respect to FIG. 8B, can depict some fuel/energy efficiency scores. As depicted in the user interface 850 of FIG. 8B, a letter score can be assigned to a vehicle, such as the first score 836, and/or to a group of vehicles, such as the second score 838. The management server 104 can assign a score to individual vehicle metrics. In some embodiments, predefined and/or user-defined percentages or value ranges can be assigned score indicators, such as an "A," "B," etc. efficiency grade.

At block 542, comparisons, trends, correlations, recommendations, and/or route optimizations can be determined. In particular, the management server 104 can determine comparisons, trends, and/or correlations between different fleets and/or organizations. For example, the management server 104 can identify fleet sizes of similar sizes and generate comparison data regarding fuel/energy efficiency and/or safety. Thus, different fleets and/or organizations can be compared, which can allow organizations to improve fuel/energy efficiency and/or safety.

The management server 104 can include recommendation logic. For example, management server 104 can include rules where if drivers, vehicles, routes, and/or fleets have efficiency and/or safety scores below certain thresholds, then corresponding recommendations can be output for the efficiency and/or safety issues.

The management server 104 can perform route optimization. For example, the management server 104 fuel purchasing. The management server 104 can use the data regarding vehicles, geolocation data regarding the vehicles, the vehicle fuel/energy efficiency, driving behavior, and/or fuel level, to make routing recommendations for fuel stops. An example recommendation can indicate that after a delivery a vehicle should fuel at a particular gas station because, based on data from fuel card vendors, that the particular gas station may not be cheapest, but the vehicle may not have to make a left turn in or out and it will get the vehicle back on the route without adding significant stop time.

At block 542, a report can be generated. In particular, the management server 104 can generate reports that correspond to any of the user interfaces described herein. At block 546, interactive graphical user interfaces can be generated. In particular, the management server 104 can generate user interfaces that correspond to or are similar to any of the user interfaces described herein, such as the user interfaces described in further detail below with respect to FIGS. 6, 7A-7C, 8A-8B, 9, 10A-10B, 11, 12, and 13. At block 548, user input can be received and the graphical user interfaces can update. In particular, the management server 104 can generate update user interfaces in response to receiving user input, such as user selections and/or filters.

At block 552, alerts can be generated. In particular, the management server 104 can generate alerts related to vehicle metrics. For example, the management server 104 can generate alerts related to fuel/energy state, such as low fuel/battery charge and/or a completion or expected completion of a battery recharge. In some embodiments, the alerts can be user defined.

VIII. Example Monitoring and Data Analysis Graphical User Interfaces

FIGS. 6, 7A-7C, 8A-8B, 9, 10A-10B, 11, 12, and 13 illustrate example interactive graphical user interfaces related to monitoring and analysis of data from vehicle gateway devices, according to various embodiments of the present disclosure. The interactive graphical user interfaces of FIGS. 6, 7A-7C, 8A-8B, 9, 10A-10B, 11, 12, and 13 may be provided by the management server 140, and may be accessible via user device(s) 120. In general, received data and analysis data are automatically gathered from multiple vehicle gateway devices 150 by the management server 140 (as described herein), and the received data and analysis data may then be further aggregated and analyzed to provide information and insights as described herein. Typically, the graphical user interfaces provided by the management server 140 are specific to an organization, and may include information from multiple vehicle gateway devices 150 associated with the organization.

Figure 6:
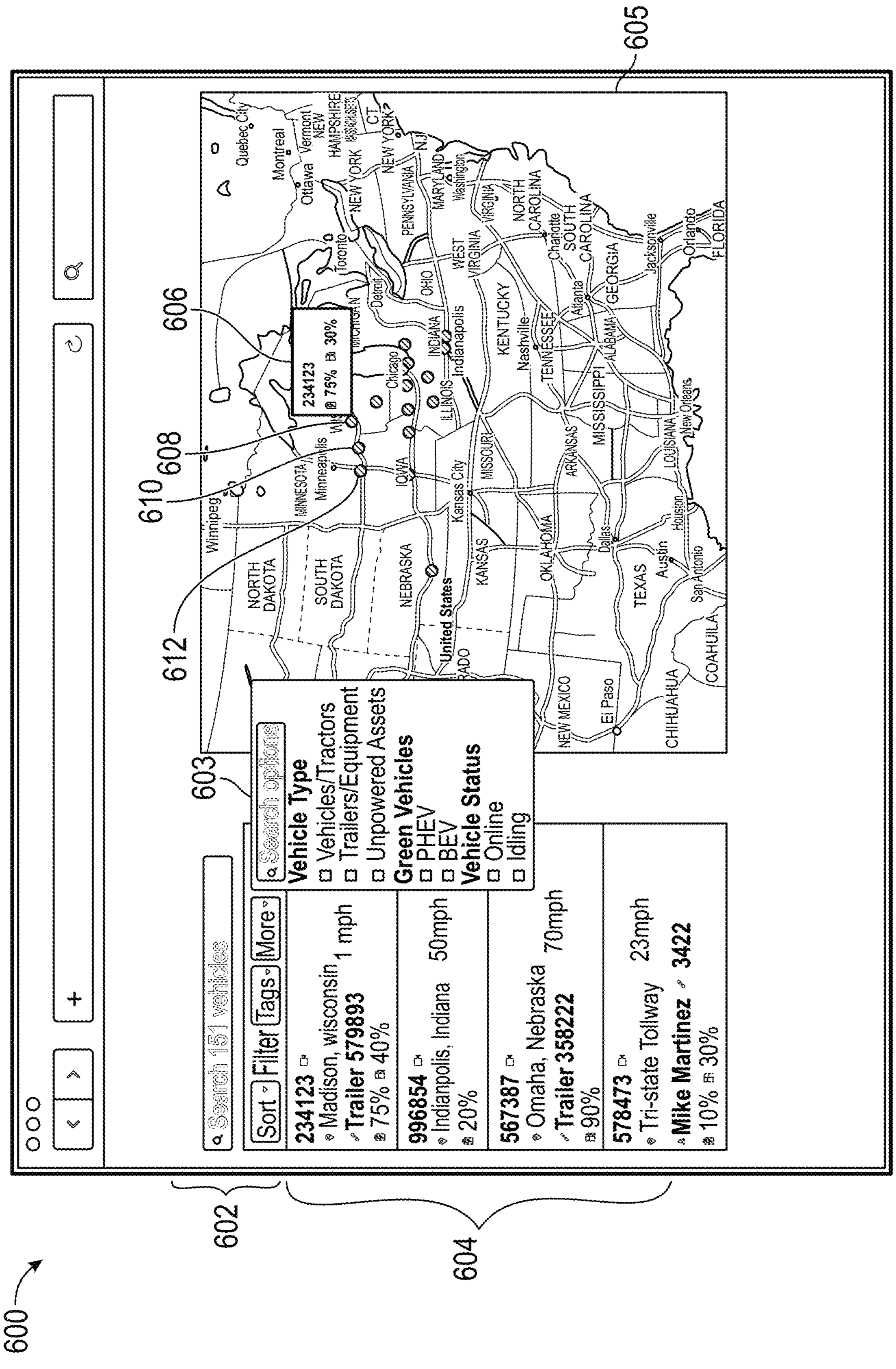
FIG. 6 illustrates an example interactive graphical user interface for searching/presenting vehicles and/or associated vehicle metadata, according to various embodiments of the present disclosure.

FIG. 6 illustrates an example interactive graphical user interface 600 for searching/presenting vehicles and/or associated vehicle metadata. The graphical user interface 600 can include search areas 602, 603, vehicle results 604, and a map 605. A user can search for vehicle(s) using the search areas 602, 603 by specifying text and/or filters. The map 605 can include annotations 606, 608, 610, 612 that correspond to results from the vehicle results 604. User selections, such as user input provided to the search areas 602, 603, can cause the vehicle results 604 and/or the map 605 to dynamically update. In particular, in response to user selection(s), the map can zoom-in on the filtered results. In some embodiments, an element associated with a vehicle in the graphical user interface 600 is selectable and can cause presentation of a vehicle-specific user interface, such as the graphical user interface 700 described below with respect to FIG. 7A.

FIG. 7A illustrates an example interactive graphical user interface 700 for presenting vehicle metadata for a particular vehicle. As described herein, a vehicle gateway device can transmit vehicle metadata, such as metrics and/or location data, to the management server 104, which can cause presentation of the graphical user interface 700 that can include or be based on the metadata. The graphical user interface 700 can include vehicle metadata 704. The graphical user interface 700 can include an image 702 captured from a camera in the vehicle. The graphical user interface 700 can include a map 710. The map 710 can be based on the location data received from the vehicle gateway device of the vehicle. The map 710 can display route(s) 712 of the vehicle. The graphical user interface 700 can include visualizations based on the vehicle metric(s), such as the visualization 708. The visualization 708 can visually depict a graph for the state of charge metric over a period of time. A user can change the metric associated with the visualization 708 with the metric selector 707, which can cause the visualization 708 to update accordingly. A user can select a particular date/time range of interest with the interface selector(s) 706 and may select how at least some of the data associated the vehicle should be aggregated (e.g., day, week, month, etc.) and presented within the graphical user interface 700. Using the interface selector(s) 706, the user may determine whether the displayed data is live data, and may select to view live, constantly updated data being received from the vehicle. As depicted, additional interface selector(s) 706 can allow a user to select a particular operator of the vehicle, which can cause graphical user interface 700 to update accordingly.

Figure 7B:
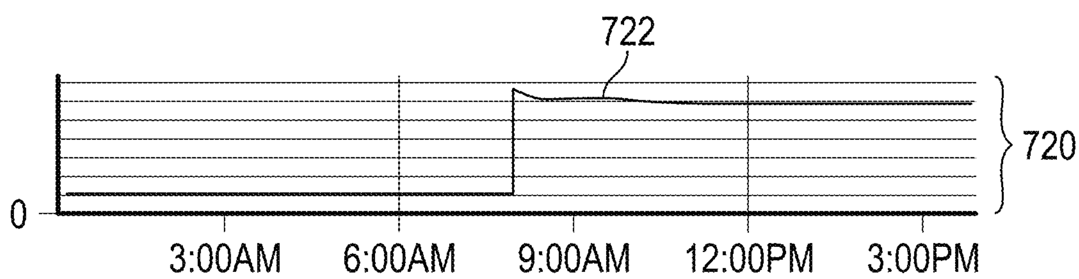
FIGS. 7B-7C illustrate example visualizations of battery charge metrics, according to various embodiments of the present disclosure.
Figure 7C:
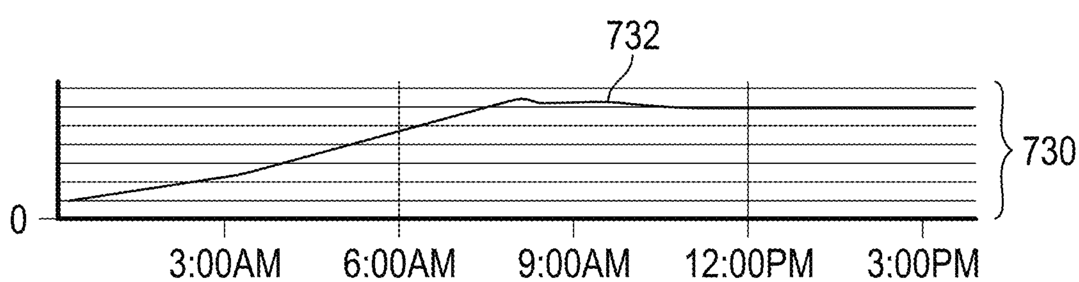

FIGS. 7B-7C illustrate example visualizations of battery charge metrics, which can be included in graphical user interfaces. In FIG. 7B, the visualization 720 includes a graph 722 that represents a vehicle battery's charge over time, as indicated by the vehicle metrics from the vehicle gateway device. As described herein, in some cases, the vehicle gateway device may be unable to accurately report a vehicle's battery charge while the vehicle is charging because the vehicle may be in an off state. Accordingly, the visualization 720 and the graph 722 can be generated by a system that does not have estimation features enabled and is reporting the most recent battery charge data as transmitted by the vehicle gateway device. As depicted, the graph 722 has a flat line and then suddenly and sharply increases in value. The sudden increase in value in the graph 722 can correspond to when the vehicle stopped charging and/or the vehicle was turned on again, which allowed the vehicle gateway device to transmit an updated vehicle charge metric.

In FIG. 7C, the visualization 730 includes a graph 732 that represents an estimated vehicle battery's charge over time. As mentioned above, the visualization 730 can be included in a graphical user interface. For example, the visualization 730 of FIG. 7C can be presented in the graphical user interface 700 and can replace the visualization 708 of FIG. 7A. In contrast with the graph 722 of FIG. 7B that included a sudden increase in charge value when the battery metric became available, the graph 732 of FIG. 7C can more accurately represent a vehicle charge because the server can estimate the graph 732 from historical data, as described herein.

Figure 8B:
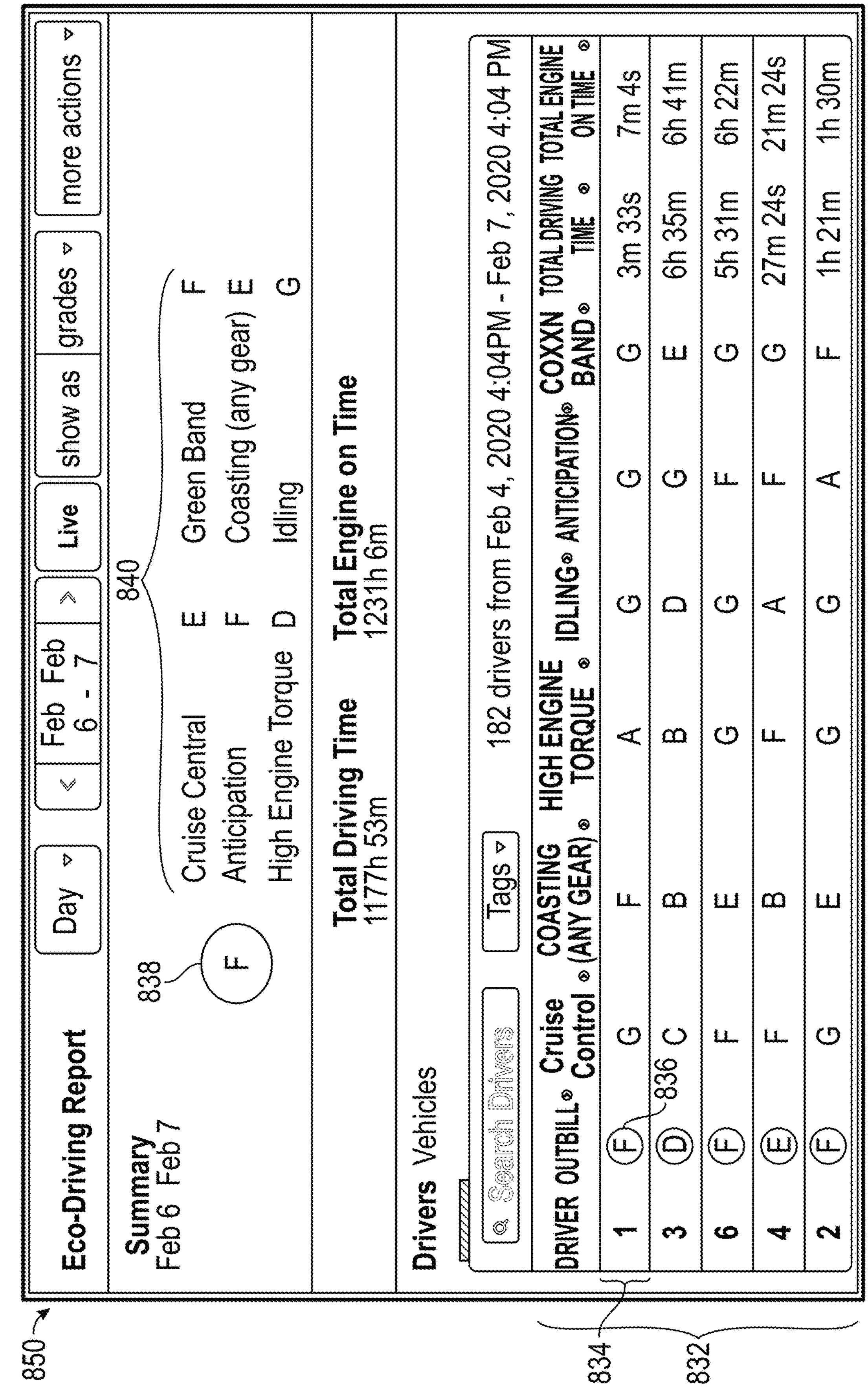

FIGS. 8A-8B illustrate example interactive graphical user interfaces related to driver efficiency. In FIG. 8A, the graphical user interface 800 includes a vehicle metric summary area 802. The vehicle metric summary area 802 can include vehicle metrics, which can be based on aggregated and/or filtered data. As described herein, the vehicle metrics can be aggregated and/or filtered by driver and/or for a particular time period. For example, the first set of vehicle metrics 804 in the vehicle metric summary area 802 can be associated with a first driver, such as the driver "1" here.

The vehicle metrics in the vehicle metric summary area 802 can be associated with fuel/energy efficiency and/or safety. As depicted, the vehicle metrics can be associated with cruise control, coasting, the accelerator pedal, idling, anticipation, and RPM range(s) (e.g., "GREEN BAND DRIVING." The vehicle metrics in the vehicle metric summary area 802 can be fuel/energy efficiency and/or safety indicators. The vehicle metrics 804 can include percentages, which can indicate an amount of use of those particular features. For example, the first set of vehicle metrics 804 can include percentages, such as "13.7%," that indicates that a driver (here driver "1") used cruise control 13.7% of the time over the specified time period.

In FIG. 8B, the graphical user interface 850 can be similar to the graphical user interface 800 of FIG. 8A. Similar to the vehicle metric summary area 802 of FIG. 8A, the vehicle metric summary area 832 can include vehicle metrics and the vehicle metrics can be aggregated and/or filtered for a particular driver and/or for a particular time period. However, the vehicle metrics in FIG. 8B can be represented differently than the metrics in FIG. 8A. The vehicle metrics in the vehicle metric summary area 832 can include fuel/energy efficiency and/or safety indicators, a fuel/energy efficiency score for a particular driver, and/or an overall fuel/energy efficiency score for multiple drivers. For each of the vehicle metrics (such as cruise control, coasting, engine torque, idling, anticipation, and RPM range(s)), a fuel/energy efficiency and/or safety indicators can be assigned. As depicted, example indicators can be represented as a letter. While a letter for a score is used in FIG. 8B, other score representations can be used by the system. In some embodiments, a percentage and/or other numeric value for a vehicle metric can be determined for the results, and the percentage and/or or other numeric value within a range or threshold can be assigned an indicator, such as a score/letter. With reference to the first set of vehicle metrics 834, a fuel/energy efficiency score 836 can represent a combined score for a particular driver, where the score 836 can be based on the first set of vehicle metrics 834, as described herein.

In FIG. 8B, the graphical user interface 850 can further include aggregated vehicle metrics 840 and a fuel/energy efficiency score 838 for multiple drivers. The aggregated vehicle metrics 840 can be an aggregation of metrics for multiple drivers. Similarly, the fuel/energy efficiency score 838 can be a score for multiple drivers and/or can be based on the aggregated vehicle metrics 840.

FIG. 9 illustrates an example interactive graphical user interface 900 for analyzing vehicle fuel/energy usage. The graphical user interface 900 includes a fuel/energy usage summary area 902, which can include metrics related to fuel/energy usage. The fuel/energy usage metrics in the fuel/energy usage summary area 902 can be based on aggregated and/or filtered data. As described herein, the fuel/energy usage metrics can be aggregated and/or filtered by vehicle and/or for a particular time period. For example, the first set of fuel/energy usage metrics 904 in the fuel/energy usage summary area 902 can be associated with a first vehicle, such as the vehicle "14783" here. As depicted, example fuel/energy usage metrics can be related to fuel consumed, energy consumed, percentage of electric driving, total distance driven, carbon emissions, and/or fuel economy, such as effective miles per gallon.

Figure 10A:
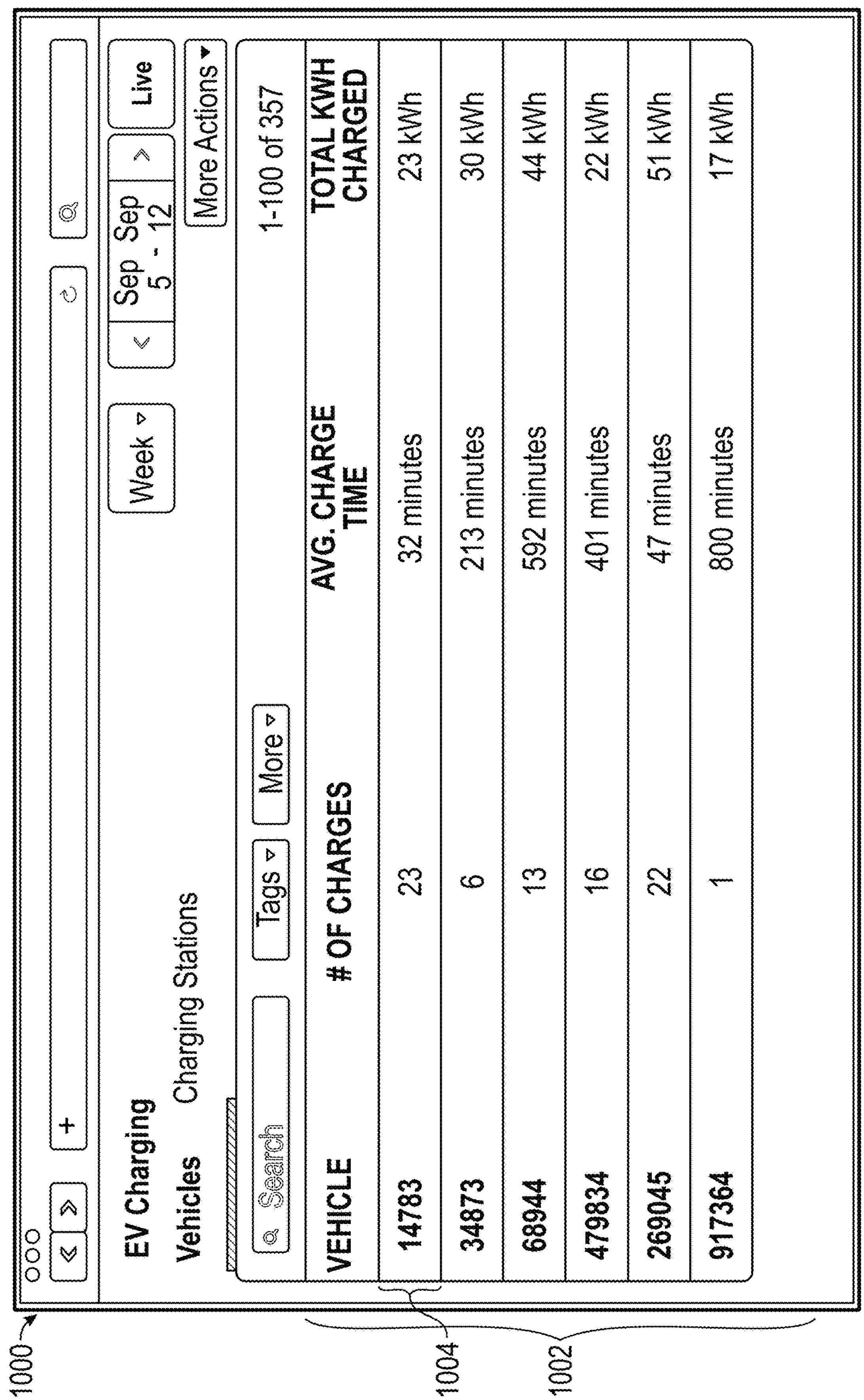
FIGS. 10A-10B illustrate example interactive graphical user interfaces for analyzing vehicle charging, according to various embodiments of the present disclosure.
Figure 10B:
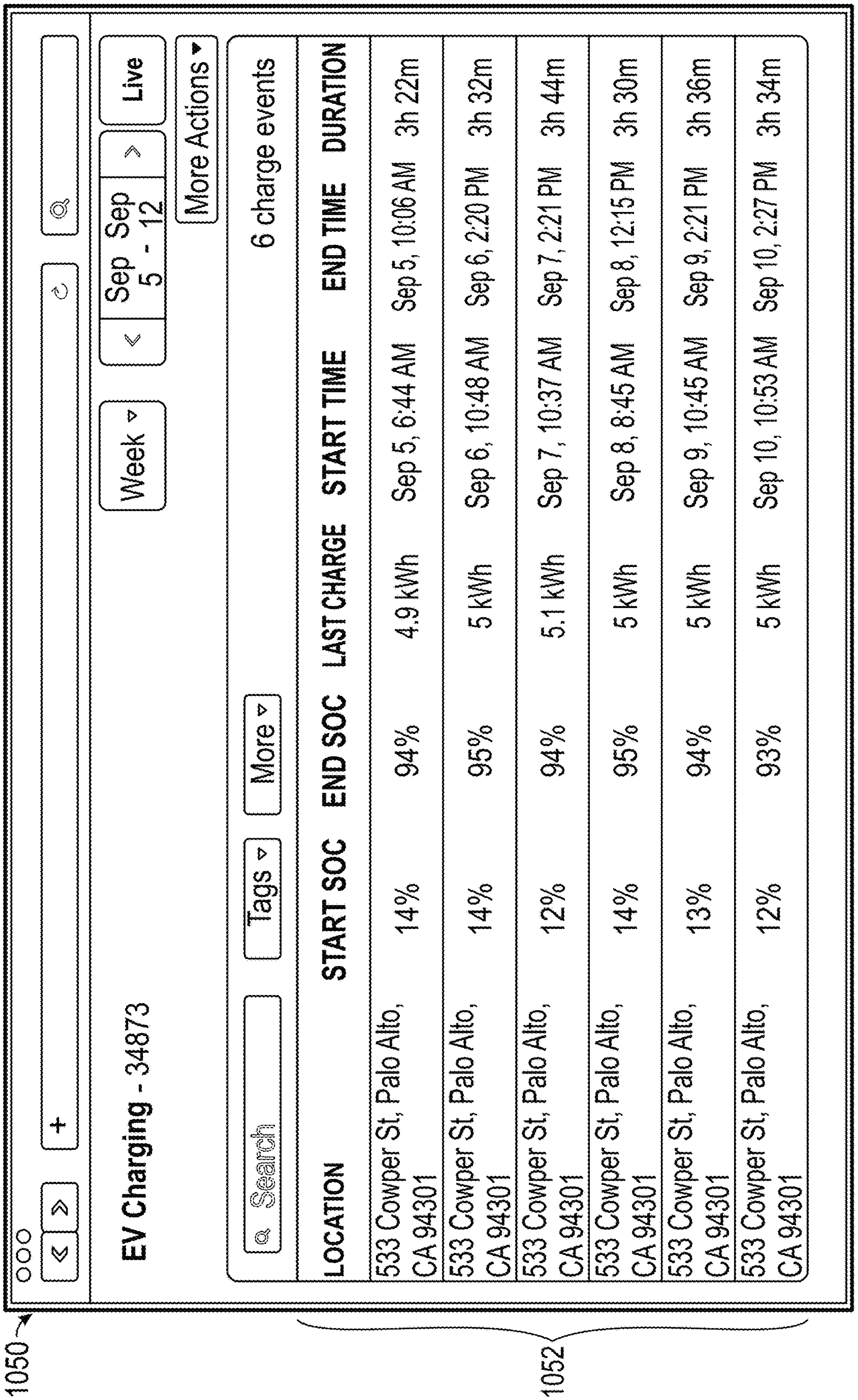

FIGS. 10A-10B illustrate example interactive graphical user interfaces for analyzing vehicle charging. In FIG. 10A, the graphical user interface 1000 includes a vehicle charging summary area 1002, which can include summary metrics related to vehicle charging. The charging summary metrics in the vehicle charging summary area 1002 can be based on aggregated and/or filtered data. As described herein, the charging summary metrics can be aggregated and/or filtered by vehicle and/or for a particular time period. For example, the first set of charging summary metrics 1004 in the vehicle charging summary area 1002 can be associated with a first vehicle, such as the vehicle "14783" here. As depicted, example charging summary metrics can be related to number of charges, a statistical measure of charge time (such as average charge time), and/or an amount of energy charged (such as a total kilowatt-hour (kWh) charged). In some embodiments, portions of the vehicle charging summary area 1002 are selectable. For example, an element associated with a vehicle, such as the "14783" text or the "34873" text, can be selected by a user, which can cause the user interface to update and display details regarding charge events associated with the respective vehicle, which can be described in further detail below with respect to FIG. 10B.

In FIG. 10B, the graphical user interface 1050 includes a vehicle charging summary area 1052. The vehicle charging summary area 1052 can include depictions of charge events, which can be based on aggregated and/or filtered data. As described herein, each charge event can be stored as a charge record in a database. The charge events can be aggregated and/or filtered by vehicle and/or for a particular time period. For example, the charge events in the vehicle charging summary area 1052 can be for a particular vehicle, such as the vehicle "34873" here. Each charge event in the vehicle charging summary area 1052 can include information such as a start state of charge, an end state of charge, a last charge, a start time, an end time, and/or a duration.

Figure 11:
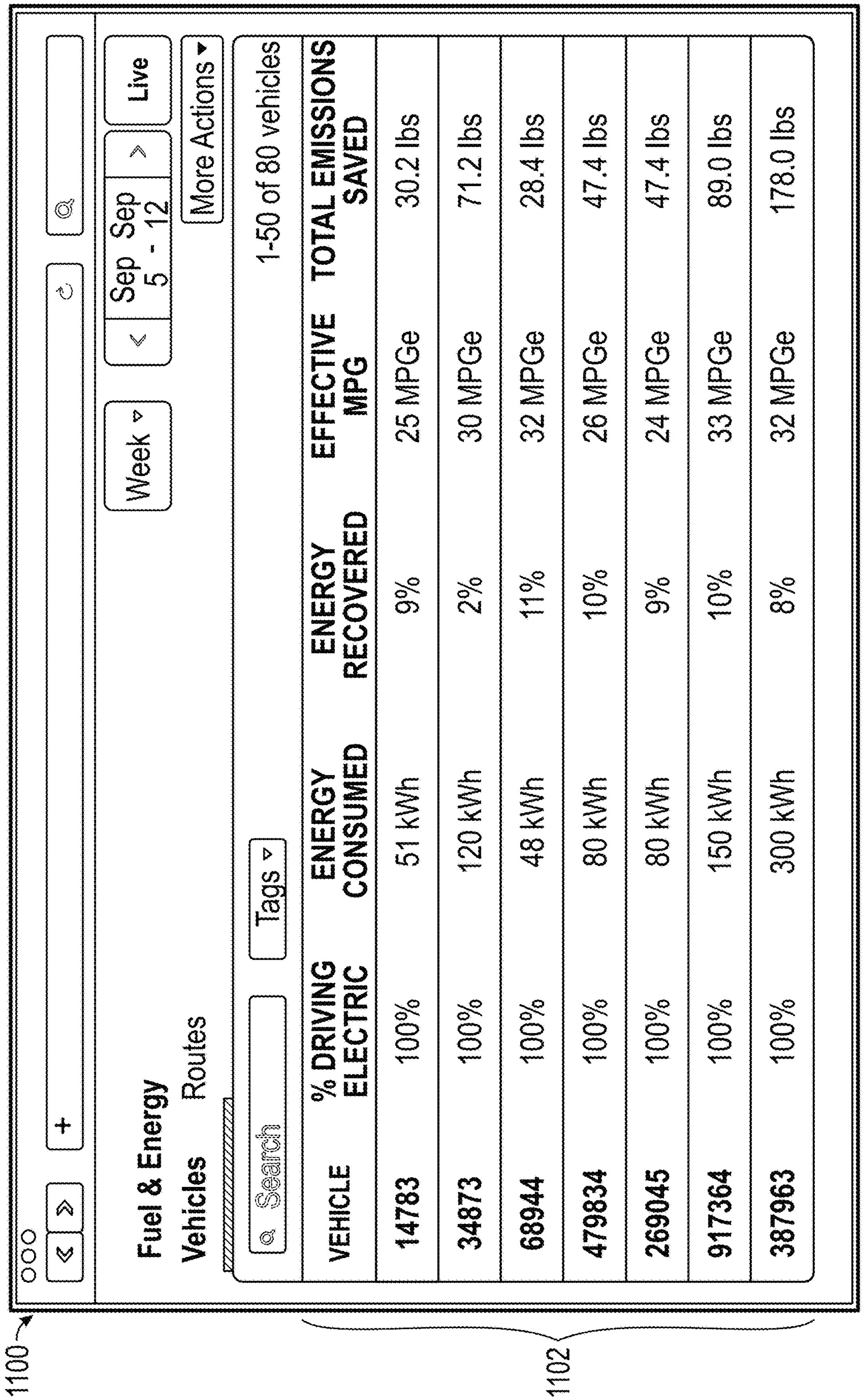
FIG. 11 illustrates another example interactive graphical user interface for analyzing vehicle fuel/energy usage, according to various embodiments of the present disclosure.

FIG. 11 illustrates an example interactive graphical user interface 1100 for analyzing vehicle fuel/energy usage. The graphical user interface 1100 of FIG. 11 can be similar to the graphical user interface 900 of FIG. 9 for analyzing vehicle fuel/energy usage. The graphical user interface 1100 includes a fuel/energy usage summary area 1102, which can include metrics related to fuel/energy usage. The fuel/energy usage metrics in the fuel/energy usage summary area 1102 can be aggregated and/or filtered by vehicle and/or for a particular time period. As depicted, example fuel/energy usage metrics can be related to an amount of electric driving, energy consumed, energy recovered, fuel economy (such as effective miles per gallon), and/or emissions saved.

Figure 12:
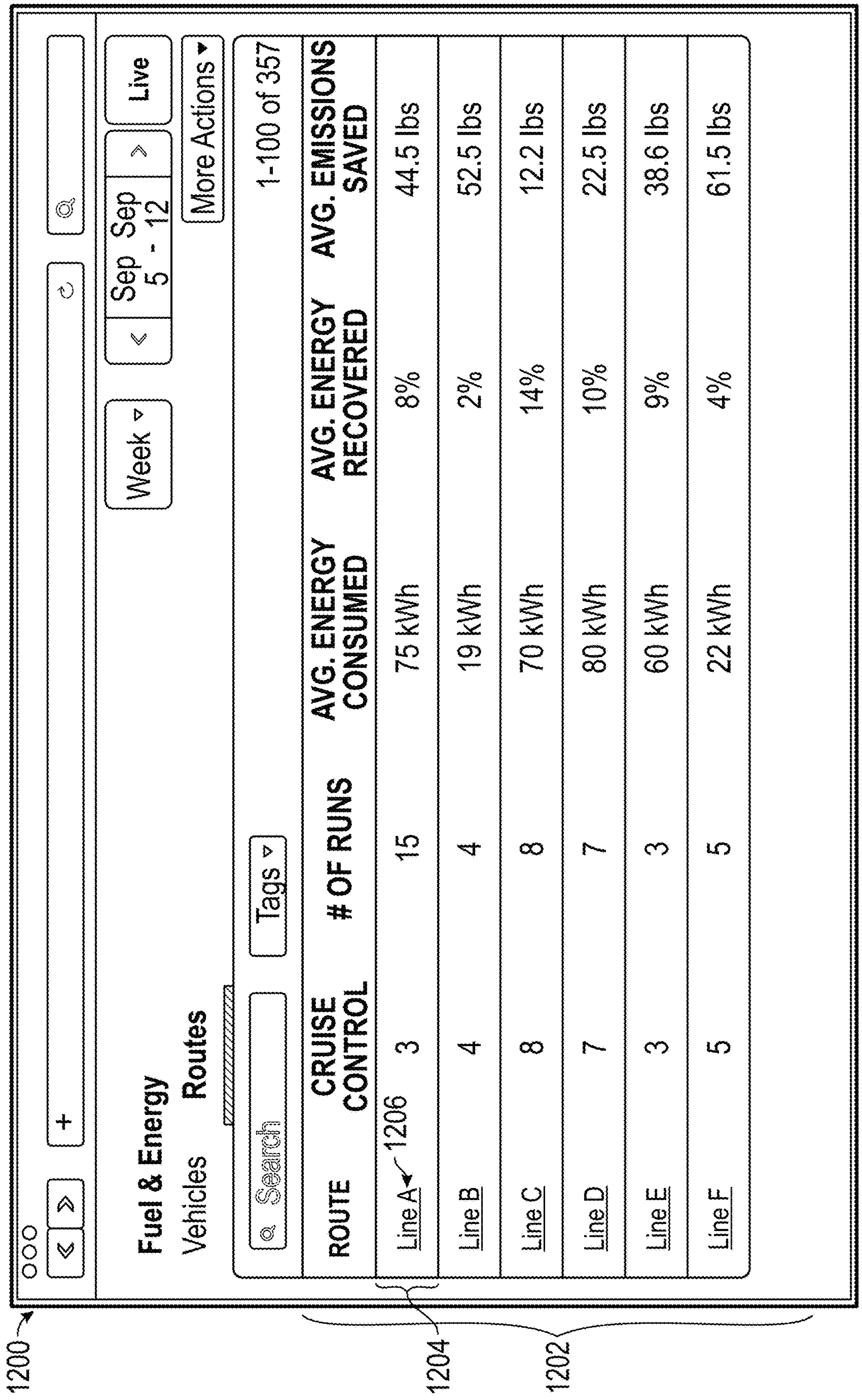
FIGS. 12 and 13 illustrate example interactive graphical user interfaces for analyzing route efficiency and/or fuel/energy usage, according to various embodiments of the present disclosure.
Figure 13:
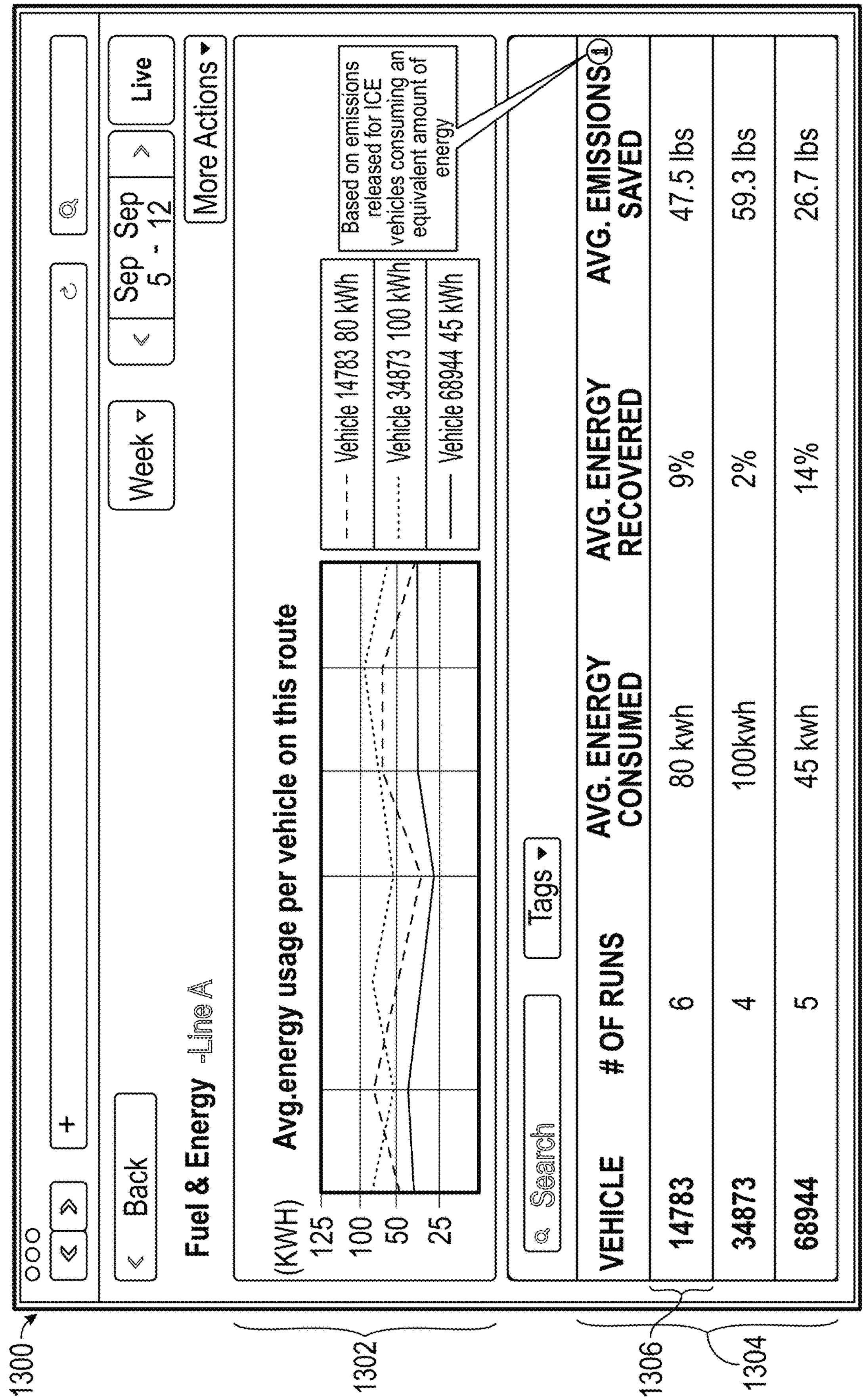

FIGS. 12 and 13 illustrate example interactive graphical user interfaces for analyzing route efficiency and/or fuel/energy usage. In FIG. 12, the graphical user interface 1200 includes a fuel/energy summary area 1202, which can include metrics related to fuel/energy usage. The graphical user interface 1200 of FIG. 12 can be similar to the graphical user interface 1100 of FIG. 11 for analyzing vehicle fuel/energy usage. However, a difference between the graphical user interface 1200 of FIG. 12 and the graphical user interface 1100 of FIG. 11 can be the characteristic upon which vehicle metrics are aggregated. The fuel/energy usage metrics in the fuel/energy summary area 1202 can be aggregated and/or filtered by route (instead of vehicle) and/or for a particular time period. For example, the first set of fuel/energy metrics 1204 in the fuel/energy summary area 1202 can be associated with a first route, such as the "Line A" route here. As depicted, example fuel/energy efficiency and/or usage metrics can be related to cruise control (such as a number of times cruise control was used during a run on that route), number of runs, a statistical measure of energy consumed (such as an average), a statistical measure of energy recovered (such as an average), and/or a statistical measure of emissions saved (such as an average).

In the graphical user interface 1200, the element 1206 for a particular route (here Line A) can be selectable. User selection of the element 1206 can cause presentation of a route-specific user interface, such as the graphical user interface 1300 described below with respect to FIG. 13.

In FIG. 13, the graphical user interface 1300 includes a fuel/energy visualization area 1302 and a fuel/energy summary area 1304, which can include metrics related to fuel/energy usage for a particular route. The fuel/energy visualization area 1302 and/or the fuel/energy summary area 1304 can include vehicle metrics, which can be based on aggregated and/or filtered data. As described herein, the vehicle metrics can be aggregated and/or filtered by vehicle, for a particular route, and/or for a particular time period. For example, fuel/energy visualization area 1302 can include one or more graphs that depict a statistical measure of fuel/energy usage per vehicle over time for a particular route. As another example, with respect to the fuel/energy summary area 1304, the first set of fuel/energy summary metrics 1306 can be associated with a first vehicle on the particular route, such as the vehicle "14783" here on the "Line A" route. As depicted, example fuel/energy usage metrics per vehicle on a particular route can be related to number of runs, a statistical measure of energy consumed (such as an average), a statistical measure of energy recovered (such as an average), and/or a statistical measure of emissions saved (such as an average).

IX. Example Methods and Functionality for Vehicle Battery Charge Estimation

Figure 14:
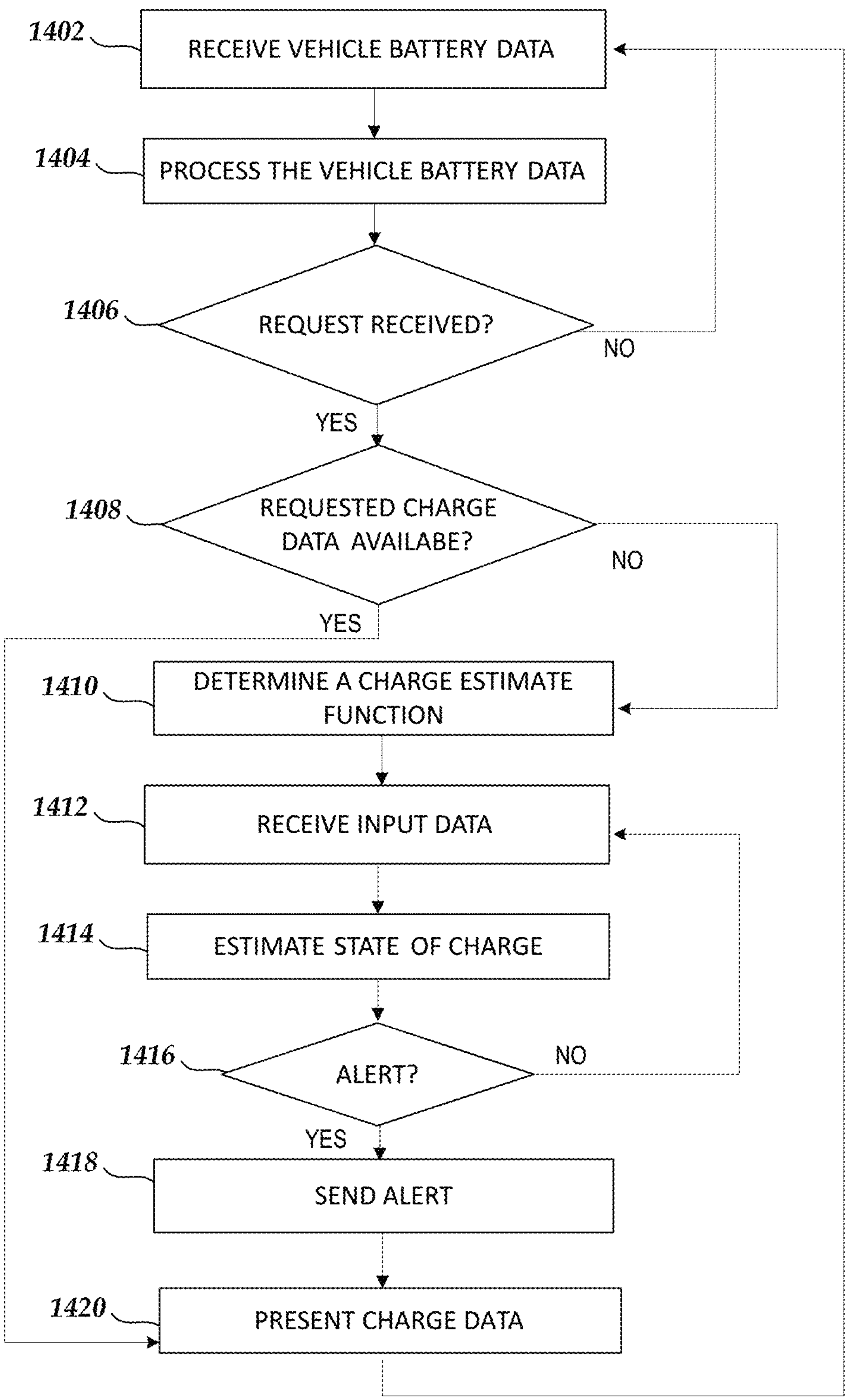
FIG. 14 is a flowchart illustrating example methods and functionality for vehicle battery charge estimation, according to various embodiments of the present disclosure.

FIG. 14 is a flowchart illustrating example methods and functionality for vehicle battery charge estimation. The flowchart of FIG. 14 can be similar to the flowcharts of FIGS. 5A-5B that are related to processing vehicle-related data and using the processed data.

Beginning at block 1402, vehicle battery data can be received. In particular, a computing device (such as the management server 140) can receive vehicle battery data from the vehicle gateway device 150. In some embodiments, the management server 140 can receive vehicle battery data, such as charge records associated with a battery from the vehicle. Example vehicle battery data (such as charge records) can include: (i) a start state of charge, (ii) an end state of charge, and (iii) an amount of energy charged. Example depictions of charge records can be shown in FIG. 10B. Additional example vehicle battery data (such as charge records) can include: (i) data indicative of an amount of energy charged relative to a capacity of the battery and (ii) an amount of energy charged relative to a period of time. The start and end state of charges can be represented as a percentage. Similarly, data indicative of an amount of energy charged relative to a capacity of the battery can be represented as a percentage. An amount of energy charged and/or an amount of energy charged relative to a period of time can in a unit of energy, such as a kilowatt-hour (kWh). In some embodiments, the vehicle gateway device 150 can determine the charge records. As described herein, some vehicle computers are turned off while charging and it may not be possible to receive charge information in substantially real-time. Accordingly, the management server 140 can receive vehicle battery data that is historical and represents previous charge event(s).

In some embodiments, the vehicle battery data can be in a less processed format than a charge record format. For example, instead of a charge record, the vehicle battery data can be in a format closer to what the vehicle gateway device 150 receives from a battery management system (BMS). Accordingly, the management server 140 can process the vehicle battery data as described below with respect to the next block 1404.

At block 1404, the vehicle battery data can be processed. In particular, the management server 140 can process the vehicle battery data. For example, processing by the management server 140 can include storing the vehicle battery data in the analysis-related database 256. Additionally or alternatively, the management server 140 can determine (i) a start state of charge, (ii) an end state of charge, and (iii) an amount of energy charged, (iv) data indicative of an amount of energy charged relative to a capacity of the battery, and/or (v) an amount of energy charged relative to a period of time from the vehicle battery data. As described herein, processing vehicle data can include processing of bucketed data.

At block 1406, it can be determined whether a state of charge request has been received. In particular, the management server 104 can determine whether a state of charge request has been received. A user computing device 120 can cause a state of charge request to be sent to the management server 140. For example, a user computing device 120 that requests the graphical user interface 700 of FIG. 7A, described above, can cause a state of charge request to be received by the management server 140 because the graphical user interface 700 can include a state of charge metric. An example state of charge request can be for a particular vehicle and for a particular time period. As depicted, if a state of charge request has not been received, the method can return to block 1402 to receive vehicle battery data in a loop over time, which can be from multiple vehicles. If a state of charge request has been received, the method can proceed to block 1408.

At block 1408, it can be determined whether the requested charge data is available. In particular, the management server 140 can determine whether the requested charge data is available. As described herein, a vehicle computer can be turned off while a vehicle is charging and it may not be possible for the vehicle gateway device 150 to receive a current state of charge from the vehicle's battery management system. Accordingly, while the vehicle gateway device is unable to transmit vehicle battery data associated with the current charge of the battery, a user computer device 120 can request the current state of charge of the battery and the method can proceed to subsequent blocks 1410, 1412, 1414, 1416, 1418, 1420. In particular, if a state of charge request for a current state of charge request is sent while the current state of charge is unavailable, then the method can proceed to the next block 1410. Conversely, charge data can be available if, for example, the vehicle computer is turned on or the state of charge request is for a historical state of charge and the historical data is available. If the charge data is available, then the method can proceed to block 1420.

At block 1410, a charge estimate function can be determined. In particular, the management server 140 can determine a charge estimate function. An example charge estimate function can output an estimated current state of charge based on historical vehicle battery data. In some embodiments, the management server 140 can determine a customized charge estimate function, which is customized for a particular vehicle/battery. For example, the estimated current state of charge of a battery can be based on historical vehicle battery data from the same battery. Example input to a charge estimate function can include an approximate start time for a current charge of the battery, a last state of charge for the battery, and/or a current time. Example output of a charge estimate function can include one or more state of charge values over a period of time. An example charge estimate function can also be used by the management server 140 to determine an expected time when the vehicle battery will reach a certain state of charge.

In some embodiments, the management server 140 can determine a charge estimate function from one or more charge records that indicate (i) a start state of charge, (ii) an end state of charge, and (iii) an amount of energy charged, (iv) data indicative of an amount of energy charged relative to a capacity of the battery, and/or (v) an amount of energy charged relative to a period of time from the vehicle battery data. A charge estimate function based on one or more charge records can define a linear function with an equation substantially similar to y=mx+b. For example, a linear equation can be determined from a start state of charge, an end state of charge, and an amount of energy charged over a period of time. Similarly, a linear equation can be determined data from (i) an amount of energy charged relative to a capacity of the battery and (ii) an amount of energy charged relative to a period of time. The management server 140 can determine a charge estimate function from multiple charge records by combining multiple charge records, such as by taking an average, a weighted average, or a decaying average based on the age of the charge record.

Additionally or alternatively, the management server 140 can determine a polynomial charge estimate function from one or more charge records. The historical vehicle battery data can include multiple data points, such as time series data for a charge event. The management server 140 can apply curve-fitting techniques to the multiple data points to generate an estimated polynomial function.

At block 1412, input data can be received. In particular, the management server 140 can receive input data. Example input data can be included in the charge state request. In particular, example input data can include an approximate start time for a current charge of the battery, a last state of charge for the battery, and/or a current time.

At block 1414, a state of charge can be estimated. In particular, the management server 140 can estimate a state of charge using the charge estimate function. The management server 140 can use at least some the initialization data as input to the charge estimate function to output a state of charge. Thus, while a vehicle computer is off/while the vehicle gateway device is unable to transmit vehicle battery data associated with the requested state of charge of the battery, the management server 140 can estimate a state of charge (such as a percentage) and/or state of charge over time (such as a graph) for the vehicle battery. As described herein, an example charge estimate function can be a linear or a polynomial function, which can output one or more states of charge based on the input and/or can be used to determine an estimated completion time or a time when the battery will reach a particular charge level. As described herein, an example charge estimate function can be customized for a particular vehicle/battery.

At block 1416, it can be determined whether an alert for the fleet, cohort, vehicle, battery, and/or charge event exists. In particular, the management server 140 can determine whether an applicable alert for the fleet, cohort, vehicle, battery, and/or charge event exists. In some embodiments, a user can define an alert for the fleet, cohort, vehicle, battery, and/or charge event. If an alert is applicable, the management server 140 can apply a charge alert condition to determine if an alert should be sent. An example charge alert condition can include a threshold state of charge for the battery that would cause the example charge alert condition to be satisfied. In other words, determining that the charge alert condition is satisfied can include identifying that the current state of charge is above a predefined charge level threshold. Thus, if a current estimated charge of the battery satisfies the charge alert condition based on the current time, the method can proceed to block 1418. At block 1418, an alert can be sent. In particular, the management server 140 can transmit an alert to the user computing device 120, such as an in-application alert, an email, a text message, etc. If the alert condition has not been satisfied, the method can return back to block 1412 to receive updated input data, such as an updated current time, which can cause the alert condition to be checked in a loop until the condition is satisfied or some other exit condition occurs.

At block 1420, charge data can be presented. In particular, the management server 140 can cause presentation of the charge data (such as a state of charge) in a report and/or a graphical user interface. Example output graphical user interfaces and/or visualizations of charge data are described in further detail above with respect to FIGS. 7A, 7C. The management server 140 can cause presentation of a visualization of the state of charge and/or the graph in a report and/or graphical user interface.

X. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:

a first vehicle gateway device configured to gather and transmit first vehicle metric data associated with a first vehicle;

one or more computer-readable storage mediums having program instructions embodied therewith; and one or more processors configured to execute the program instructions to cause the one or more processors to:

receive vehicle metric data from a plurality of vehicle gateway devices associated with a plurality of vehicles, wherein the plurality of vehicles includes at least the first vehicle, wherein the plurality of vehicle gateway devices includes at least the first vehicle gateway device of the first vehicle, and wherein the vehicle metric data includes at least the first vehicle metric data received from the first vehicle gateway device and associated with the first vehicle;

determine, based at least in part on the vehicle metric data, one or more fuel/energy usage metrics of the plurality of vehicles over various periods of time;

determine, based at least in part on the first vehicle metric data, first one or more fuel/energy usage metrics of the first vehicle;

perform a comparison of at least one of the one or more fuel/energy usage metrics of the plurality of vehicles with at least one of the first one or more fuel/energy usage metrics of the first vehicle;

generate, based at least in part on the comparison, a fuel/energy comparison report associated with the first vehicle; and cause the fuel/energy comparison report to be displayed in a graphical user interface to a user.

2. The system of claim 1, wherein the plurality of vehicles are related to the first vehicle by at least one of: a vehicle characteristic, a driver, a driver characteristic, a fleet, or a cohort.

3. The system of claim 1, wherein the one or more processors are configured to execute the program instructions to further cause the one or more processors to:

cause at least one of the one or more fuel/energy usage metrics of the plurality of vehicles or the first one or more fuel/energy usage metrics of the first vehicle to be provided in at least one of: an alert, a report, or the graphical user interface.

4. The system of claim 1, wherein the one or more fuel/energy usage metrics include fuel consumed.

5. The system of claim 4, wherein the one or more fuel/energy usage metrics further include total miles driven.

6. The system of claim 5, wherein the one or more fuel/energy usage metrics further include miles per gallon.

7. The system of claim 6, wherein the one or more fuel/energy usage metrics further include at least one of: fuel consumed, energy consumed, percent electric driving, total miles driven, carbon emissions, total emissions saved, energy recovered, and/or miles per gallon.

8. The system of claim 1, wherein the one or more fuel/energy usage metrics further include at least one of: fuel consumed, energy consumed, total miles driven, percent electric driving, total miles driven, carbon emissions, total emissions saved, energy recovered, and/or miles per gallon.

9. The system of claim 1, wherein the one or more processors are configured to execute the program instructions to further cause the one or more processors to:

determine, based at least in part on the vehicle metric data, one or more fuel/energy efficiency metrics of the plurality of vehicles over various periods of time;

determine, based at least in part on the first vehicle metric data, first one or more fuel/energy efficiency metrics of the first vehicle; and cause at least one of the one or more fuel/energy efficiency metrics of the plurality of vehicles or the first one or more fuel/energy efficiency metrics of the first vehicle to be provided in at least one of: an alert, a report, or the graphical user interface.

10. The system of claim 9, wherein the one or more fuel/energy efficiency metrics include time idling.

11. The system of claim 10, wherein the one or more fuel/energy efficiency metrics further include at least one of: cruise control use, coasting, accelerator pedal, anticipation, and/or RPM.

12. The system of claim 9, wherein the one or more fuel/energy efficiency metrics further include at least one of: cruise control use, coasting, accelerator pedal, time idling, anticipation, and/or RPM.

13. The system of claim 9, wherein the one or more processors are configured to execute the program instructions to further cause the one or more processors to:

determine correlations among the one or more fuel/energy efficiency metrics and fuel/energy usage of the plurality of vehicles over the various periods of time, wherein the fuel/energy comparison report is determined further based at least in part on the correlations.

14. The system of claim 13, wherein determining the correlations further comprises determining weightings of the one or more fuel/energy efficiency metrics.

15. The system of claim 14, wherein the weightings are customizable by a user.

16. A computer-implemented method comprising:

by one or more processors executing program instructions:

communicating with a first vehicle gateway device configured to gather and transmit first vehicle metric data associated with a first vehicle;

receiving vehicle metric data from a plurality of vehicle gateway devices associated with a plurality of vehicles, wherein the plurality of vehicles includes at least the first vehicle, wherein the plurality of vehicle gateway devices includes at least the first vehicle gateway device of the first vehicle, and wherein the vehicle metric data includes at least the first vehicle metric data received from the first vehicle gateway device and associated with the first vehicle;

determining, based at least in part on the vehicle metric data, one or more fuel/energy usage metrics of the plurality of vehicles over various periods of time;

determining, based at least in part on the first vehicle metric data, first one or more fuel/energy usage metrics of the first vehicle;

performing a comparison of at least one of the one or more fuel/energy usage metrics of the plurality of vehicles with at least one of the first one or more fuel/energy usage metrics of the first vehicle;

generating, based at least in part on the comparison, a fuel/energy comparison report associated with the first vehicle; and causing the fuel/energy comparison report to be displayed in a graphical user interface to a user.

17. The computer-implemented method of claim 16 further comprising:

by the one or more processors executing program instructions:

causing at least one of the one or more fuel/energy usage metrics of the plurality of vehicles or the first one or more fuel/energy usage metrics of the first vehicle to be provided in at least one of: an alert, a report, or the graphical user interface.

18. The computer-implemented method of claim 17 further comprising:

by the one or more processors executing program instructions:

determining, based at least in part on the vehicle metric data, one or more fuel/energy efficiency metrics of the plurality of vehicles over various periods of time;

determining, based at least in part on the first vehicle metric data, first one or more fuel/energy efficiency metrics of the first vehicle; and causing at least one of the one or more fuel/energy efficiency metrics of the plurality of vehicles or the first one or more fuel/energy efficiency metrics of the first vehicle to be provided in at least one of: an alert, a report, or the graphical user interface.

19. A computer program product comprising one or more computer-readable storage mediums having program instructions embodied therewith, the program instructions executable by one or more processors to cause the one or more processors to:

communicating with a first vehicle gateway device configured to gather and transmit first vehicle metric data associated with a first vehicle;

receive vehicle metric data from a plurality of vehicle gateway devices associated with a plurality of vehicles, wherein the plurality of vehicles includes at least the first vehicle, wherein the plurality of vehicle gateway devices includes at least the first vehicle gateway device of the first vehicle, and wherein the vehicle metric data includes at least the first vehicle metric data received from the first vehicle gateway device and associated with the first vehicle;

determine, based at least in part on the vehicle metric data, one or more fuel/energy usage metrics of the plurality of vehicles over various periods of time;

determine, based at least in part on the first vehicle metric data, first one or more fuel/energy usage metrics of the first vehicle;

perform a comparison of at least one of the one or more fuel/energy usage metrics of the plurality of vehicles with at least one of the first one or more fuel/energy usage metrics of the first vehicle;

generate, based at least in part on the comparison, a fuel/energy comparison report associated with the first vehicle; and cause the fuel/energy comparison report to be displayed in a graphical user interface to a user.

* * * * *